United States Patent
Wong et al.

(10) Patent No.: US 7,949,812 B1
(45) Date of Patent: May 24, 2011

(54) PRIORITY ARBITRATION OF COEXISTING WIRELESS TOPOLOGIES

(75) Inventors: Gladys Yuen Yan Wong, Fremont, CA (US); Timothy J. Donovan, Livermore, CA (US); Timothy Li, San Jose, CA (US); Ken Yeung, Cupertino, CA (US)

(73) Assignee: Marvell International Ltd., Hamilton (BM)

( * ) Notice: Subject to any disclaimer, the term of this patent is extended or adjusted under 35 U.S.C. 154(b) by 211 days.

(21) Appl. No.: 12/198,375

(22) Filed: Aug. 26, 2008

Related U.S. Application Data

(60) Provisional application No. 60/970,642, filed on Sep. 7, 2007, provisional application No. 60/970,646, filed on Sep. 7, 2007, provisional application No. 60/981,956, filed on Oct. 23, 2007.

(51) Int. Cl.
*H04B 7/00* (2006.01)
*H04N 15/00* (2006.01)
*G06F 12/00* (2006.01)
*H04J 3/00* (2006.01)
*H04M 1/00* (2006.01)

(52) U.S. Cl. ........ 710/240; 710/241; 710/242; 710/243; 710/244; 370/345; 455/63.3; 455/41.2; 455/509; 455/552.1

(58) Field of Classification Search .............. 710/240, 710/241, 242, 243, 244; 455/63.3, 41.2, 455/509, 552.1; 370/345
See application file for complete search history.

(56) References Cited

U.S. PATENT DOCUMENTS

| | | | |
|---|---|---|---|
| 5,968,154 A * | 10/1999 | Cho | 710/119 |
| 6,842,607 B2 * | 1/2005 | Godfrey et al. | 455/41.2 |
| 6,996,684 B2 * | 2/2006 | Tseng et al. | 711/151 |
| 7,193,965 B1 * | 3/2007 | Nevo et al. | 370/230 |
| 7,295,528 B2 * | 11/2007 | Ibrahim et al. | 370/310 |
| 7,441,087 B2 * | 10/2008 | Hakura et al. | 711/137 |
| 7,468,963 B2 * | 12/2008 | Capretta | 370/329 |
| 7,546,404 B2 * | 6/2009 | Yeh et al. | 710/117 |
| 7,694,055 B2 * | 4/2010 | Orita et al. | 710/260 |
| 7,761,636 B2 * | 7/2010 | Mott et al. | 710/240 |
| 2002/0147966 A1 * | 10/2002 | Frazier | 717/127 |
| 2004/0215947 A1 * | 10/2004 | Ward et al. | 712/245 |
| 2007/0232358 A1 * | 10/2007 | Sherman | 455/560 |
| 2008/0051085 A1 * | 2/2008 | Ganton | 455/435.2 |
| 2008/0233875 A1 * | 9/2008 | Desai et al. | 455/41.2 |
| 2008/0247367 A1 * | 10/2008 | Guo et al. | 370/338 |
| 2008/0285536 A1 * | 11/2008 | Kaidar et al. | 370/345 |
| 2008/0287158 A1 * | 11/2008 | Rayzman et al. | 455/552.1 |

OTHER PUBLICATIONS

IEEE "Multi-Radio coexistence: Challenges and Opportunities" - Dated 2007, 7 pages.*

(Continued)

*Primary Examiner* — Brian T Misiura

(57) ABSTRACT

A wireless network device includes a first communication module to communicate with at least one of first devices and a second communication module to communicate with at least one of second devices. An arbitration module receives a request for communication from the first communication module, detects when the second communication module is communicating in a locked mode, and denies request for communication from the first communication module when the second communication module is communicating in the locked mode. Transmission or reception of a packet in the locked mode is not interrupted to avoid loss of the packet. The arbitration module grants the request for communication from the first communication module when the second communication module is communicating in the locked mode and when granting the request for communication from the first communication module does not require stopping the second communication module from communicating in the locked mode.

38 Claims, 31 Drawing Sheets

OTHER PUBLICATIONS

IEEE Std 802.16—2004 (Revision of IEEE Std 802.16-2001); IEEE Standard for Local and metropolitan area networks; Part 16: Air Interface for Fixed Broadband Wireless Access Systems; IEEE Computer Society and the IEEE Microwave Theory and Techniques Society; Sponsored by the LAN/MAN Standards Committee; Oct. 1, 2004; 893 pages.

ANSI/IEEE Std 802.11, 1999 Edition; Information technology—Telecommunications and information exchange between systems—Local and metropolitan area networks—Specific requirements—Part 11: Wireless LAN Medium Access Control (MAC) and Physical Layer (PHY) Specifications; LAN/MAN Standards Committee of the IEEE Computer Society; Aug. 20, 1999; 531 pages.

Specification of the Bluetooth System—Specification vol. 0; Master Table of Contents & Compliance Requirements; Covered Core Package version: 2.0 +EDR; Current Master TOC issued: Nov. 4, 2004; Part A, pp. 1-74; vol. 1, pp. 1-92; vol. 2 & 3, pp. 1-814; vol. 4, pp. 1-250.

* cited by examiner

| WL DIR | WL PRI Bit 1 | WL PRI Bit 0 | BT DIR | BT PRI Bit 1 | BT PRI Bit 0 | BT FREQ | WL Grant |
|---|---|---|---|---|---|---|---|
| 0 | 0 | 0 | 0 | 0 | 0 | 0 | 1 |
| 0 | 0 | 0 | 0 | 0 | 1 | 0 | 1 |
| 0 | 0 | 0 | 0 | 1 | 0 | 0 | 1 |
| 0 | 0 | 0 | 0 | 1 | 1 | 0 | 1 |
| ------- | ------- | ------- | ------- | ------- | ------- | ------- | ------- |
| 1 | 1 | 1 | 1 | 1 | 1 | 1 | 1 |

52-1

DIR: 1 = Transmit　　0 = Receive

PRI:　00 = Low　　01 = High
(Bit1, Bit0)　10 = Med
　　　11 = Med-Hi

BT FREQ: 1 = in-band　　0 = out-band

WL Grant: 1 = Grant　　0 = No Grant

| WL DIR | WL PRI Bit 1 | WL PRI Bit 0 | BT DIR | BT PRI Bit 1 | BT PRI Bit 0 | BT FREQ | BT Grant |
|---|---|---|---|---|---|---|---|
| 0 | 0 | 0 | 0 | 0 | 0 | 0 | 1 |
| 0 | 0 | 0 | 0 | 0 | 1 | 0 | 1 |
| 0 | 0 | 0 | 0 | 1 | 0 | 0 | 1 |
| 0 | 0 | 0 | 0 | 1 | 1 | 0 | 1 |
| ---- | ---- | ---- | ---- | ---- | ---- | ---- | ---- |
| 1 | 1 | 1 | 1 | 1 | 1 | 1 | 0 |

DIR: 1 = Transmit  0 = Receive

PRI: 00 = Low  
(Bit1, Bit0) 01 = High  
10 = Med  
11 = Med-Hi

BT FREQ: 1 = in-band  0 = out-band

WL Grant: 1 = Grant  0 = No Grant

FIG. 2E

| Lock Table2 | | |
|---|---|---|
| BT DIR | BT PRI | BT Lock Status |
| 0 | 0 | 0 |
| 0 | 1 | 0 |
| 1 | 0 | 0 |
| 1 | 1 | 1 |

0 = Receive    0 = Low PRI    1 = Locked
1 = Transmit   1 = High PRI   0 = Not locked

FIG. 2G

| Lock Table1 | | |
|---|---|---|
| WL DIR | WL PRI | WL Lock Status |
| 0 | 0 | 0 |
| 0 | 1 | 1 |
| 1 | 0 | 0 |
| 1 | 1 | 1 |

0 = Receive    0 = Low PRI    1 = Locked
1 = Transmit   1 = High PRI   0 = Not locked

PRIORITY ARBITRATION OF COEXISTING WIRELESS TOPOLOGIES

CROSS-REFERENCE TO RELATED APPLICATIONS

This application claims the benefit of U.S. Provisional Application No. 60/970,642, filed on Sep. 7, 2007, U.S. Provisional Application No. 60/970,646, filed on Sep. 7, 2007, and U.S. Provisional Application No. 60/981,956, filed on Oct. 23, 2007. The disclosures of the above applications are incorporated herein by reference in their entirety.

FIELD

The present disclosure relates to wireless communication systems, and more particularly to priority arbitration of coexisting wireless topologies.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

A wireless network device (device) may communicate via communication modules that comply with different wireless communication standards (standards). For example, the device may include a wireless local area network (WLAN) module that complies with a WLAN standard set forth in I.E.E.E, section 802.11, a Bluetooth® (BT) module that complies with the BT standard, and/or a Worldwide Interoperability for Microwave Access (WiMAX) module that complies with the WiMAX standard. The I.E.E.E. 802.11, Bluetooth®, and WiMAX standards are incorporated herein by reference in their entirety.

Occasionally, the device may attempt to communicate simultaneously via two or more of the communication modules. Frequencies of signals transmitted and/or received by the communication modules may sometimes overlap. For example, when the device attempts to communicate simultaneously via the WLAN and BT modules, BT signals may use frequencies in or near the frequency band used by the WLAN module. As a result, collisions may occur, and data may be lost.

SUMMARY

A wireless network device comprises a first communication module, a second communication module, and an arbitration module. The first communication module selectively communicates with at least one of first devices that are external to the wireless network device. The second communication module selectively communicates with at least one of second devices that are external to the wireless network device. The arbitration module receives a request for communication from the first communication module, detects when the second communication module is communicating in a locked mode, and selectively denies the request when the second communication module is communicating in the locked mode.

In another feature, the arbitration module grants the request when the second communication module is communicating in the locked mode and when granting the request does not require stopping the second communication module from communicating in the locked mode.

In other features, the arbitration module grants the request when the second communication module is not communicating in the locked mode. The arbitration module selectively stops the second communication module from communicating with the at least one of the second devices.

In another feature, the arbitration module includes a lookup table, receives inputs from the first and second communication modules, and determines, based on the lookup table and the inputs, when the first and second communication modules are communicating in the locked mode.

In another feature, the arbitration module includes a lookup table, receives inputs from the first and second communication modules related to priority and direction of communication requested by the first and second communication modules, and determines based on the lookup table and the inputs when to allow the first and second communication modules to communicate with the at least one of the first devices and the at least one of the second devices, respectively.

In another feature, the wireless network device further comprises a feedback module that generates feedback including a number of times the arbitration module grants the request, a number of times the arbitration module denies the request, and a number of times the arbitration module stops the second communication module from communicating when granting the request.

In another feature, the wireless network device further comprises a control module that adjusts data rates of the first and second communication modules based on the feedback.

In other features, the wireless network device further comprises a control module that configures a lookup table. The arbitration module determines when to allow the first and second communication modules to communicate with the at least one of the first devices and the at least one of the second devices, respectively, based on the lookup table and inputs received from the first and second communication modules. The control module adjusts the lookup table based on the feedback.

In another feature, each of the first and second communication modules includes one of a wireless local area network (WLAN) module, a Bluetooth® module, and a Worldwide Interoperability for Microwave Access (WiMAX) module. The first communication module is different than the second communication module.

In another feature, the wireless network device further comprises a priority resolution module that receives inputs related to priority of communication from the first and second communication modules and that generates a control signal when the first and second communication modules request identical priorities. One of the first and second communication modules communicates based on the control signal.

In other features, the wireless network device further comprises an idle monitoring module that monitors the first and second communication modules and that generates first and second idle signals when the first and second communication modules are not communicating, respectively. The priority resolution module generates the control signal based on the first and second idle signals.

In another feature, the wireless network device further comprises a switching module that switches a first priority granted by the arbitration module to the first communication module from the first communication module to the second communication module, and that switches a second priority granted by the arbitration module to the second communication module from the second communication module to the first communication module based on the control signal.

In another feature, the priority resolution module comprises a mask generating module that generates a mask that includes an N-bit binary number that is generated based on one of a random priority assignment sequence and a predetermined priority assignment sequence for the first and second communication modules, where N is an integer greater than or equal to 1.

In other features, the priority resolution module further comprises a shift register and a mask shifting module. The mask is loaded in the shift register. The mask shifting module shifts the shift register based on the first and second idle signals when both of the first and second communication modules request identical priorities. The control signal is generated based on the mask when the shift register is shifted.

In another feature, the wireless network device further comprises a feedback module that generates a feedback statistic that includes at least one of a number of times the first communication module is granted priority, a number of times the first communication module is denied priority, and a number of times the second communication module is stopped from communicating when the request includes a first priority for communication.

In another feature, the wireless network device further comprises a priority upgrade module that upgrades the first priority to a second priority when the feedback statistic is greater than or equal to a predetermined threshold. The request includes the second priority instead of the first priority. The priority upgrade module resets the feedback statistic after the first communication module communicates at the second priority.

In still other features, a wireless network device comprises a first communication module, a second communication module, a first grant module, and a second grant module. The first communication module selectively communicates with at least one of first devices that are external to the wireless network device. The second communication module selectively communicates with at least one of second devices that are external to the wireless network device. The first grant module receives first inputs related to priority of communication from the first and second communication modules and generates a first grant signal based on the first inputs that indicates when one of the first and second communication modules is allowed to communicate. The second grant module receives the first inputs and second inputs related to a direction of communication from the first and second communication modules. The second grant module generates a second grant signal based on the first and second inputs. The second grant signal indicates when both of the first and second communication modules are allowed to communicate. The first and second communication modules communicate with the at least one of the first devices and the at least one of the second devices based on the first and second grant signals, respectively.

In another feature, the first grant module comprises a first lookup table that receives the first inputs and that generates an output based on the first inputs. The first grant module generates the first grant signal based on the output.

In another feature, the first grant module further comprises a second lookup table that indicates based on the first and second inputs when the first and second communication modules communicate in a locked mode.

In another feature, the first grant module further comprises a mode verification module that verifies when one of the first and second communication modules communicates in the locked mode based on the second lookup table and that outputs the first grant signal when one of the first and second communication modules is not communicating in the locked mode.

In other features, the second grant module comprises a plurality of lookup tables that receive the first inputs and that generates outputs based on the first inputs. The second grant module generates the second grant signal based on the outputs and the second inputs.

In another feature, the wireless network device further comprises an idle monitoring module that monitors the first and second communication modules and that generates first and second idle signals when the first and second communication modules are not communicating, respectively.

In another feature, the wireless network device further comprises a combining module that combines the first and second grant signals and the first and second idle signals. The combining module generates third and fourth grant signals. The first and second communication modules communicate based on the third and fourth grant signals.

In another feature, the wireless network device further comprises a priority resolution module that receives inputs related to priority of communication from the first and second communication modules and that generates a control signal when the first and second communication modules request identical priorities. One of the first and second communication modules communicates based on the control signal.

In other features, the wireless network device further comprises an idle monitoring module that monitors the first and second communication modules and that generates first and second idle signals when the first and second communication modules are not communicating, respectively. The first grant module generates the first grant signal based on the control signal and the first and second idle signals.

In another feature, the priority resolution module comprises a mask generating module that generates a mask that includes an N-bit binary number that is generated based on one of a random and a predetermined priority assignment sequence for the first and second communication modules, where N is an integer greater than or equal to 1.

In other features, the priority resolution module further comprises a shift register and a mask shifting module. The mask is loaded in the shift register. The mask shifting module shifts the shift register based on the first and second idle signals when both of the first and second communication modules request identical priorities. The control signal is generated based on the mask when the shift register is shifted.

In another feature, the wireless network device further comprises a feedback module that generates a feedback statistic that includes at least one of a number of times one of the first and second communication modules is granted priority, is denied priority, and is stopped from communicating when one of the first and second communication modules requests a first priority for communication.

In another feature, the wireless network device further comprises a priority upgrade module that upgrades the first priority to a second priority when the feedback statistic is greater than or equal to a predetermined threshold. The first inputs include the second priority instead of the first priority. The priority upgrade module resets the feedback statistic after one of the first and second communication modules communicates at the second priority.

In still other features, a wireless network device comprises first, second, and third communication modules that communicate with first, second, and third devices that are external to the wireless network device, respectively. The wireless network device further comprises first, second, and third arbitration modules that receive inputs related to priority and direction of communication from the first and second, the second and third, and the first and third communication modules, respectively, and that generate first, second, and third control signals based on the inputs, respectively. The first control signals indicate when at least one of the first and second communication modules is allowed to communicate. The second control signals indicate when at least one of the second and third communication modules is allowed to communicate. The third control signals indicate when at least one of the first and third communication modules is allowed to communicate.

In another feature, the wireless network device further comprises a combining module that combines the first, second, and third control signals and that generates fourth, fifth, and sixth control signals. The fourth control signal determines when the first communication module is allowed to communicate. The fifth control signal determines when the second communication module is allowed to communicate. The sixth control signal determines when the third communication module is allowed to communicate.

In another feature, each of the first, second, and third arbitration modules detects when one of the first and second, one of the second and third, and one of the first and third communication modules is communicating in a locked mode when another of the first and second, another of the second and third, and another of the first and third communication modules generates a request for communication, respectively.

In other features, each of the first, second, and third arbitration modules comprises a first grant module that receives first inputs related to priority of communication from the first and second, the second and third, and the first and third communication modules, respectively. The first grant module generates a first grant signal based on the first inputs that indicates when one of the first and second, one of the second and third, and one of the first and third communication modules is allowed to communicate, respectively.

In other features, each of the first, second, and third arbitration modules further comprises a second grant module that receives the first inputs and second inputs related to direction of communication from the first and second, the second and third, and the first and third communication modules, respectively. The second grant module generates a second grant signal based on the first and second inputs. The second grant signal indicates when both of the first and second, both of the second and third, and both of the first and third communication modules are allowed to communicate, respectively.

In another feature, the wireless network device further comprises an idle monitoring module that monitors the first, second, and third communication modules, and that generates first, second, and third idle signals when the first, second, and third communication modules are not communicating, respectively.

In other features, the wireless network device further comprises a combining module that combines the first and second grant signals of the first, second, and third arbitration modules and the first, second, and third idle signals. The combining module generates first, second, and third control signals. The first control signal determines when the first communication module is allowed to communicate. The second control signal determines when the second communication module is allowed to communicate. The third control signal determines when the third communication module is allowed to communicate.

In another feature, a wireless network device comprises first, second, and third communication modules and an arbitration module. The first, second, and third communication modules communicate with first, second, and third devices that are external to the wireless network device, respectively. The arbitration module receives inputs related to priority and direction of communication from the first, second, and third communication modules and generates control signals based on the inputs. The control signals determine when at least one of the first, second, and third communication modules is allowed to communicate one of exclusively and concurrently with others of the first, second, and third communication modules.

In another feature, the arbitration module comprises a first grant module that receives first inputs related to priority of communication from the first, second, and third communication modules. The first grant module generates first grant signals based on the first inputs. The first grant signals indicate when one of the first, second, and third communication modules is allowed to communicate exclusively of others of the first, second, and third communication modules.

In another feature, the arbitration module further comprises a second grant module that receives the first inputs and second inputs related to direction of communication from the first, second, and third communication modules. The second grant module generates second grant signals based on the first and second inputs. The second grant signals indicate when at least two of the first, second, and third communication modules are allowed to communicate concurrently.

In another feature, the wireless network device further comprises an idle monitoring module that monitors the first, second, and third communication modules, and that generates first, second, and third idle signals when the first, second, and third communication modules are not communicating, respectively.

In another feature, the wireless network device further comprises a combining module that combines the first and second grant signals and the first, second, and third idle signals and that generates first, second, and third control signals. The first control signal determines when the first communication module is allowed to communicate. The second control signal determines when the second communication module is allowed to communicate. The third control signal determines when the third communication module is allowed to communicate.

In still other features, a method used by a wireless network device for communicating comprises selectively communicating with at least one of first devices that are external to the wireless network device using a first communication module and selectively communicating with at least one of second devices that are external to the wireless network device using a second communication module. The method further comprises receiving a request for communication from the first communication module, detecting when the second communication module is communicating in a locked mode, and selectively denying the request when the second communication module is communicating in the locked mode.

In another feature, the method further comprises granting the request when the second communication module is communicating in the locked mode and when granting the request does not require stopping the second communication module from communicating in the locked mode.

In another feature, the method further comprises granting the request when the second communication module is not communicating in the locked mode and selectively stopping the second communication module from communicating with the at least one of the second devices.

In another feature, the method further comprises receives inputs from the first and second communication modules, providing the inputs to a lookup table, and determining based on the lookup table and the inputs when the first and second communication modules are communicating in the locked mode.

In another feature, the method further comprises receiving inputs from the first and second communication modules related to priority and direction of communication requested by the first and second communication modules, and providing the inputs to a lookup table. The method further comprises determining based on the lookup table and the inputs when to allow the first and second communication modules to communicate with the at least one of the first devices and the at least one of the second devices, respectively.

In another feature, the method further comprises generating feedback including a number of times the request is granted, a number of times the request is denied, and a number of times the second communication module is stopped from communicating when granting the request.

In another feature, the method further comprises adjusting data rates of the first and second communication modules based on the feedback.

In another feature, the method further comprises configuring a lookup table. The method further comprises when to allow the first and second communication modules to communicate with the at least one of the first devices and the at least one of the second devices, respectively, based on the lookup table and inputs received from the first and second communication modules. The method further comprises adjusting the lookup table based on the feedback.

In another feature, the method further comprises providing each of the first and second communication modules with one of a wireless local area network (WLAN) module, a Bluetooth® module, and a Worldwide Interoperability for Microwave Access (WiMAX) module. The first communication module is different than the second communication module.

In another feature, the method further comprises receiving inputs related to priority of communication from the first and second communication modules, generating a control signal when the first and second communication modules request identical priorities, and communicating using one of the first and second communication modules based on the control signal.

In another feature, the method further comprises monitoring the first and second communication modules, generating first and second idle signals when the first and second communication modules are not communicating, respectively, and generating the control signal based on the first and second idle signals.

In another feature, the method further comprises switching a first priority granted to the first communication module from the first communication module to the second communication module based on the control signal. The method further comprises switching a second priority granted to the second communication module from the second communication module to the first communication module based on the control signal.

In another feature, the method further comprises generating a mask that includes an N-bit binary number that is generated based on one of a random priority assignment sequence and a predetermined priority assignment sequence for the first and second communication modules, where N is an integer greater than or equal to 1.

In another feature, the method further comprises loading the mask in a shift register, shifting the shift register based on the first and second idle signals when both of the first and second communication modules request identical priorities, and generating the control signal based on the mask when the shift register is shifted.

In another feature, the method further comprises generating a feedback statistic that includes at least one of a number of times the first communication module is granted priority, a number of times the first communication module is denied priority, and a number of times the second communication module is stopped from communicating when the request includes a first priority for communication.

In another feature, the method further comprises upgrading the first priority to a second priority when the feedback statistic is greater than or equal to a predetermined threshold. The request includes the second priority instead of the first priority. The method further comprises resetting the feedback statistic after the first communication module communicates at the second priority.

In still other features, a method used by a wireless network device for communicating comprises selectively communicating with at least one of first devices that are external to the wireless network device using a first communication module, and selectively communicating with at least one of second devices that are external to the wireless network device using a second communication module. The method further comprises receiving first inputs related to priority of communication from the first and second communication modules, and generating a first grant signal based on the first inputs that indicates when one of the first and second communication modules is allowed to communicate. The method further comprises receiving the first inputs and second inputs related to a direction of communication from the first and second communication modules, and generating a second grant signal based on the first and second inputs. The method further comprises determining based on the second grant signal when both of the first and second communication modules are allowed to communicate, and communicating with the at least one of the first devices and the at least one of the second devices using the first and second communication modules based on the first and second grant signals, respectively.

In another feature, the method further comprises receiving the first inputs, providing the first inputs to a lookup table, generating an output based on the first inputs, and generating the first grant signal based on the output.

In another feature, the method further comprises providing the first and second inputs to a second lookup table, and determining based on the first and second inputs when the first and second communication modules communicate in a locked mode.

In another feature, the method further comprises verifying when one of the first and second communication modules communicates in the locked mode based on the second lookup table, and outputting the first grant signal when one of the first and second communication modules is not communicating in the locked mode.

In another feature, the method further comprises providing the first inputs to a plurality of lookup tables, generating outputs based on the first inputs, and generating the second grant signal based on the outputs and the second inputs.

In another feature, the method further comprises monitoring the first and second communication modules, and generating first and second idle signals when the first and second communication modules are not communicating, respectively.

In another feature, the method further comprises combining the first and second grant signals and the first and second idle signals, generating third and fourth grant signals, and communicating using the first and second communication modules based on the third and fourth grant signals.

In another feature, the method further comprises receiving inputs related to priority of communication from the first and second communication modules, generating a control signal when the first and second communication modules request identical priorities, and communicating using one of the first and second communication modules based on the control signal.

In another feature, the method further comprises monitoring the first and second communication modules, generating first and second idle signals when the first and second communication modules are not communicating, respectively, and generating the first grant signal based on the control signal and the first and second idle signals.

In another feature, the method further comprises generating a mask that includes an N-bit binary number that is generated based on one of a random and a predetermined priority assignment sequence for the first and second communication modules, where N is an integer greater than or equal to 1.

In another feature, the method further comprises loading the mask in a shift register, shifting the shift register based on the first and second idle signals when both of the first and second communication modules request identical priorities, and generating the control signal based on the mask when the shift register is shifted.

In another feature, the method further comprises generating a feedback statistic that includes at least one of a number of times one of the first and second communication modules is granted priority, is denied priority, and is stopped from communicating when one of the first and second communication modules requests a first priority for communication.

In another feature, the method further comprises upgrading the first priority to a second priority when the feedback statistic is greater than or equal to a predetermined threshold. The first inputs include the second priority instead of the first priority. The method further comprises resetting the feedback statistic after one of the first and second communication modules communicates at the second priority.

In still other features, a method used by a wireless network device for communicating comprises communicating with first, second, and third devices that are external to the wireless network device using first, second, and third communication modules, respectively. The method further comprises providing the first, second, and third communication modules with first, second, and third arbitration modules, respectively. The method further comprises providing the first, second, and third arbitration modules inputs related to priority and direction of communication from the first and second, the second and third, and the first and third communication modules, respectively. The method further comprises generating first, second, and third control signals based on the inputs using the first, second, and third arbitration modules, respectively. The method further comprises determining based on the first control signals when at least one of the first and second communication modules is allowed to communicate. The method further comprises determining based on the second control signals when at least one of the second and third communication modules is allowed to communicate. The method further comprises determining based on the third control signals when at least one of the first and third communication modules is allowed to communicate.

In another feature, the method further comprises combining the first, second, and third control signals, and generating fourth, fifth, and sixth control signals. The fourth control signal determines when the first communication module is allowed to communicate. The fifth control signal determines when the second communication module is allowed to communicate. The sixth control signal determines when the third communication module is allowed to communicate.

In another feature, the method further comprises detecting using each of the first, second, and third arbitration modules when one of the first and second, one of the second and third, and one of the first and third communication modules is communicating in a locked mode when another of the first and second, another of the second and third, and another of the first and third communication modules generates a request for communication, respectively.

In another feature, the method further comprises providing each of the first, second, and third arbitration modules first inputs related to priority of communication from the first and second, the second and third, and the first and third communication modules, respectively. The method further comprises generating using each of the first, second, and third arbitration modules a first grant signal based on the first inputs. The method further comprises determining based on the first grant signal generated by each of the first, second, and third arbitration modules when one of the first and second, one of the second and third, and one of the first and third communication modules is allowed to communicate, respectively.

In another feature, the method further comprises providing each of the first, second, and third arbitration modules the first inputs and second inputs related to direction of communication from the first and second, the second and third, and the first and third communication modules, respectively. The method further comprises generating using each of the first, second, and third arbitration modules a second grant signal based on the first and second inputs. The method further comprises determining based on the second grant signal when both of the first and second, both of the second and third, and both of the first and third communication modules are allowed to communicate, respectively.

In another feature, the method further comprises monitoring the first, second, and third communication modules, and generating first, second, and third idle signals when the first, second, and third communication modules are not communicating, respectively.

In another feature, the method further comprises combining the first and second grant signals and the first, second, and third idle signals, and generating first, second, and third control signals. The first control signal determines when the first communication module is allowed to communicate. The second control signal determines when the second communication module is allowed to communicate. The third control signal determines when the third communication module is allowed to communicate.

In still other features, a method used by a wireless network device for communicating comprises communicating with first, second, and third devices that are external to the wireless network device using first, second, and third communication modules, respectively. The method further comprises receiving inputs related to priority and direction of communication from the first, second, and third communication modules, and generating control signals based on the inputs. The method further comprises determining based on the control signals when at least one of the first, second, and third communication modules is allowed to communicate one of exclusively and concurrently with others of the first, second, and third communication modules.

In another feature, the method further comprises receiving first inputs related to priority of communication from the first, second, and third communication modules, and generating first grant signals based on the first inputs. The method further comprises determining based on the first grant signals when one of the first, second, and third communication modules is allowed to communicate exclusively of others of the first, second, and third communication modules.

In another feature, the method further comprises receiving the first inputs and second inputs related to direction of communication from the first, second, and third communication modules, and generating second grant signals based on the first and second inputs. The method further comprises determining based on the second grant signals when at least two of the first, second, and third communication modules are allowed to communicate concurrently.

In another feature, the method further comprises monitoring the first, second, and third communication modules, and generating first, second, and third idle signals when the first, second, and third communication modules are not communicating, respectively.

In another feature, the method further comprises combining the first and second grant signals and the first, second, and third idle signals, and generating first, second, and third control signals. The first control signal determines when the first communication module is allowed to communicate. The second control signal determines when the second communication module is allowed to communicate. The third control signal determines when the third communication module is allowed to communicate.

In still other features, a wireless network device comprises first communication means for selectively communicating with at least one of first devices that are external to the wireless network device. The wireless network device further comprises second communication means for selectively communicating with at least one of second devices that are external to the wireless network device. The wireless network device further comprises arbitration means for receiving a request for communication from the first communication means, for detecting when the second communication means is communicating in a locked mode, and for selectively denying the request when the second communication means is communicating in the locked mode.

In another feature, the arbitration means grants the request when the second communication means is communicating in the locked mode and when granting the request does not require stopping the second communication means from communicating in the locked mode.

In another feature, the arbitration means grants the request when the second communication means is not communicating in the locked mode. The arbitration means selectively stops the second communication means from communicating with the at least one of the second devices.

In another feature, the arbitration means includes a lookup table, receives inputs from the first and second communication means, and determines, based on the lookup table and the inputs, when the first and second communication means are communicating in the locked mode.

In another feature, the arbitration means includes a lookup table, receives inputs from the first and second communication means related to priority and direction of communication requested by the first and second communication means, and determines based on the lookup table and the inputs when to allow the first and second communication means to communicate with the at least one of the first devices and the at least one of the second devices, respectively.

In another feature, the wireless network device further comprises feedback means for generating feedback including a number of times the arbitration means grants the request, a number of times the arbitration means denies the request, and a number of times the arbitration means stops the second communication means from communicating when granting the request.

In another feature, the wireless network device further comprises control means for adjusting data rates of the first and second communication means based on the feedback.

In other features, the wireless network device further comprises control means for configuring a lookup table. The arbitration means determines when to allow the first and second communication means to communicate with the at least one of the first devices and the at least one of the second devices, respectively, based on the lookup table and inputs received from the first and second communication means. The control means adjusts the lookup table based on the feedback.

In other features, each of the first and second communication means includes one of a wireless local area network (WLAN) means for communicating over the WLAN, a Bluetooth® (BT) means for communicating via a BT network, and a Worldwide Interoperability for Microwave Access (WiMAX) means for communicating over the WiMAX network. The first communication means is different than the second communication means.

In another feature, the wireless network device further comprises priority resolution means for receiving inputs related to priority of communication from the first and second communication means and for generating a control signal when the first and second communication means request identical priorities. One of the first and second communication means communicates based on the control signal.

In other features, the wireless network device further comprises idle monitoring means for monitoring the first and second communication means and for generating first and second idle signals when the first and second communication means are not communicating, respectively. The priority resolution means generates the control signal based on the first and second idle signals.

In another feature, the wireless network device further comprises switching means for switching a first priority granted by the arbitration means to the first communication means from the first communication means to the second communication means, and for switching a second priority granted by the arbitration means to the second communication means from the second communication means to the first communication means based on the control signal.

In another feature, the priority resolution means comprises mask generating means for generating a mask that includes an N-bit binary number that is generated based on one of a random priority assignment sequence and a predetermined priority assignment sequence for the first and second communication means, where N is an integer greater than or equal to 1.

In another feature, the priority resolution means further comprises shift register means for storing the mask, and mask shifting means for shifting the shift register means based on the first and second idle signals when both of the first and second communication means request identical priorities. The control signal is generated based on the mask when the shift register is shifted.

In another feature, the wireless network device further comprises feedback means for generating a feedback statistic that includes at least one of a number of times the first communication means is granted priority, a number of times the first communication means is denied priority, and a number of times the second communication means is stopped from communicating when the request includes a first priority for communication.

In another feature, the wireless network device further comprises priority upgrade means for upgrading the first priority to a second priority when the feedback statistic is greater than or equal to a predetermined threshold. The request includes the second priority instead of the first priority. The priority upgrade means resets the feedback statistic after the first communication means communicates at the second priority.

In still other features, a wireless network device comprises first communication means for selectively communicating with at least one of first devices that are external to the wireless network device. The wireless network device further comprises second communication means for selectively communicating with at least one of second devices that are external to the wireless network device. The wireless network device further comprises first grant means for receiving first inputs related to priority of communication from the first and second communication means and for generating a first grant signal based on the first inputs that indicates when one of the first and second communication means is allowed to communicate. The wireless network device further comprises second grant means for receiving the first inputs and second inputs related to a direction of communication from the first and second communication means and for generating a second grant signal based on the first and second inputs. The second grant signal indicates when both of the first and second communication means are allowed to communicate. The first and second communication means communicate with the at least one of the first devices and the at least one of the second devices based on the first and second grant signals, respectively.

In another feature, the first grant means comprises a first lookup table that receives the first inputs and that generates an output based on the first inputs. The first grant means generates the first grant signal based on the output.

In another feature, the first grant means further comprises a second lookup table that indicates based on the first and second inputs when the first and second communication means communicate in a locked mode.

In another feature, the first grant means further comprises mode verification means for verifying when one of the first and second communication means communicates in the locked mode based on the second lookup table and for outputting the first grant signal when one of the first and second communication means is not communicating in the locked mode.

In another feature, the second grant means comprises a plurality of lookup tables that receive the first inputs and that generates outputs based on the first inputs. The second grant means generates the second grant signal based on the outputs and the second inputs.

In another feature, the wireless network device further comprises idle monitoring means for monitoring the first and second communication means and for generating first and second idle signals when the first and second communication means are not communicating, respectively.

In another feature, the wireless network device further comprises combining means for combining the first and second grant signals and the first and second idle signals and for generating third and fourth grant signals. the first and second communication means communicate based on the third and fourth grant signals.

In another feature, the wireless network device further comprises priority resolution means for receiving inputs related to priority of communication from the first and second communication means and for generating a control signal when the first and second communication means request identical priorities. One of the first and second communication means communicates based on the control signal.

In other features, the wireless network device further comprises idle monitoring means for monitoring the first and second communication means and for generating first and second idle signals when the first and second communication means are not communicating, respectively. The first grant means generates the first grant signal based on the control signal and the first and second idle signals.

In another feature, the priority resolution means comprises mask generating means for generating a mask that includes an N-bit binary number that is generated based on one of a random and a predetermined priority assignment sequence for the first and second communication means, where N is an integer greater than or equal to 1.

In other features, the priority resolution means further comprises shift register means for storing the mask, and mask shifting means for shifting the shift register based on the first and second idle signals when both of the first and second communication means request identical priorities. The control signal is generated based on the mask when the shift register is shifted.

In another feature, the wireless network device further comprises feedback means for generating a feedback statistic that includes at least one of a number of times one of the first and second communication means is granted priority, is denied priority, and is stopped from communicating when one of the first and second communication means requests a first priority for communication.

In another feature, the wireless network device further comprises priority upgrade means for upgrading the first priority to a second priority when the feedback statistic is greater than or equal to a predetermined threshold. The first inputs include the second priority instead of the first priority. The priority upgrade means resets the feedback statistic after one of the first and second communication means communicates at the second priority.

In still other features, a wireless network device comprises first, second, and third communication means for communicating with first, second, and third devices that are external to the wireless network device, respectively. The wireless network device further comprises first, second, and third arbitration means for receiving inputs related to priority and direction of communication from the first and second, the second and third, and the first and third communication means, respectively, and for generating first, second, and third control signals based on the inputs, respectively. The first control signals indicate when at least one of the first and second communication means is allowed to communicate. The second control signals indicate when at least one of the second and third communication means is allowed to communicate. The third control signals indicate when at least one of the first and third communication means is allowed to communicate.

In another feature, the wireless network device further comprises combining means for combining the first, second, and third control signals and for generating fourth, fifth, and sixth control signals. The fourth control signal determines when the first communication means is allowed to communicate. The fifth control signal determines when the second communication means is allowed to communicate. The sixth control signal determines when the third communication means is allowed to communicate.

In another feature, each of the first, second, and third arbitration means detects when one of the first and second, one of the second and third, and one of the first and third communication means is communicating in a locked mode when another of the first and second, another of the second and third, and another of the first and third communication means generates a request for communication, respectively.

In another feature, each of the first, second, and third arbitration means comprises first grant means for receiving first inputs related to priority of communication from the first and second, the second and third, and the first and third communication means, respectively, and for generating a first grant signal based on the first inputs. The first grant signal indicates when one of the first and second, one of the second and third, and one of the first and third communication means is allowed to communicate, respectively.

In another feature, each of the first, second, and third arbitration means further comprises second grant means for receiving the first inputs and second inputs related to direction of communication from the first and second, the second and third, and the first and third communication means, respectively, and for generating a second grant signal based on the first and second inputs. The second grant signal indicates when both of the first and second, both of the second and third, and both of the first and third communication means are allowed to communicate, respectively.

In another feature, the wireless network device further comprises idle monitoring means for monitoring the first, second, and third communication means, and for generating first, second, and third idle signals when the first, second, and third communication means are not communicating, respectively.

In another feature, the wireless network device further comprises combining means for combining the first and second grant signals of the first, second, and third arbitration means and the first, second, and third idle signals and for generating first, second, and third control signals. The first control signal determines when the first communication means is allowed to communicate. The second control signal determines when the second communication means is allowed to communicate. The third control signal determines when the third communication means is allowed to communicate.

In still other features, a wireless network device comprises first, second, and third communication means for communicating with first, second, and third devices that are external to the wireless network device, respectively. The wireless network device further comprises arbitration means for receiving inputs related to priority and direction of communication from the first, second, and third communication means and generating control signals based on the inputs. The control signals determine when at least one of the first, second, and third communication means is allowed to communicate one of exclusively and concurrently with others of the first, second, and third communication means.

In another feature, the arbitration means comprises first grant means for receiving first inputs related to priority of communication from the first, second, and third communication means, and for generating first grant signals based on the first inputs. The first grant signals indicate when one of the first, second, and third communication means is allowed to communicate exclusively of others of the first, second, and third communication means.

In another feature, the arbitration means further comprises second grant means for receiving the first inputs and second inputs related to direction of communication from the first, second, and third communication means, and for generating second grant signals based on the first and second inputs. The second grant signals indicate when at least two of the first, second, and third communication means are allowed to communicate concurrently.

In another feature, the wireless network device further comprises idle monitoring means for monitoring the first, second, and third communication means, and for generating first, second, and third idle signals when the first, second, and third communication means are not communicating, respectively.

In another feature, the wireless network device further comprises combining means for combining the first and second grant signals and the first, second, and third idle signals and for generating first, second, and third control signals. The first control signal determines when the first communication means is allowed to communicate. The second control signal determines when the second communication means is allowed to communicate. The third control signal determines when the third communication means is allowed to communicate.

In still other features, a computer program executed by a processor of a wireless network device comprises selectively communicating with at least one of first devices that are external to the wireless network device using a first communication module and selectively communicating with at least one of second devices that are external to the wireless network device using a second communication module. The computer program further comprises receiving a request for communication from the first communication module, detecting when the second communication module is communicating in a locked mode, and selectively denying the request when the second communication module is communicating in the locked mode.

In another feature, the computer program further comprises granting the request when the second communication module is communicating in the locked mode and when granting the request does not require stopping the second communication module from communicating in the locked mode.

In another feature, the computer program further comprises granting the request when the second communication module is not communicating in the locked mode and selectively stopping the second communication module from communicating with the at least one of the second devices.

In another feature, the computer program further comprises receives inputs from the first and second communication modules, providing the inputs to a lookup table, and determining based on the lookup table and the inputs when the first and second communication modules are communicating in the locked mode.

In another feature, the computer program further comprises receiving inputs from the first and second communication modules related to priority and direction of communication requested by the first and second communication modules, and providing the inputs to a lookup table. The computer program further comprises determining based on the lookup table and the inputs when to allow the first and second communication modules to communicate with the at least one of the first devices and the at least one of the second devices, respectively.

In another feature, the computer program further comprises generating feedback including a number of times the request is granted, a number of times the request is denied, and a number of times the second communication module is stopped from communicating when granting the request.

In another feature, the computer program further comprises adjusting data rates of the first and second communication modules based on the feedback.

In another feature, the computer program further comprises configuring a lookup table. The computer program further comprises when to allow the first and second communication modules to communicate with the at least one of the first devices and the at least one of the second devices, respectively, based on the lookup table and inputs received from the first and second communication modules. The computer program further comprises adjusting the lookup table based on the feedback.

In another feature, the computer program further comprises providing each of the first and second communication modules with one of a wireless local area network (WLAN) module, a Bluetooth® module, and a Worldwide Interoperability for Microwave Access (WiMAX) module. The first communication module is different than the second communication module.

In another feature, the computer program further comprises receiving inputs related to priority of communication from the first and second communication modules, generating a control signal when the first and second communication modules request identical priorities, and communicating using one of the first and second communication modules based on the control signal.

In another feature, the computer program further comprises monitoring the first and second communication modules, generating first and second idle signals when the first and second communication modules are not communicating, respectively, and generating the control signal based on the first and second idle signals.

In another feature, the computer program further comprises switching a first priority granted to the first communication module from the first communication module to the second communication module based on the control signal. The computer program further comprises switching a second priority granted to the second communication module from the second communication module to the first communication module based on the control signal.

In another feature, the computer program further comprises generating a mask that includes an N-bit binary number that is generated based on one of a random priority assignment sequence and a predetermined priority assignment sequence for the first and second communication modules, where N is an integer greater than or equal to 1.

In another feature, the computer program further comprises loading the mask in a shift register, shifting the shift register based on the first and second idle signals when both of the first and second communication modules request identical priorities, and generating the control signal based on the mask when the shift register is shifted.

In another feature, the computer program further comprises generating a feedback statistic that includes at least one of a number of times the first communication module is granted priority, a number of times the first communication module is denied priority, and a number of times the second communication module is stopped from communicating when the request includes a first priority for communication.

In another feature, the computer program further comprises upgrading the first priority to a second priority when the feedback statistic is greater than or equal to a predetermined threshold. The request includes the second priority instead of the first priority. The computer program further comprises resetting the feedback statistic after the first communication module communicates at the second priority.

In still other features, a computer program executed by a processor of a wireless network device comprises selectively communicating with at least one of first devices that are external to the wireless network device using a first communication module, and selectively communicating with at least one of second devices that are external to the wireless network device using a second communication module. The computer program further comprises receiving first inputs related to priority of communication from the first and second communication modules, and generating a first grant signal based on the first inputs that indicates when one of the first and second communication modules is allowed to communicate. The computer program further comprises receiving the first inputs and second inputs related to a direction of communication from the first and second communication modules, and generating a second grant signal based on the first and second inputs. The computer program further comprises determining based on the second grant signal when both of the first and second communication modules are allowed to communicate, and communicating with the at least one of the first devices and the at least one of the second devices using the first and second communication modules based on the first and second grant signals, respectively.

In another feature, the computer program further comprises receiving the first inputs, providing the first inputs to a lookup table, generating an output based on the first inputs, and generating the first grant signal based on the output.

In another feature, the computer program further comprises providing the first and second inputs to a second lookup table, and determining based on the first and second inputs when the first and second communication modules communicate in a locked mode.

In another feature, the computer program further comprises verifying when one of the first and second communication modules communicates in the locked mode based on the second lookup table, and outputting the first grant signal when one of the first and second communication modules is not communicating in the locked mode.

In another feature, the computer program further comprises providing the first inputs to a plurality of lookup tables, generating outputs based on the first inputs, and generating the second grant signal based on the outputs and the second inputs.

In another feature, the computer program further comprises monitoring the first and second communication modules, and generating first and second idle signals when the first and second communication modules are not communicating, respectively.

In another feature, the computer program further comprises combining the first and second grant signals and the first and second idle signals, generating third and fourth grant signals, and communicating using the first and second communication modules based on the third and fourth grant signals.

In another feature, the computer program further comprises receiving inputs related to priority of communication from the first and second communication modules, generating a control signal when the first and second communication modules request identical priorities, and communicating using one of the first and second communication modules based on the control signal.

In another feature, the computer program further comprises monitoring the first and second communication modules, generating first and second idle signals when the first and second communication modules are not communicating, respectively, and generating the first grant signal based on the control signal and the first and second idle signals.

In another feature, the computer program further comprises generating a mask that includes an N-bit binary number that is generated based on one of a random and a predetermined priority assignment sequence for the first and second communication modules, where N is an integer greater than or equal to 1.

In another feature, the computer program further comprises loading the mask in a shift register, shifting the shift register based on the first and second idle signals when both of the first and second communication modules request identical priorities, and generating the control signal based on the mask when the shift register is shifted.

In another feature, the computer program further comprises generating a feedback statistic that includes at least one of a number of times one of the first and second communication modules is granted priority, is denied priority, and is stopped from communicating when one of the first and second communication modules requests a first priority for communication.

In another feature, the computer program further comprises upgrading the first priority to a second priority when the feedback statistic is greater than or equal to a predetermined threshold. The first inputs include the second priority instead of the first priority. The computer program further comprises resetting the feedback statistic after one of the first and second communication modules communicates at the second priority.

In still other features, a computer program executed by a processor of a wireless network device comprises communicating with first, second, and third devices that are external to the wireless network device using first, second, and third communication modules, respectively. The computer program further comprises providing the first, second, and third communication modules with first, second, and third arbitration modules, respectively. The computer program further comprises providing the first, second, and third arbitration modules inputs related to priority and direction of communication from the first and second, the second and third, and the first and third communication modules, respectively. The computer program further comprises generating first, second, and third control signals based on the inputs using the first, second, and third arbitration modules, respectively. The computer program further comprises determining based on the first control signals when at least one of the first and second communication modules is allowed to communicate. The computer program further comprises determining based on the second control signals when at least one of the second and third communication modules is allowed to communicate. The computer program further comprises determining based on the third control signals when at least one of the first and third communication modules is allowed to communicate.

In another feature, the computer program further comprises combining the first, second, and third control signals, and generating fourth, fifth, and sixth control signals. The fourth control signal determines when the first communication module is allowed to communicate. The fifth control signal determines when the second communication module is allowed to communicate. The sixth control signal determines when the third communication module is allowed to communicate.

In another feature, the computer program further comprises detecting using each of the first, second, and third arbitration modules when one of the first and second, one of the second and third, and one of the first and third communication modules is communicating in a locked mode when another of the first and second, another of the second and third, and another of the first and third communication modules generates a request for communication, respectively.

In another feature, the computer program further comprises providing each of the first, second, and third arbitration modules first inputs related to priority of communication from the first and second, the second and third, and the first and third communication modules, respectively. The computer program further comprises generating using each of the first, second, and third arbitration modules a first grant signal based on the first inputs. The computer program further comprises determining based on the first grant signal generated by each of the first, second, and third arbitration modules when one of the first and second, one of the second and third, and one of the first and third communication modules is allowed to communicate, respectively.

In another feature, the computer program further comprises providing each of the first, second, and third arbitration modules the first inputs and second inputs related to direction of communication from the first and second, the second and third, and the first and third communication modules, respectively. The computer program further comprises generating using each of the first, second, and third arbitration modules a second grant signal based on the first and second inputs. The computer program further comprises determining based on the second grant signal when both of the first and second, both of the second and third, and both of the first and third communication modules are allowed to communicate, respectively.

In another feature, the computer program further comprises monitoring the first, second, and third communication modules, and generating first, second, and third idle signals when the first, second, and third communication modules are not communicating, respectively.

In another feature, the computer program further comprises combining the first and second grant signals and the first, second, and third idle signals, and generating first, second, and third control signals. The first control signal determines when the first communication module is allowed to communicate. The second control signal determines when the second communication module is allowed to communicate. The third control signal determines when the third communication module is allowed to communicate.

In still other features, a computer program used by a wireless network device for communicating comprises communicating with first, second, and third devices that are external to the wireless network device using first, second, and third communication modules, respectively. The computer program further comprises receiving inputs related to priority and direction of communication from the first, second, and third communication modules, and generating control signals based on the inputs. The computer program further comprises determining based on the control signals when at least one of the first, second, and third communication modules is allowed to communicate one of exclusively and concurrently with others of the first, second, and third communication modules.

In another feature, the computer program further comprises receiving first inputs related to priority of communication from the first, second, and third communication modules, and generating first grant signals based on the first inputs. The computer program further comprises determining based on the first grant signals when one of the first, second, and third communication modules is allowed to communicate exclusively of others of the first, second, and third communication modules.

In another feature, the computer program further comprises receiving the first inputs and second inputs related to direction of communication from the first, second, and third communication modules, and generating second grant signals based on the first and second inputs. The computer program further comprises determining based on the second grant signals when at least two of the first, second, and third communication modules are allowed to communicate concurrently.

In another feature, the computer program further comprises monitoring the first, second, and third communication modules, and generating first, second, and third idle signals when the first, second, and third communication modules are not communicating, respectively.

In another feature, the computer program further comprises combining the first and second grant signals and the first, second, and third idle signals, and generating first, second, and third control signals. The first control signal determines when the first communication module is allowed to communicate. The second control signal determines when the second communication module is allowed to communicate. The third control signal determines when the third communication module is allowed to communicate.

Further areas of applicability of the present disclosure will become apparent from the detailed description, the claims and the drawings. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIGS. 2D and 2E are exemplary lookup tables used by the arbitration module of FIG. 2A;

FIGS. 2F and 2G are exemplary lock tables used by the arbitration module of FIG. 2A;

DETAILED DESCRIPTION

Figure 1A:
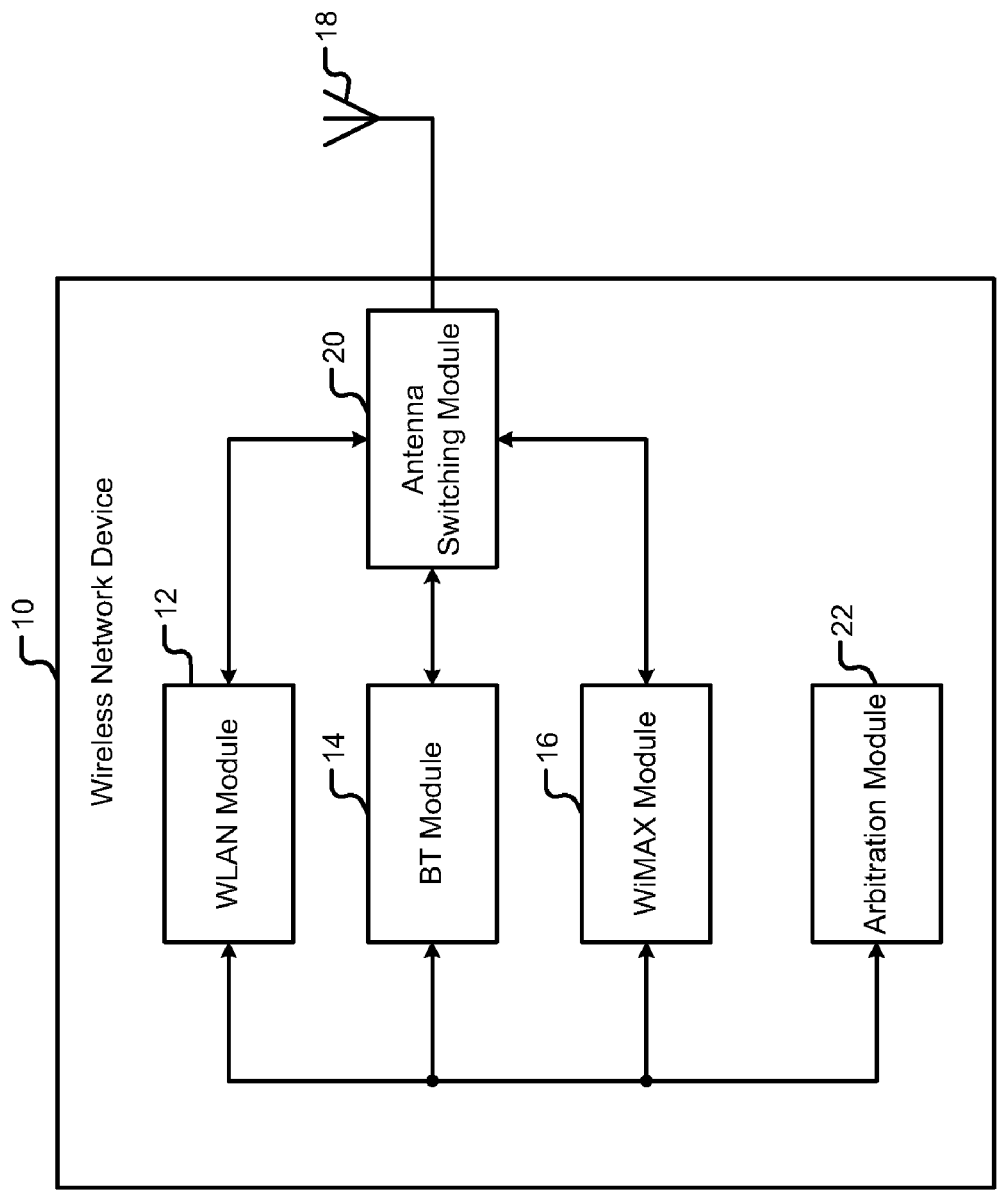
FIG. 1A is a functional block diagram of a wireless network device comprising a single antenna.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Figure 1B:
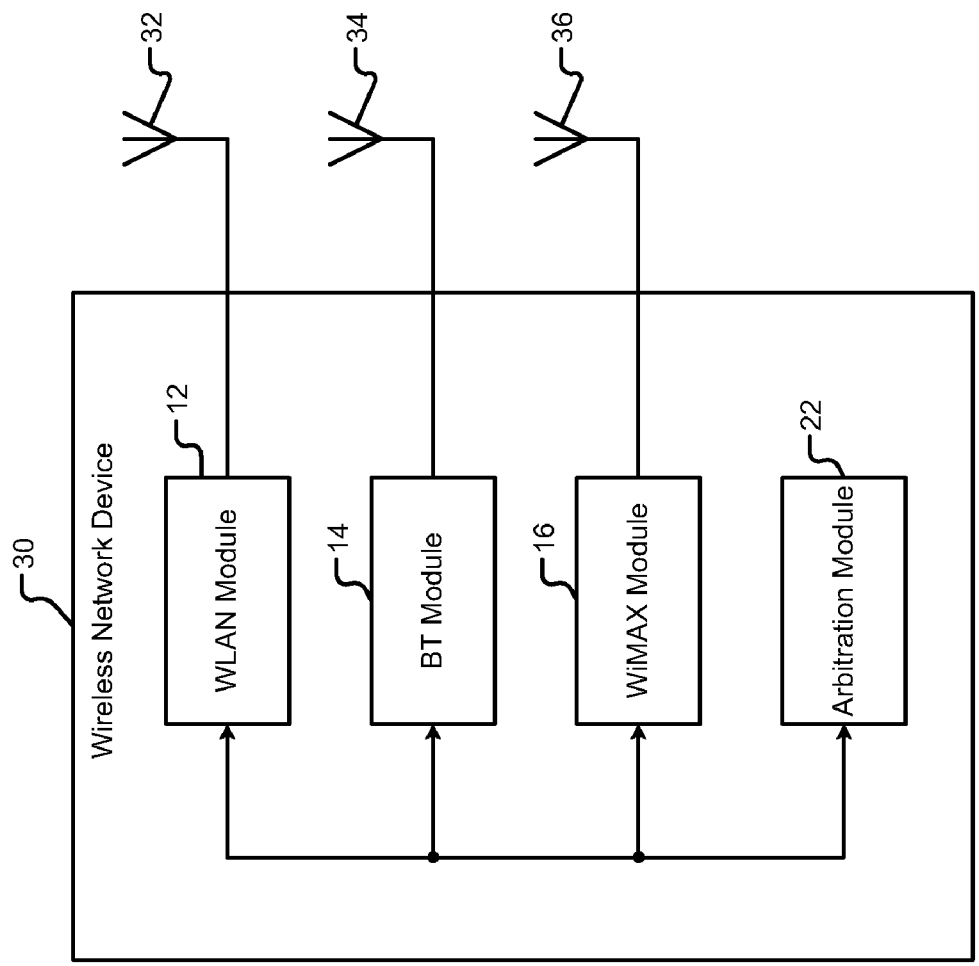
FIG. 1B is a functional block diagram of a wireless network device comprising multiple antennas.
Figure 1C:
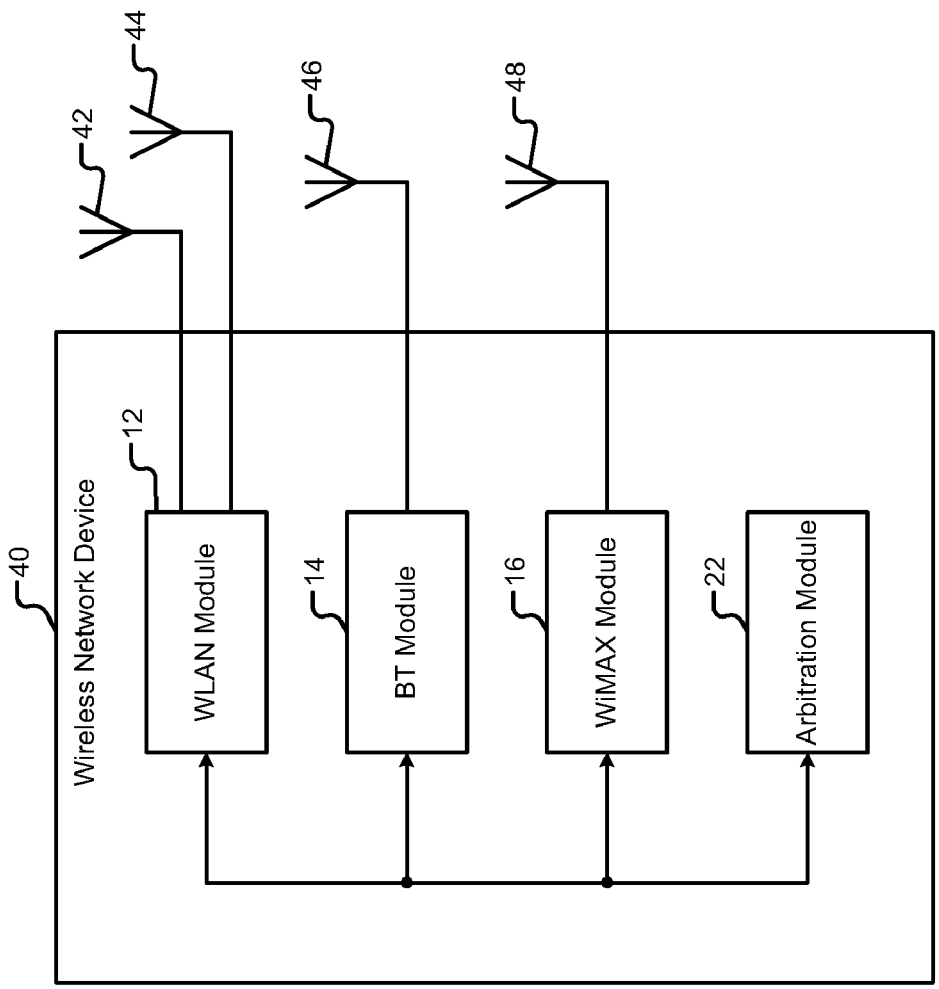
FIG. 1C is a functional block diagram of a wireless network device comprising multiple antennas.
Figure 2A:
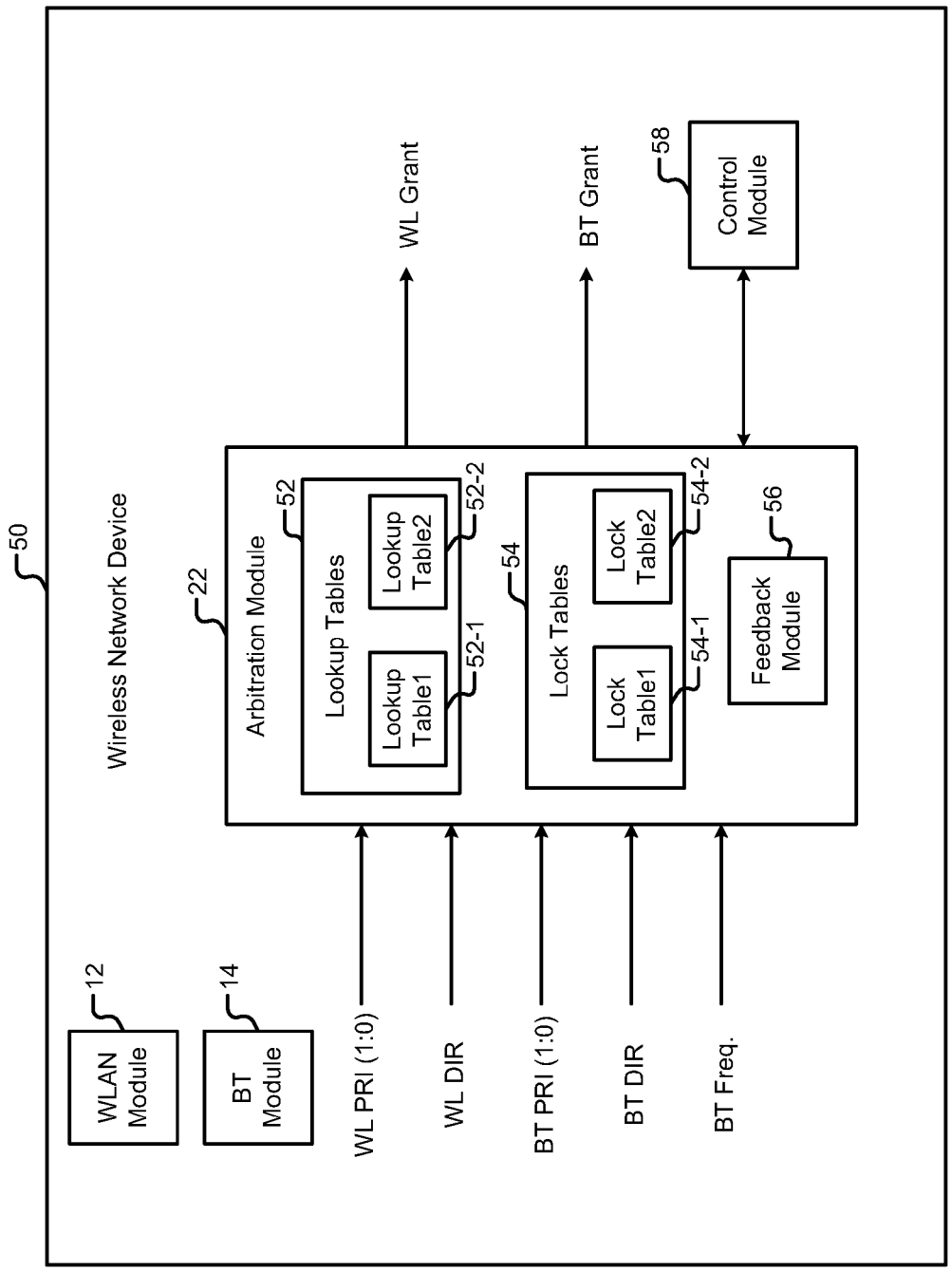
FIG. 2A is a functional block diagram of a wireless network device comprising an arbitration module that includes lookup and lock tables.
Figure 2C:
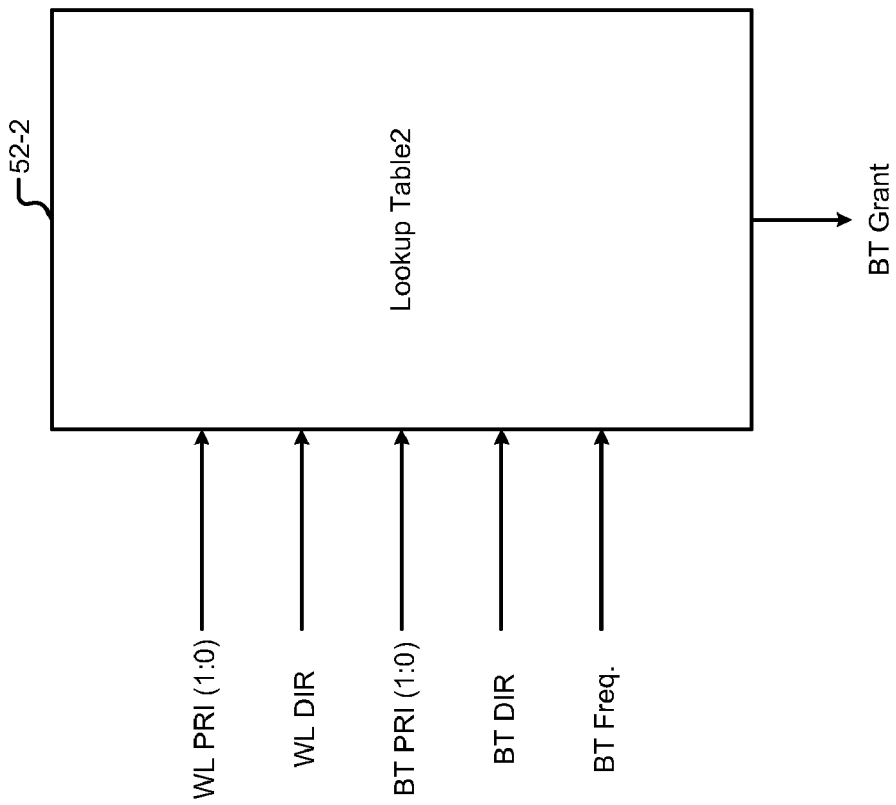
FIGS. 2B and 2C are schematics of the lookup tables used by the arbitration module of FIG. 2A.
Figure 2B:
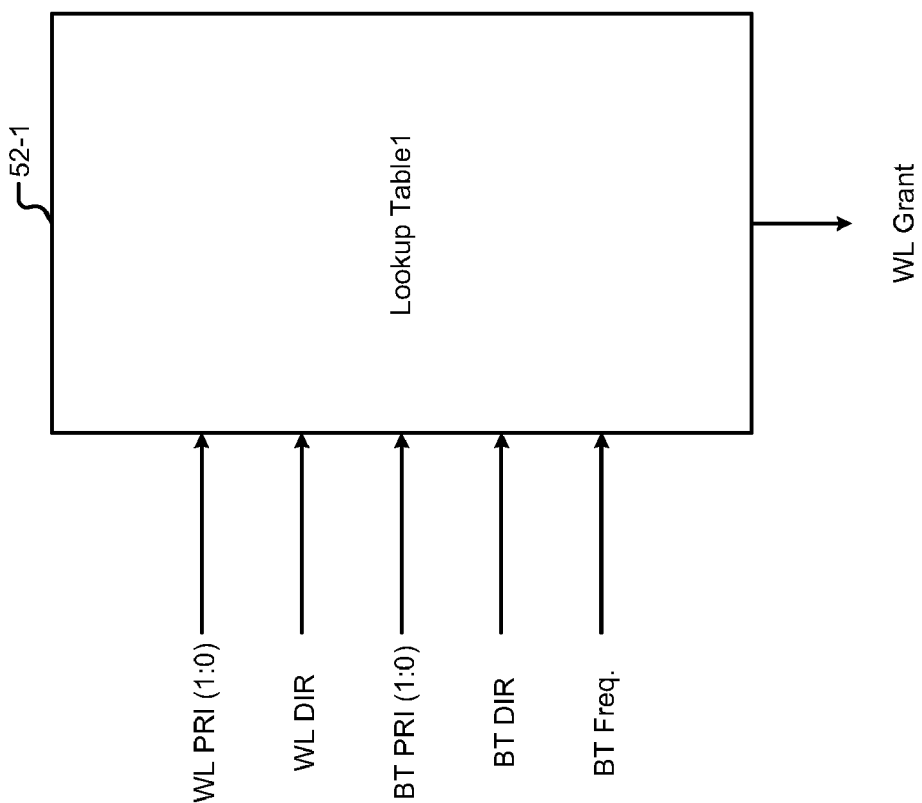
Figure 3:
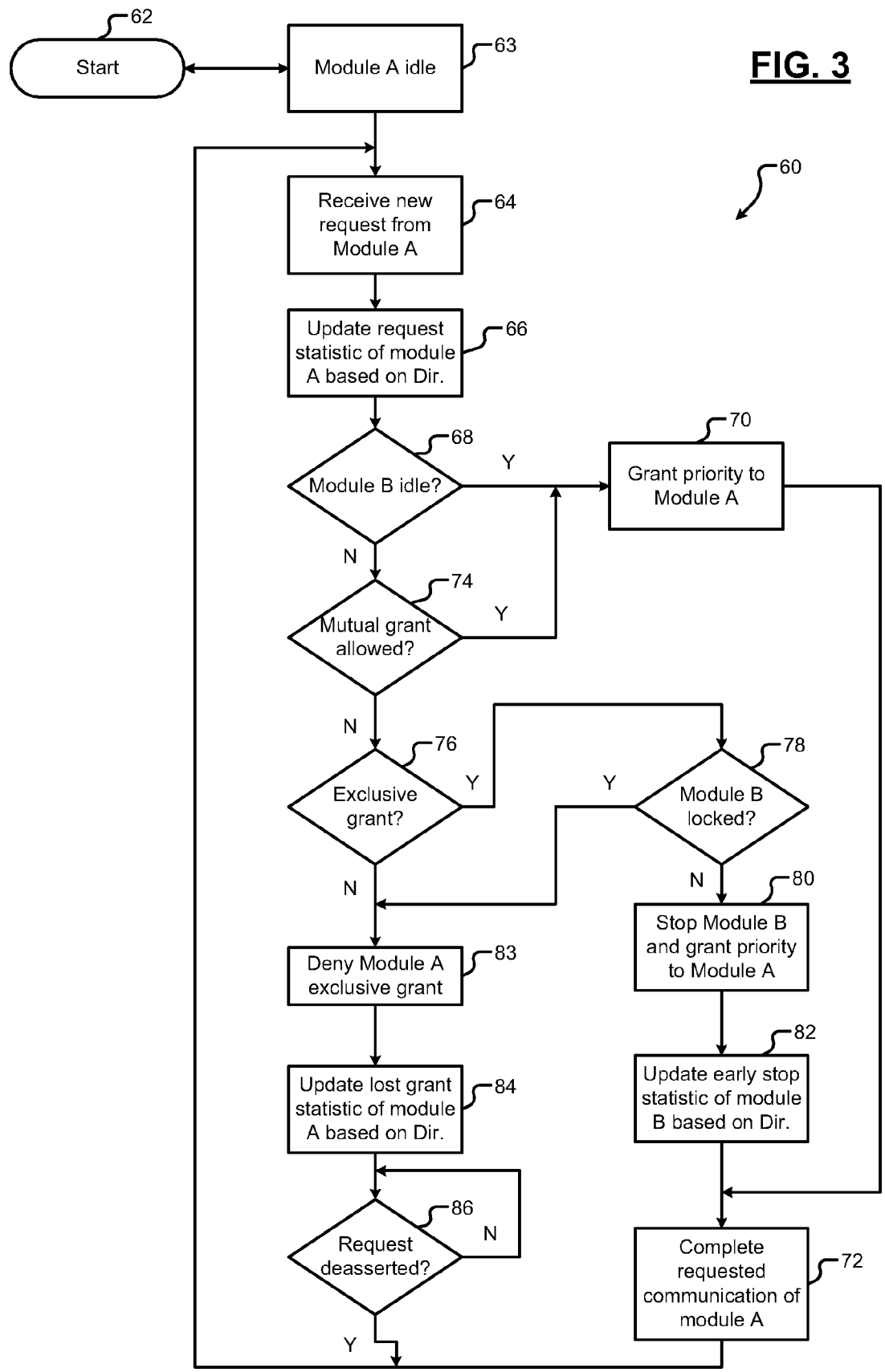
FIG. 3 is a flowchart of a method for arbitrating priorities using lookup and lock tables.
Figure 4A:
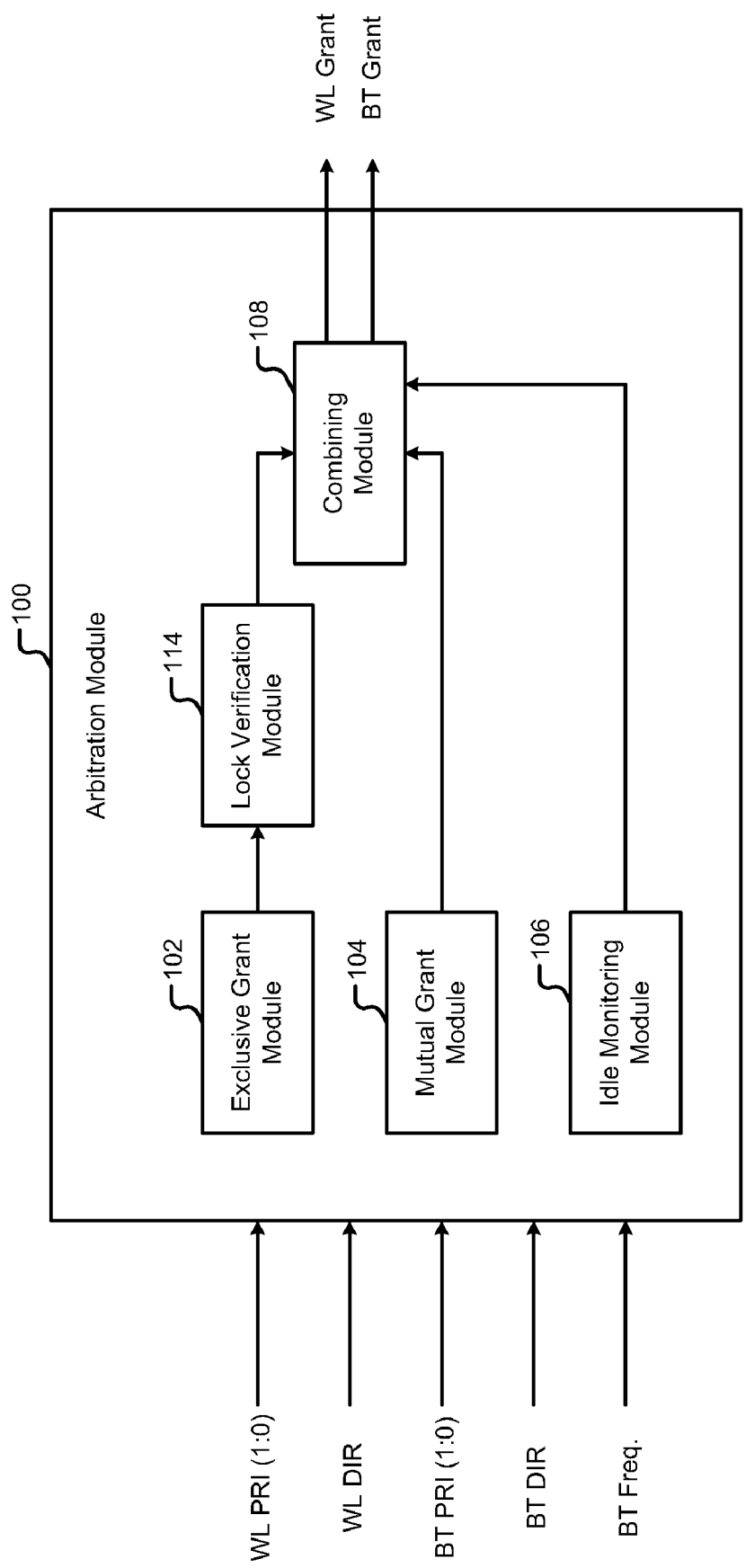
FIG. 4A is a functional block diagram of an arbitration module comprising separate exclusive grant and mutual grant modules.
Figure 4B:
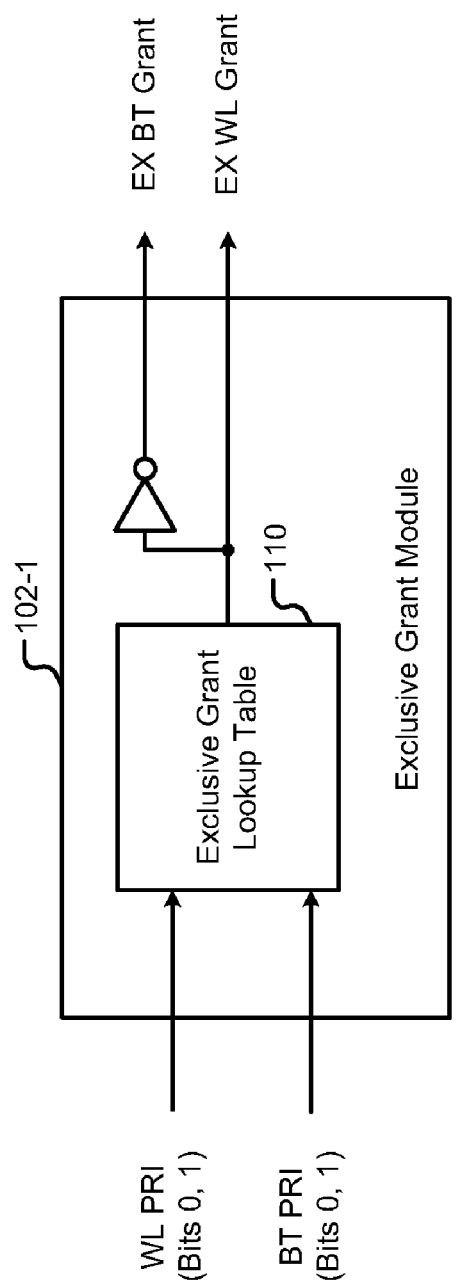
FIGS. 4B-4D are functional block diagrams of various exclusive grant modules.
Figure 4C:
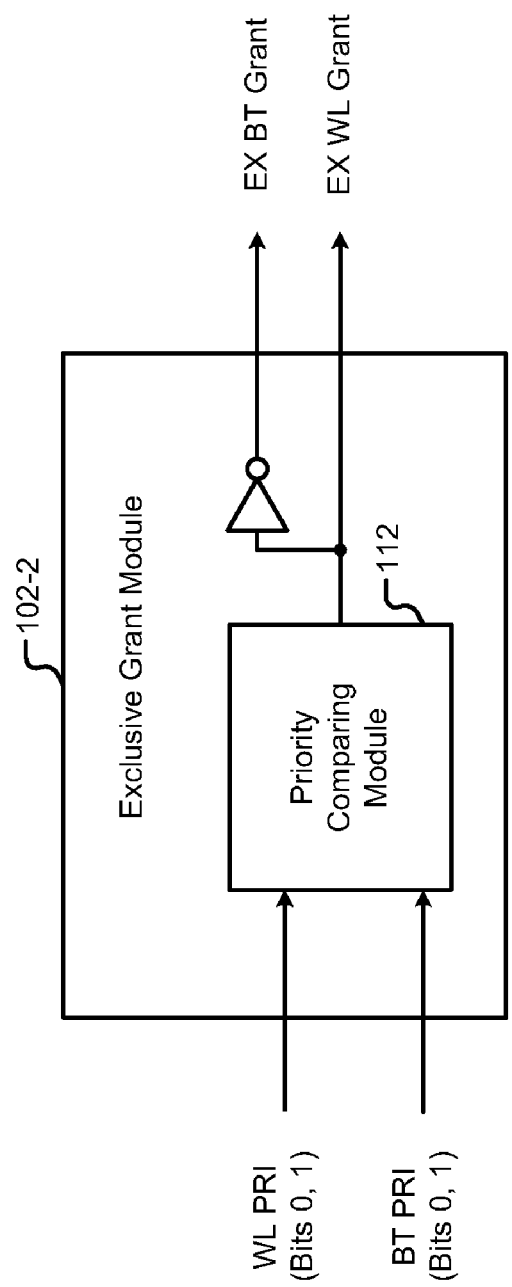
Figure 4D:
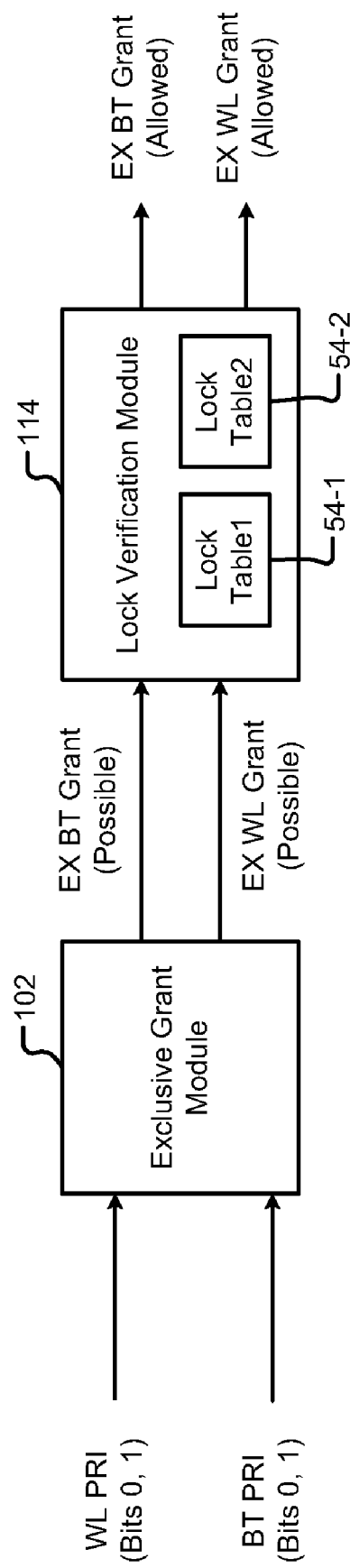
Figure 4E:
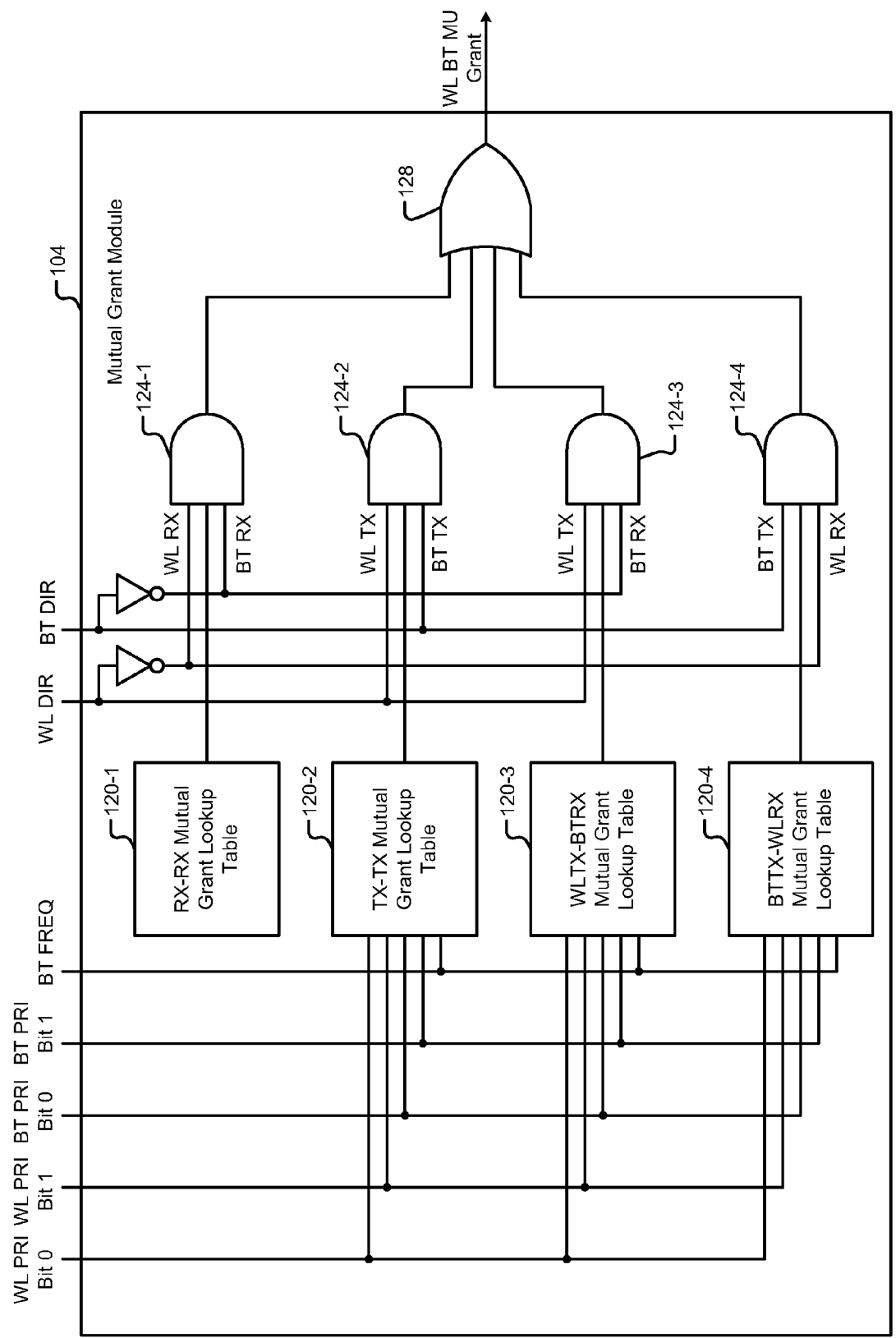
FIG. 4E is a functional block diagram of the mutual grant module of the arbitration module of FIG. 4A.
Figure 4F:
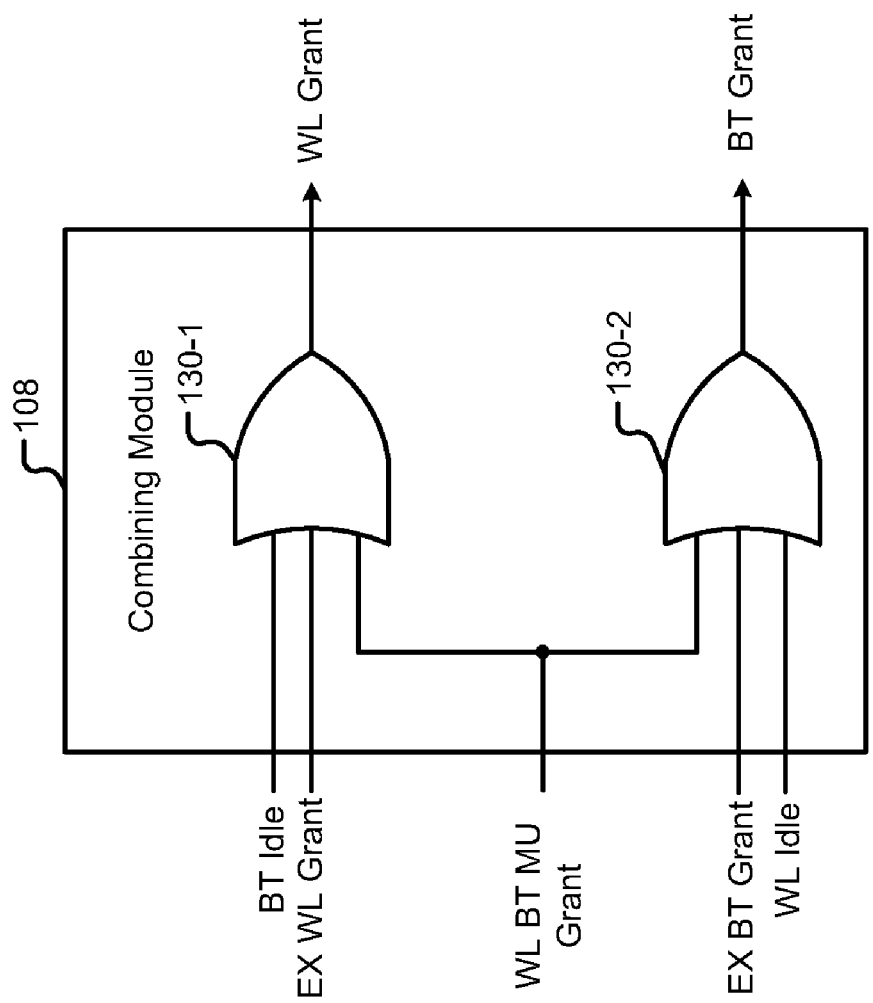
FIG. 4F is a functional block diagram of a combining module used by the arbitration module of FIG. 4A.
Figure 5A:
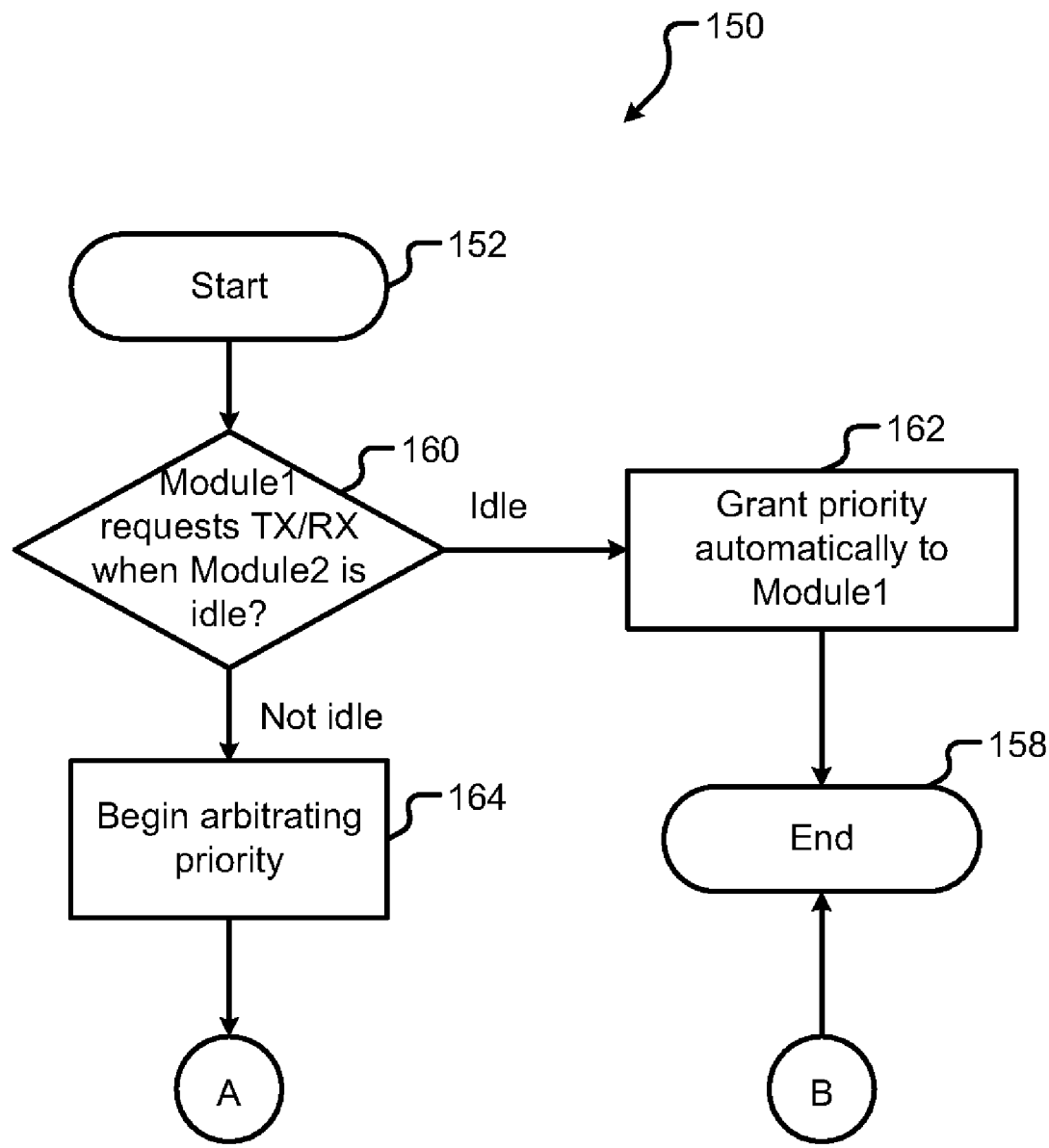
FIGS. 5A-5C are flowcharts of a method for arbitrating priorities using exclusive grant and mutual grant signals.
Figure 5B:
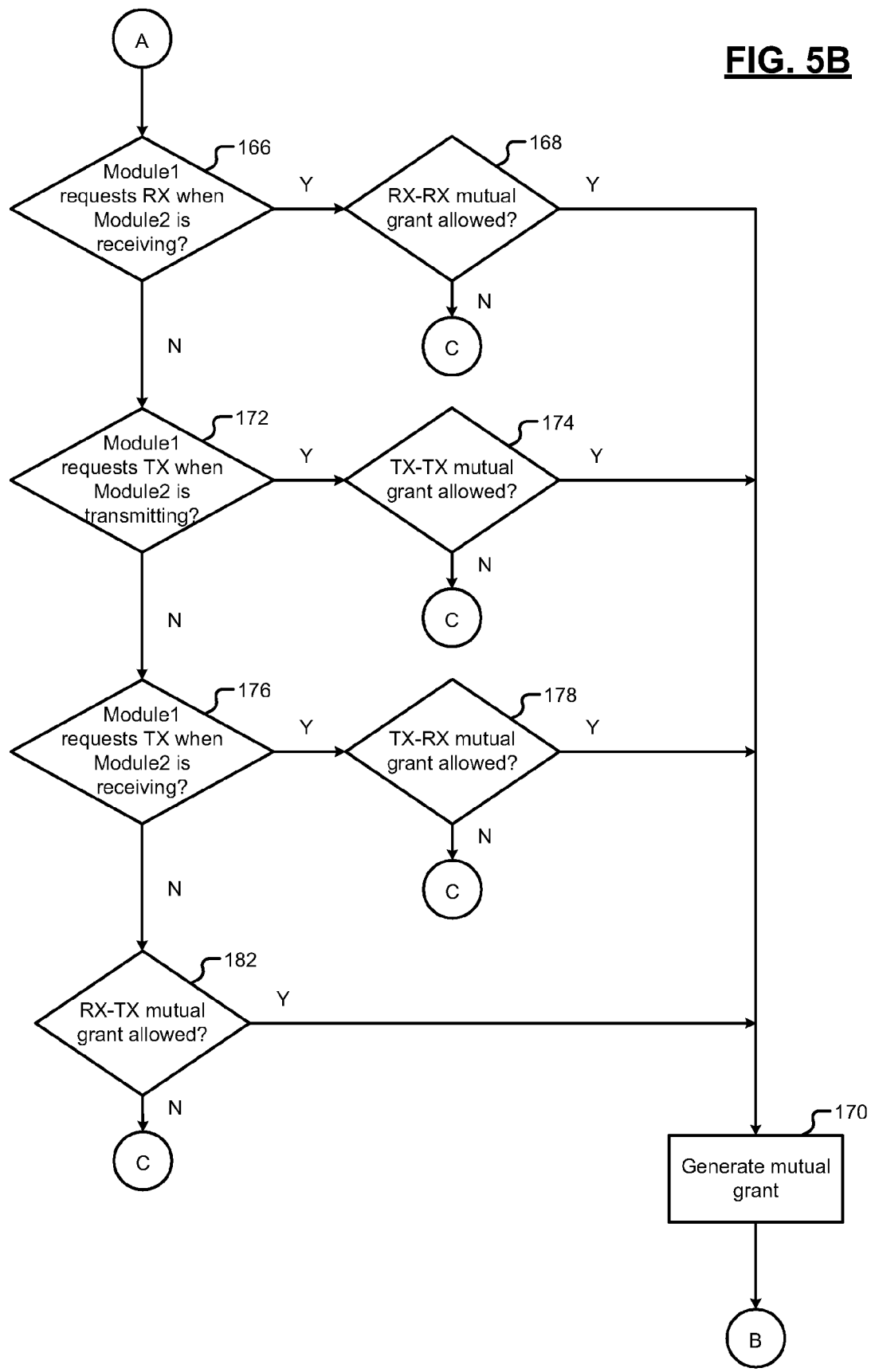
Figure 5C:
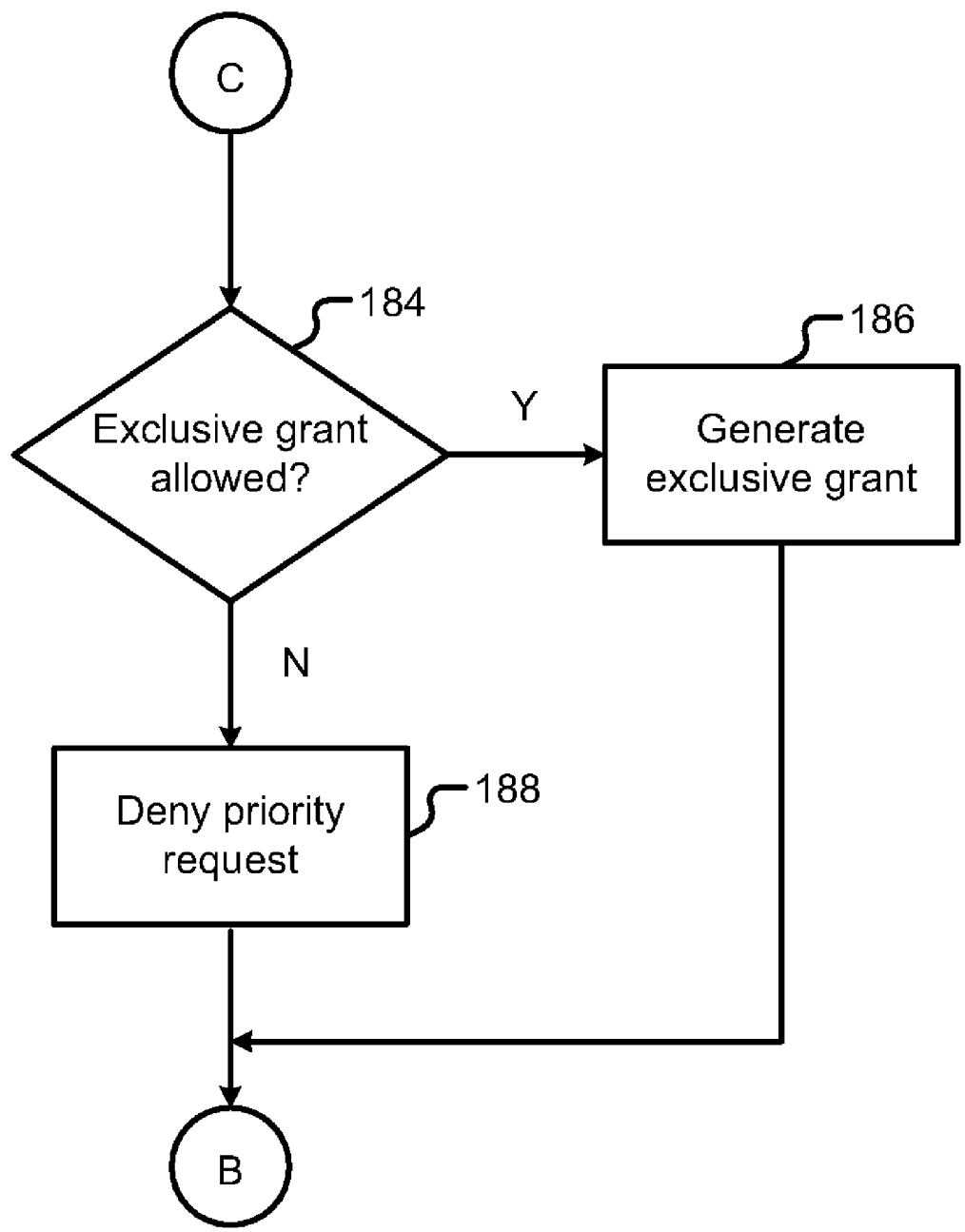

Data loss can be reduced by arbitrating priority between different wireless communication modules of a wireless network device (device) when the device attempts to communicate simultaneously via two or more communication modules. This disclosure relates to various systems and methods for arbitrating priority between different communication modules of the device when the device attempts to communicate simultaneously via two or more communication modules. The detailed description is organized as follows:

FIGS. 1A-1C show devices having different communication modules and antenna configurations. FIG. 2A shows a device having two communication modules and an arbitration module that uses lookup and lock tables to arbitrate priorities between the communication modules. FIGS. 2B and 2C show lookup tables. FIGS. 2D and 2E show lock tables in detail. FIGS. 2F and 2G show lock tables. FIG. 3 shows a method for arbitrating priority using the lookup and lock tables. FIG. 4A shows a device having two communication modules and an arbitration module that uses separate exclusive and mutual grant modules to arbitrate priorities. FIGS. 4B-4D show different configurations of an exclusive grant module. FIG. 4E shows a mutual grant module. FIG. 4F shows a combining module that combines signals generated by the exclusive and mutual grant modules. FIGS. 5A-5C show a method for arbitrating priority by generating exclusive and mutual grants.

Figure 6A:
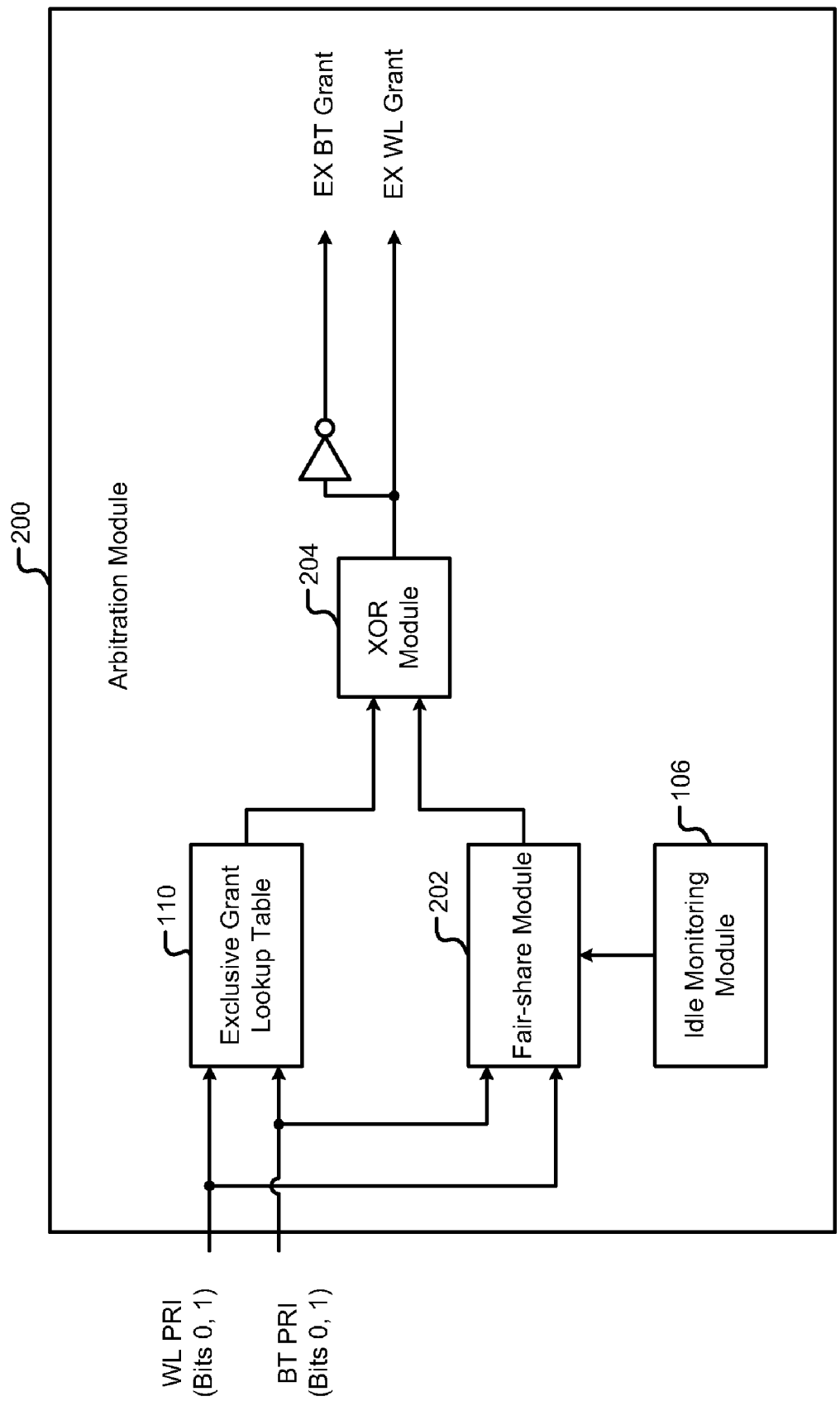
FIG. 6A is a functional block diagram of an arbitration module comprising a priority resolution module.
Figure 6B:
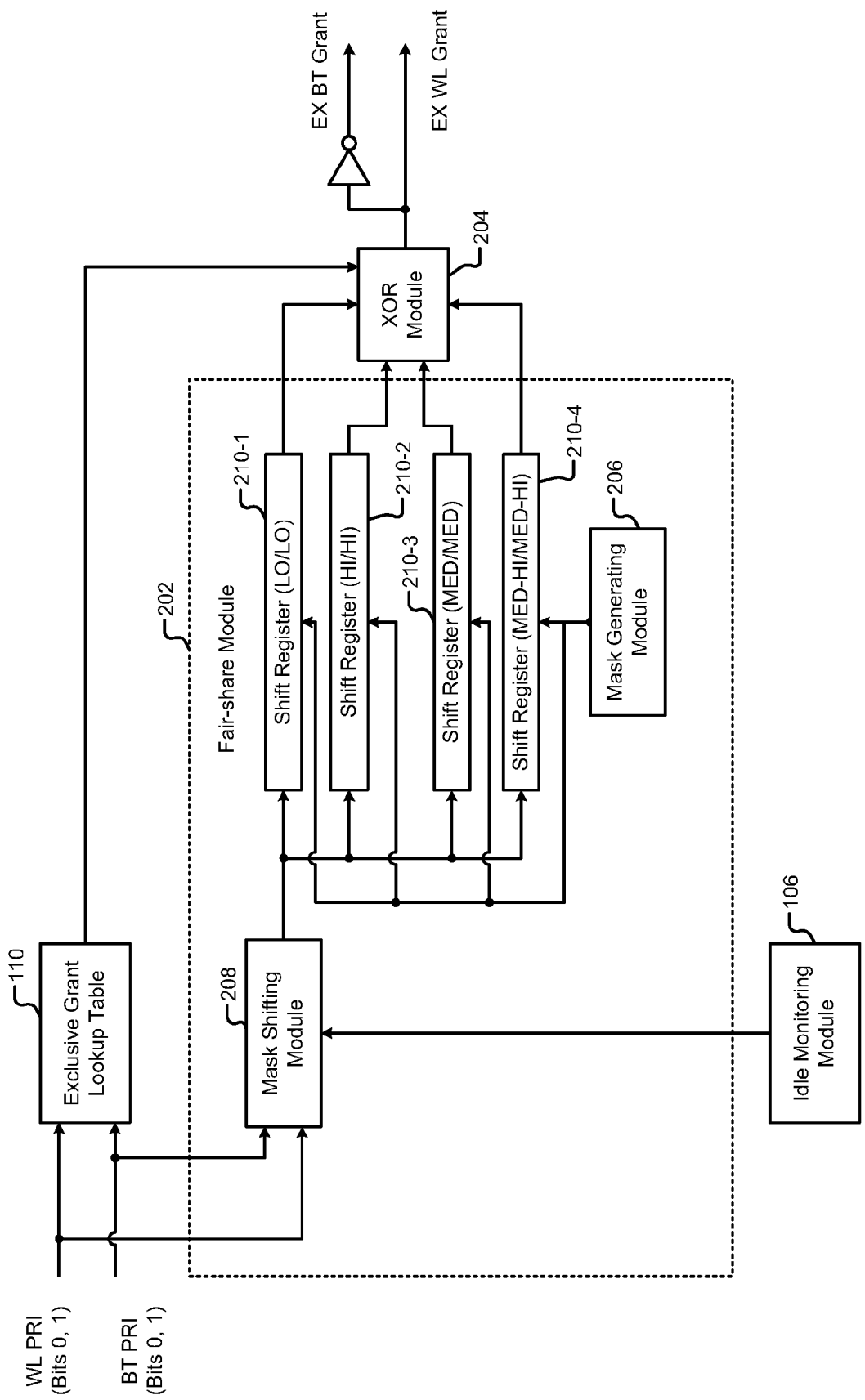
FIG. 6B is a functional block diagram of the priority resolution module of FIG. 6A.
Figure 6C:
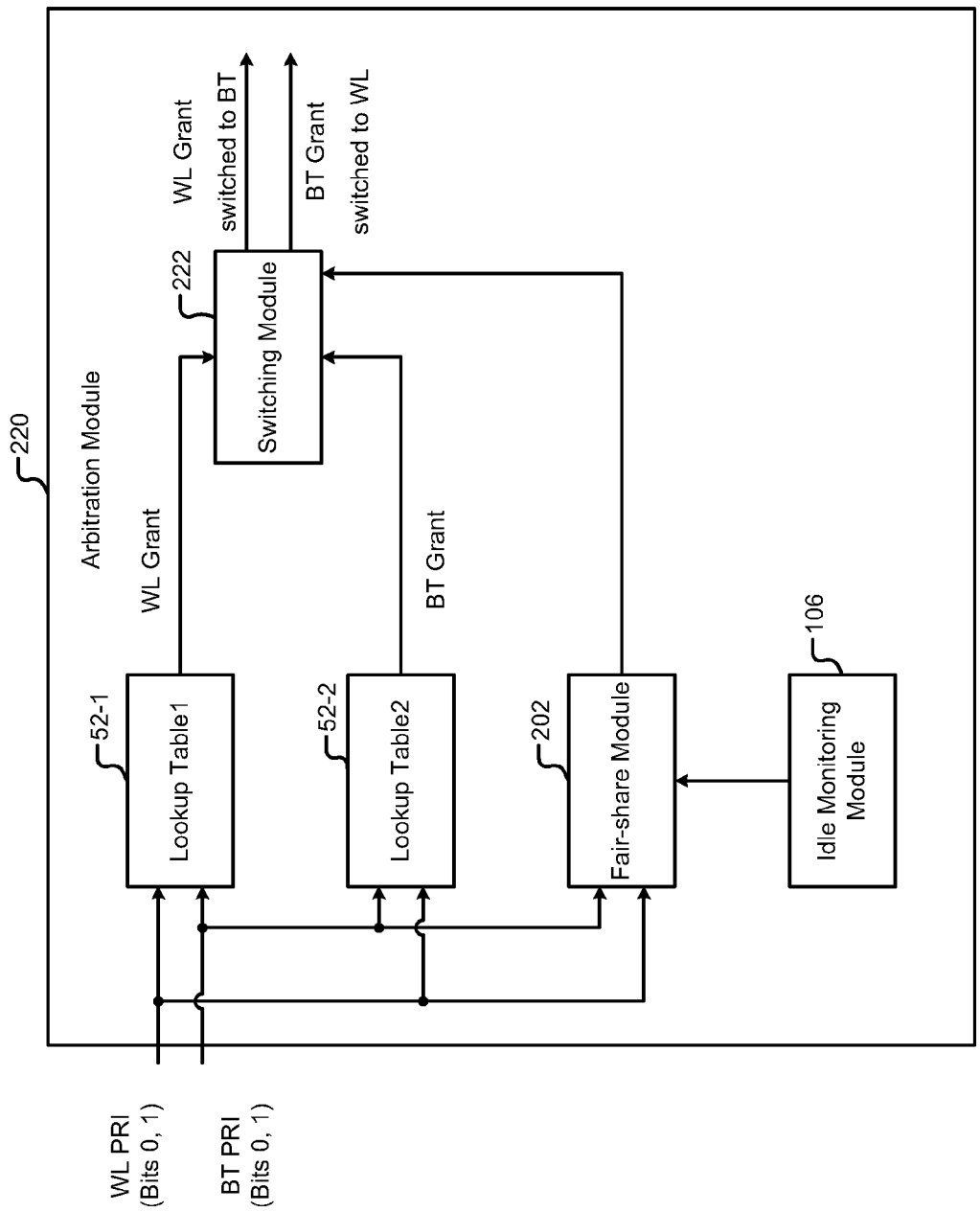
FIG. 6C is a functional block diagram of an arbitration module comprising the priority resolution module of FIG. 6A and a switching module.
Figure 7:
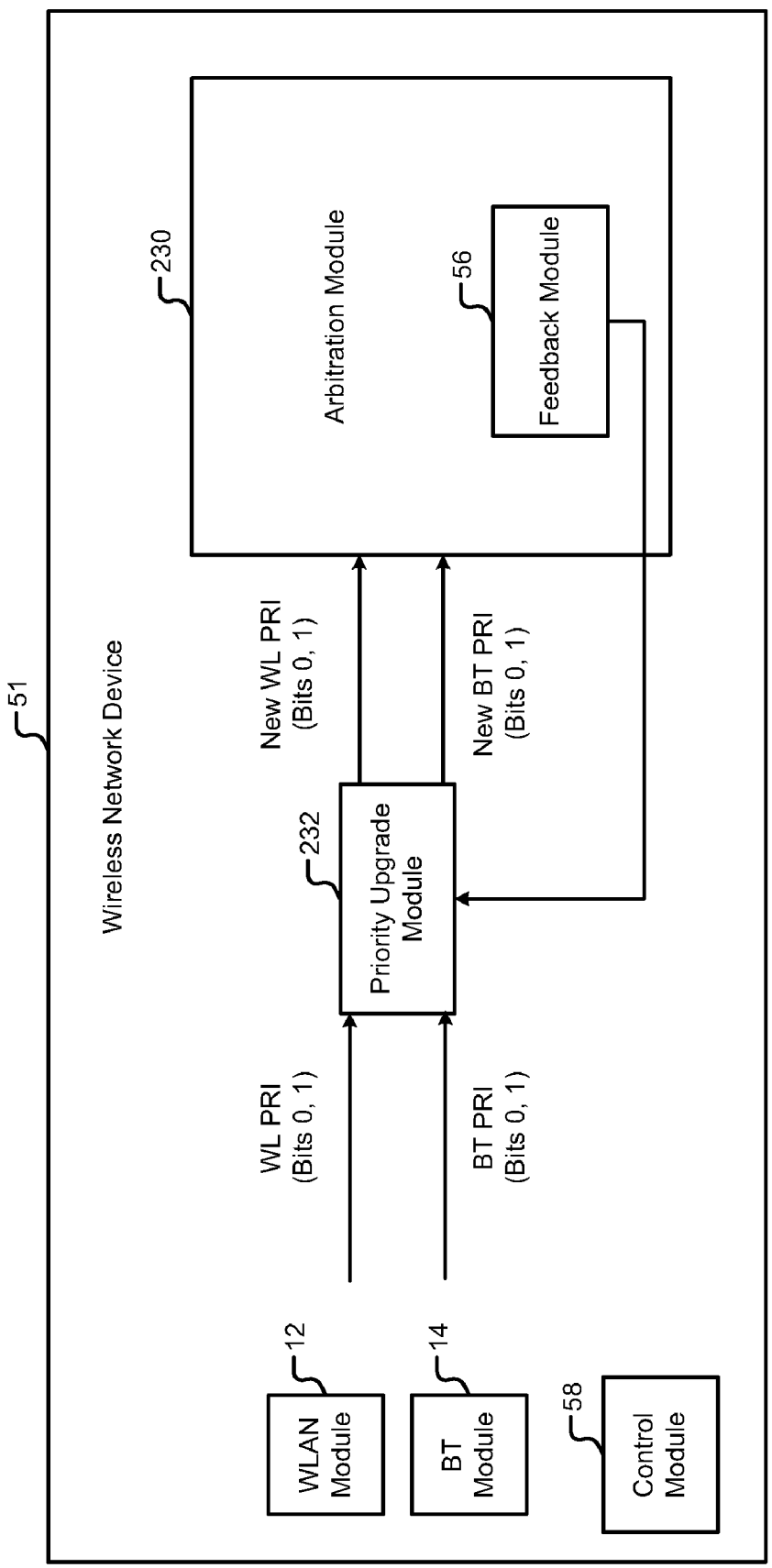
FIG. 7 is a functional block diagram of a wireless network device comprising a priority upgrade module.

FIG. 6A shows an arbitration module that includes a priority resolution module that resolves equal priority grants. FIG. 6B shows the priority resolution module in detail. FIG. 6C shows an arbitration module having a switching module that switches priority from one communication module to another. FIG. 7 shows a device having a priority upgrade module that upgrades priority requested by a communication module before an arbitration module arbitrates priorities.

Figure 8A:
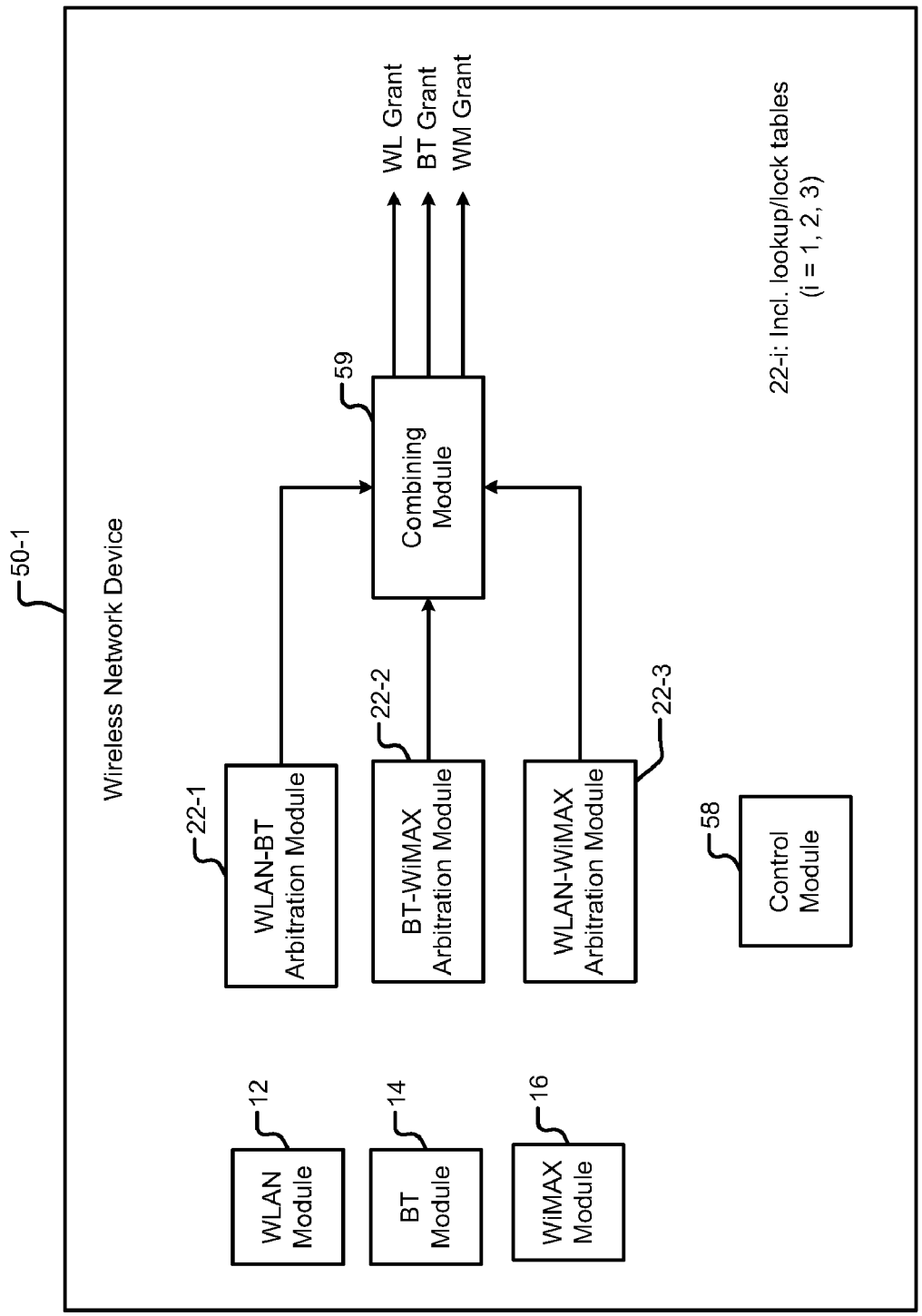
FIG. 8A is a functional block diagram of a wireless network device comprising three communication modules and three arbitration modules.
Figure 8B:
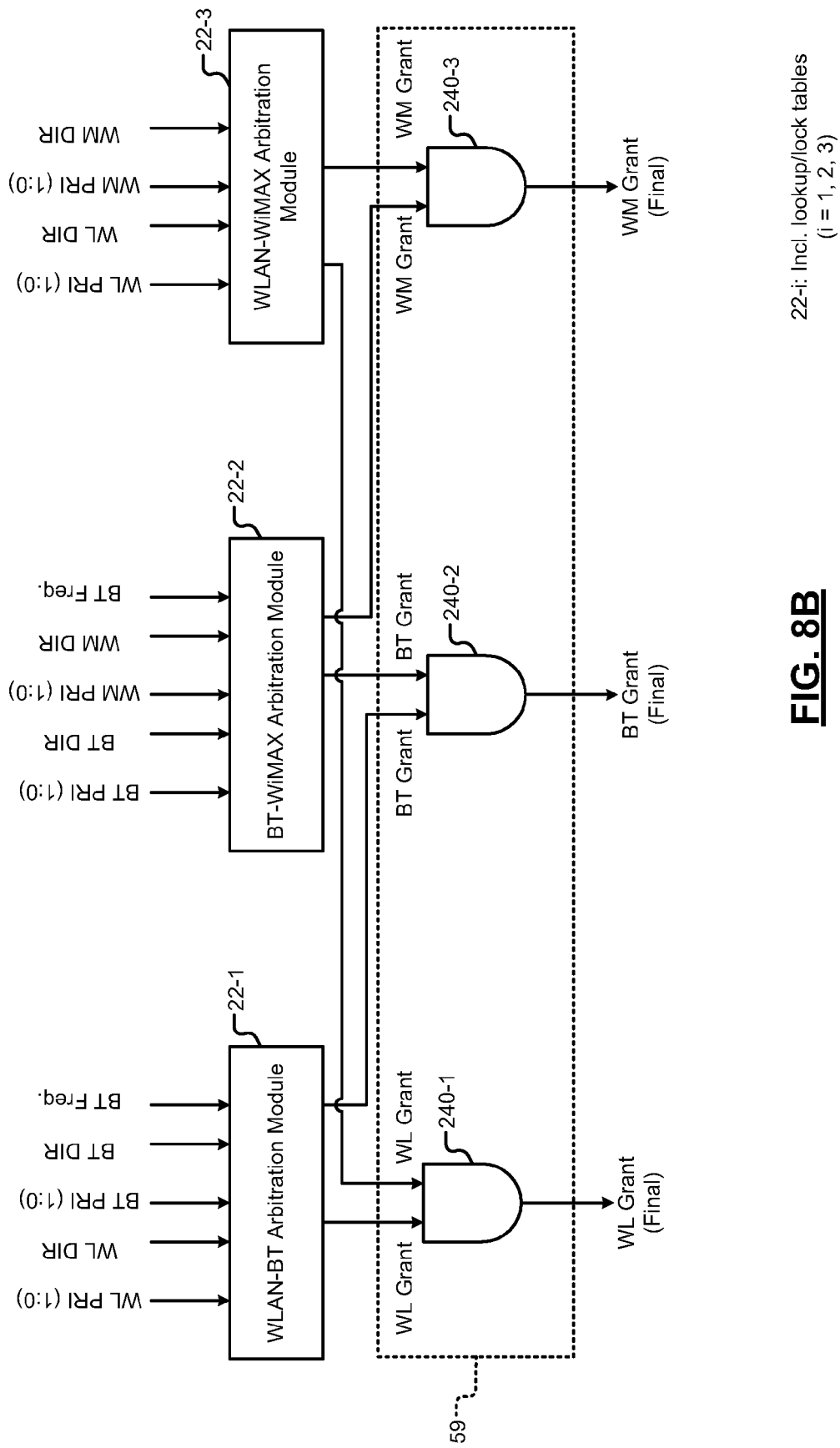
FIG. 8B is a functional block diagram of the three arbitration modules of FIG. 8A.
Figure 8C:
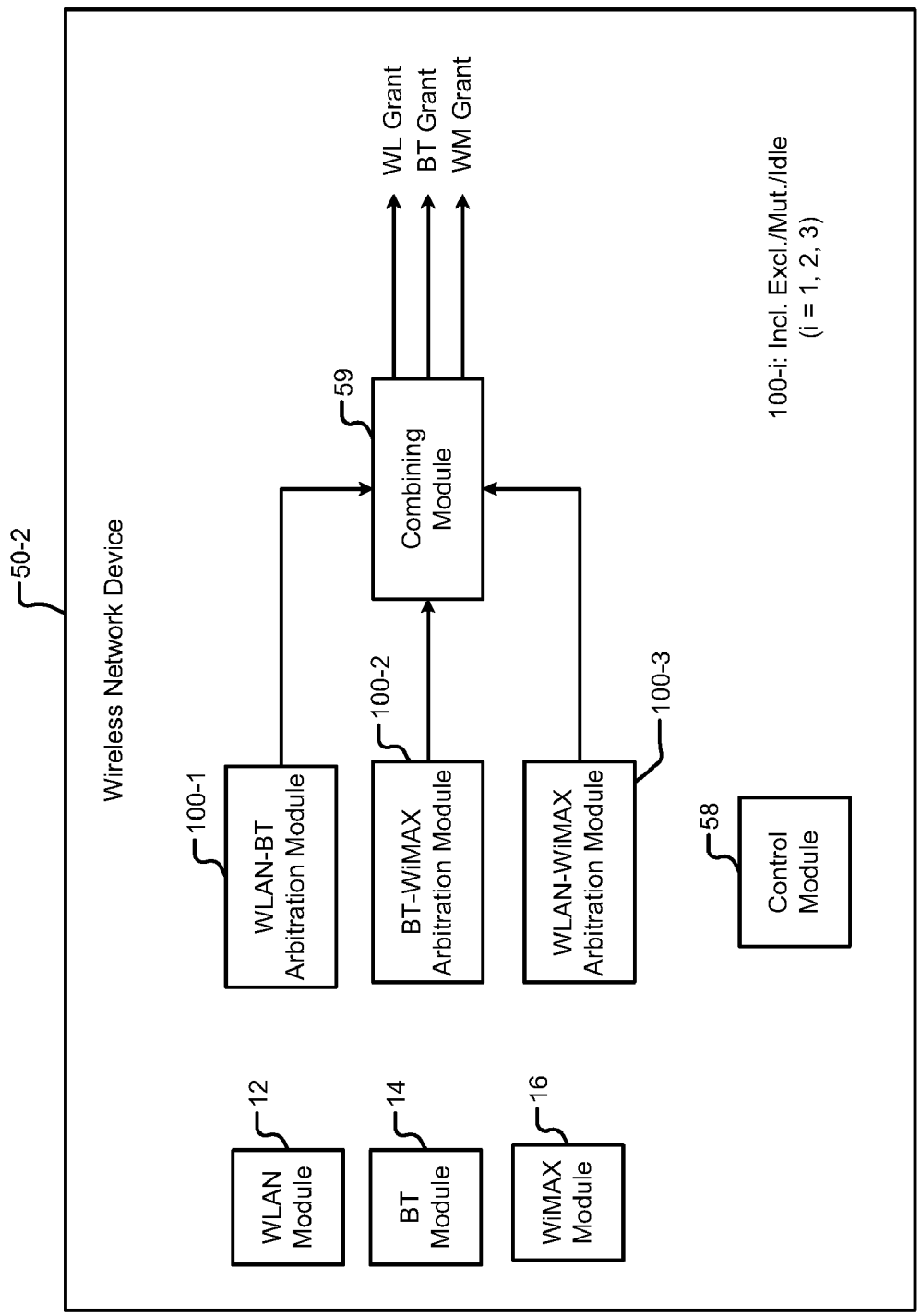
FIG. 8C is a functional block diagram of a wireless network device comprising three communication modules and three arbitration modules.
Figure 8D:
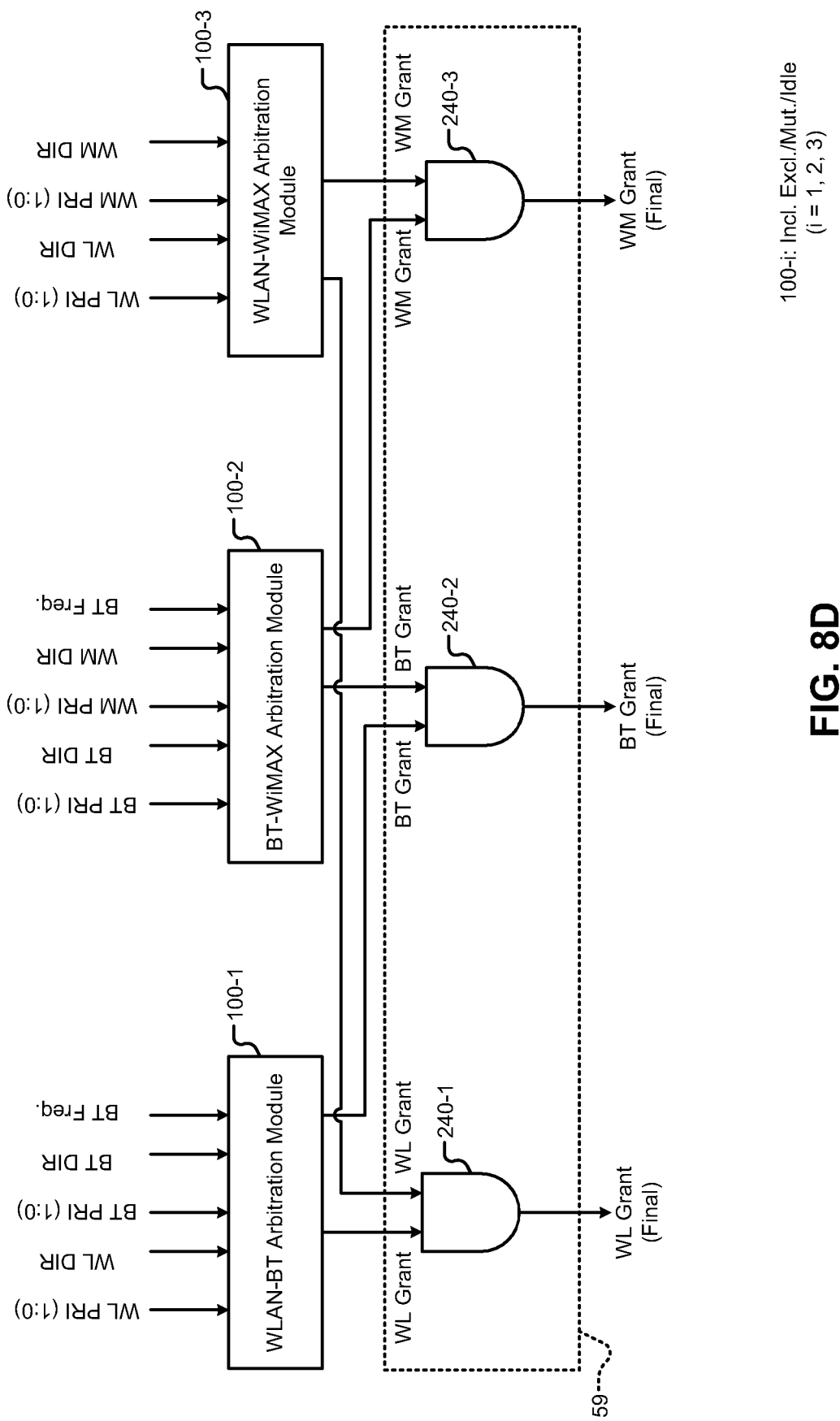
FIG. 8D is a functional block diagram of the three arbitration modules of FIG. 8C.
Figure 9A:
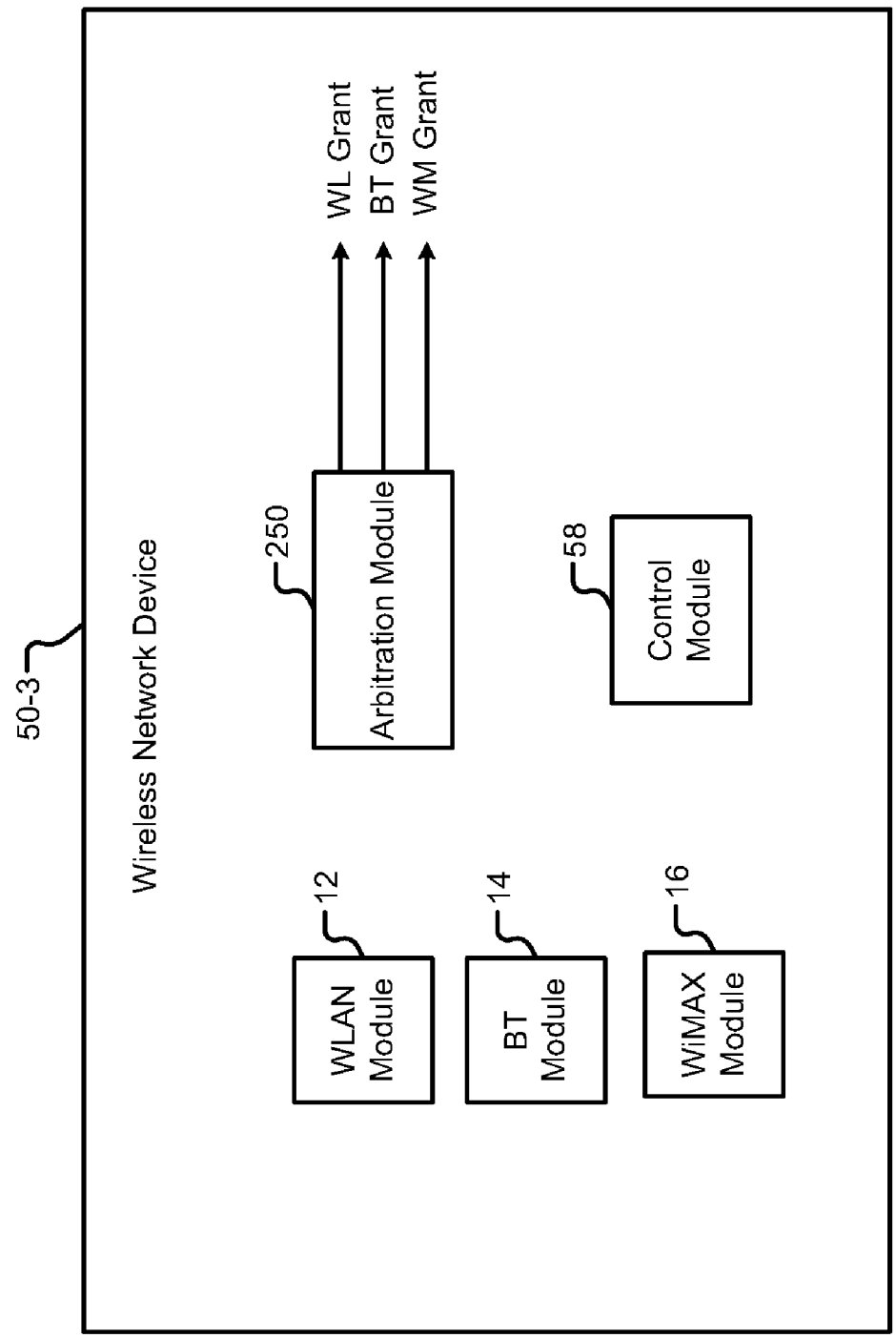
FIG. 9A is a functional block diagram of a wireless network device comprising three communication modules and an arbitration module.
Figure 9B:
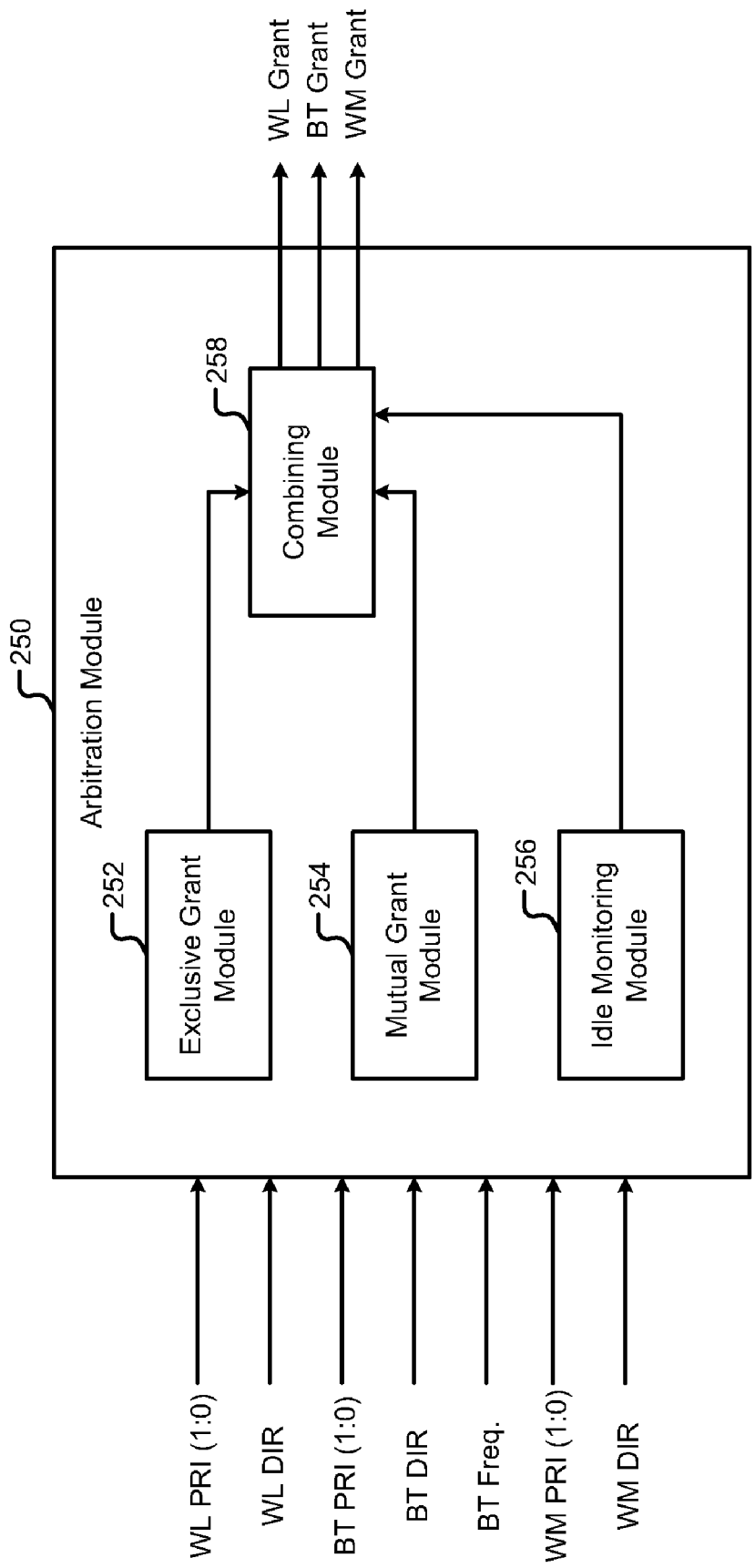
FIG. 9B is a functional block diagram of the arbitration module of FIG. 9A.
Figure 9C:
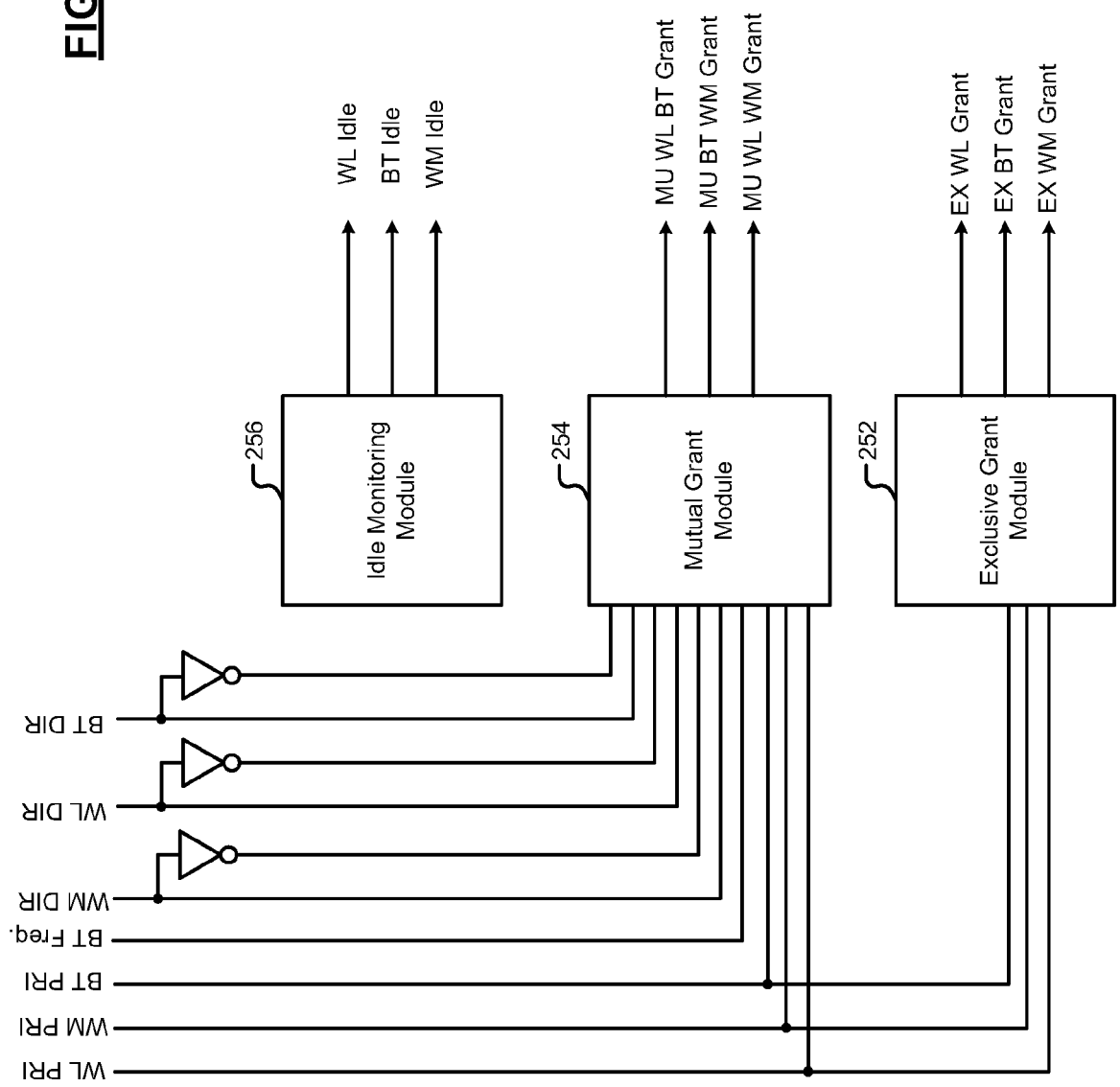
FIG. 9C is a functional block diagram of exclusive and mutual grant modules of the arbitration module of FIG. 9A.
Figure 9D:
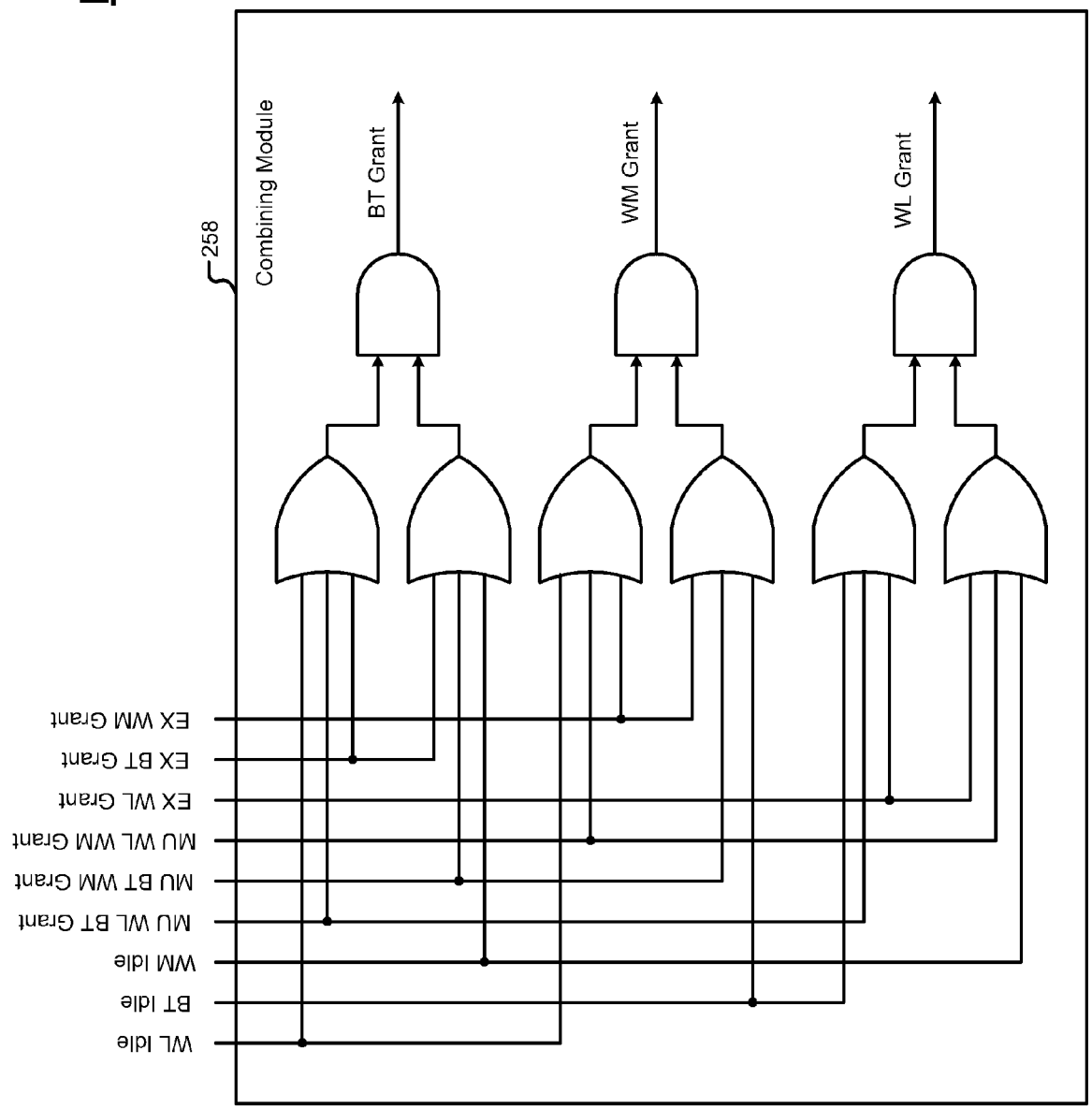
FIG. 9D is a functional block diagram of a combining modules used by the arbitration module of FIG. 9A.

FIG. 8A shows a device having three communication modules and three arbitration modules that arbitrate priorities using lookup and lock tables. FIG. 8B shows the three arbitration modules. FIG. 8C shows a device having three communication modules and three arbitration modules that use separate exclusive and mutual grant modules. FIG. 8D shows the three arbitration modules. FIG. 9A shows a device having three communication modules and a single arbitration module that arbitrates priorities using separate exclusive and mutual grant modules. FIG. 9B shows the arbitration module in detail. FIG. 9C shows generation of exclusive and mutual grants. FIG. 9D shows arbitration of priorities using the exclusive and mutual grants.

Referring now to FIGS. 1A-1C, devices having different communication modules and antenna configurations are shown. In FIG. 1A, a device 10 comprises a wireless local area network (WLAN) module 12, a Bluetooth® (BT) module 14, a Worldwide Interoperability for Microwave Access (WiMAX) module 16, an antenna 18, an antenna switching module 20, and an arbitration module 22. The WLAN module 12 complies with an I.E.E.E. 802.11 standard. The BT module 14 complies with the BT standard. The WiMAX module 16 complies with the WiMAX standard. The I.E.E.E. 802.11, Bluetooth®, and WiMAX standards are incorporated herein by reference in their entirety.

The WLAN module 12, the BT module 14, and the WiMAX module 16 (hereinafter the modules 12, 14, and 16) share the antenna 18 when transmitting and/or receiving data. The antenna switching module 20 switches the antenna 18 to one of the modules 12, 14, and 16 when the device 10 transmits or receives data via one of the modules 12, 14, and 16, respectively. Occasionally, two or more modules may simultaneously transmit/receive data via the same antenna depending on how the front-end couples the data paths. The arbitration module 22 determines which of the modules 12, 14, and 16 gains priority to transmit or receive data when two or more of the modules 12, 14, and 16 generate requests to transmit and/or receive a data packet.

In FIGS. 1B and 1C, examples of devices having multiple antennas are shown. When multiple antennas are used, two or more of the modules 12, 14, and 16 may sometimes transmit and/or receive data simultaneously. Occasionally, however, priorities have to be arbitrated between the modules 12, 14, and/or 16 to prevent data loss.

In FIG. 1B, the modules 12, 14, and 16 of a device 30 communicate via antennas 32, 34, and 36, respectively. The arbitration module 22 determines which of the modules 12, 14, and 16 gains priority to transmit and/or receive data when two or more of the modules 12, 14, and 16 generate requests to simultaneously transmit and/or receive a data packet.

In FIG. 1C, the WLAN module 12 of a device 40 communicates via a plurality of antennas (e.g., antennas 42 and 44). The BT and WiMAX modules 14 and 16 of the device 40 communicate via antennas 46 and 48, respectively. Alternatively or additionally, the BT and/or WiMAX modules 14, 16 may communicate via at least one of the antennas 42 and 44. The device 40 may use an antenna switching module (not shown) to switch the antennas 42, 44 to one of the modules 12, 14, and 16 when the modules 12, 14, and/or 16 share the antennas 42, 44. The arbitration module 22 determines which of modules 12, 14, and 16 gains priority to transmit and/or receive data when two or more of the modules 12, 14, and 16 generate requests to simultaneously transmit and/or receive a data packet.

Referring now to FIGS. 2A-2G, an example of the arbitration module 22 is shown in detail. In FIG. 2A, a device 50 comprises the WLAN module 12, the BT module 14, the arbitration module 22, and a control module 58. The device 50 may also include the WiMAX module 16, which is not shown for simplicity. The device 50 may comprise a single antenna or multiple antennas (both not shown).

The arbitration module 22 comprises lookup tables 52, lock tables 54, and a feedback module 56. The arbitration module 22 receives a plurality of inputs from the WLAN and BT modules 12, 14 when the WLAN and BT modules 12, 14 generate requests to communicate a packet. The arbitration module 22 uses the inputs, the lookup tables 52, and the lock tables 54 to grant priority to one or both of the WLAN and BT modules 12, 14 when the WLAN and BT modules 12, 14 generate requests to simultaneously transmit and/or receive a data packet.

For example only, the inputs include WLAN Direction (WL DIR, 1 bit), WLAN Priority (WL PRI, 2 bits), BT Direction (BT DIR, 1 bit), BT Priority (BT PRI, 2 bits), and BT Frequency (BT FREQ, 1 bit). That is, the inputs include five types of inputs, namely the two directional inputs WL DIR and BT DIR each having 1 bit, two priority inputs each having 2 bits, and the BT FREQ input having 1 bit. Thus, the total number of inputs is seven since the WL PRI and BT PRI inputs include 2-bits each in the example shown. Generally, however, the WL PRI and BT PRI inputs may include N-bits each, where N is an integer greater than or equal to 1. Additionally, the BT FREQ input may not be used in some implementations, especially when the BT device uses adaptive frequency hopping (AFH). Accordingly, the size of the lookup tables 52 and the lock tables 54 may vary depending on the total number of inputs used and the number of bits used in some of the inputs.

The WL DIR and BT DIR signals indicate a direction of communication requested by the WLAN and BT modules 12, 14, respectively. The WL DIR and BT DIR signals include one bit (e.g., 1=transmit, 0=receive).

The WL PRI and BT PRI signals indicate a priority level of the communication requested by the WLAN and BT modules 12, 14, respectively. The WL PRI and BT PRI signals include two bits. For example, the WL PRI and BT PRI signals may include 00, 01, 10, and 11 when the priority is low, high, medium, and medium-high, respectively.

The BT frequency (BT FREQ) signal indicates when the frequency of the BT signal falls within or outside a WLAN frequency band. Accordingly, the BT FREQ input is also called a BT in-band/out-band input. The BT FREQ signal includes one bit (e.g., 1=in-band, 0=out-band).

In FIGS. 2B and 2C, the lookup tables 52 include a lookup table1 52-1 for the WLAN module 12 and a lookup table2 52-2 for the BT module 14, respectively. Based on the inputs and the lookup table1 52-1, the arbitration module 22 determines whether to grant or deny priority to the WLAN module 12. Based on the inputs and the lookup table2 52-2, the arbitration module 22 determines whether to grant priority to the BT module 14. The control module 58 configures the lookup tables 52 based on factors including antenna configuration of the device 50.

In FIGS. 2D and 2E, examples of the lookup tables 52 are shown. In FIG. 2D, the lookup table1 52-1 generates an output WL Grant based on the inputs received by the arbitration module 22. In FIG. 2E, the lookup table2 52-2 generates an output BT Grant based on the inputs received by the arbitration module 22. The outputs WL Grant and BT Grant are one bit each and indicate whether the arbitration module 22 can grant priority to the WLAN and BT modules 12, 14, respectively, for a particular set of inputs. For example, an output of 1 may indicate a grant, and an output of 0 may indicate no grant.

Since the arbitration module 22 receives a total of seven binary inputs, the lookup table1 52-1 and the lookup table2 52-2 each comprises $2^7=128$ input combinations. As shown in FIGS. 2D and 2E, for some input combinations, the arbitration module 22 may grant priority called an exclusive grant to only one of the WLAN and BT modules 12, 14. For other input combinations, depending on factors including antenna configuration and signal power level, the arbitration module 22 may grant priority called a mutual grant to both the modules 12 and 14 to communicate simultaneously. For example, when the device 50 includes multiple antennas, both the modules 12 and 14 may simultaneously transmit or receive data. Alternatively, one module may transmit and the other may simultaneously receive data.

When the arbitration module 22 can issue an exclusive grant to one module, the arbitration module 22 further determines whether the other module is communicating in a locked mode. A module communicates in the locked mode when the module is transmitting or receiving a packet, and the transmission or reception of the packet may not be interrupted. For example, the WLAN module 12 may communicate in the locked mode when transmitting a beacon or receiving an acknowledgement, the BT module 14 may communicate in the locked mode when transmitting data after receiving a grant to transmit, etc.

Since the transmission or reception of the module communicating in the locked mode may not be interrupted, the arbitration module 22 does not issue the exclusive grant to a first module when a second module is communicating in the locked mode. When the second module is not communicating in the locked mode, however, the arbitration module 22 may interrupt and stop the communication of the second module and grant exclusive priority to the first module.

The arbitration module 22 uses the lock tables 54 to determine whether the modules 12, 14 are communicating in the locked mode. The arbitration module 22 may include a lock table1 54-1 for the WLAN module 12 and a lock table2 54-2 for the BT module 14. Based on the inputs received by the arbitration module 22, the lock table1 54-1 and the lock table2 54-2 indicate when the WLAN and BT modules 12, 14 are communicating in the locked mode, respectively. The control module 58 may configure the lock tables 54 such that the communications of the modules 12, 14 that typically occur in the locked mode are assigned high priority.

In FIGS. 2F and 2G, examples of the lock table1 54-1 and the lock table2 54-2 are shown, respectively. For simplicity, only single bit priority inputs are shown (e.g., 0=low, 1=high). In FIG. 2F, the lock table1 54-1 determines a WL Lock Status of the WLAN module 12 based on the inputs received by the arbitration module 22. In FIG. 2G, the lock table2 54-2 determines a BT Lock Status of the BT module 14 based on the inputs received by the arbitration module 22. The outputs WL Lock Status and BT Lock Status include one bit and indicate whether the WLAN and BT modules 12, 14 are communicating in the locked mode, respectively, for a particular set of inputs. For example, an output of 1 may indicate that a module is communicating in the locked mode, and an output of 0 may indicate that the module is not communicating in the locked mode.

In use, the WLAN module 12 may generate a request to transmit or receive a packet. At the same time, the BT module 14 may generate a request to transmit and/or receive a packet. The arbitration module 22 may determine whether to grant priority to the request of the WLAN module 12 to transmit the packet depending on whether the WLAN module 12 also generates a request to receive a packet and/or whether the BT module 14 generates a request to simultaneously transmit and/or receive a packet.

The arbitration module 22 may analyze the priority and direction inputs received from the WLAN and BT modules 12, 14 using the lookup tables 52 and the lock tables 54. Accordingly, the arbitration module 22 may determine whether to grant priority to the WLAN module 12 to transmit the packet. For example, the arbitration module 22 may grant priority to the WLAN module 12 to transmit the packet exclusive of all other requests (i.e., the exclusive grant). Alternatively, the arbitration module 22 may grant priority to the WLAN module 12 to transmit or receive the packet while simultaneously granting priority to the BT module 14 to transmit or receive a packet (i.e., the mutual grant).

For example, when the device 50 includes multiple antennas, the mutual grant may allow both the WLAN and BT modules 12, 14 to simultaneously transmit or receive packets. Alternatively, the mutual grant may allow one module to transmit and the other module to simultaneously receive packets depending on the power levels of transmit and receive signals.

When the arbitration module 22 can grant exclusive priority to the WLAN module 12, the arbitration module 22 further determines whether the BT module 14 is transmitting or receiving data in the locked mode. The arbitration module 22 uses the lock table2 54-2 for the BT module 14 and determines whether the BT module 14 is transmitting or receiving data in the locked mode based on the inputs received from the BT module 14. The arbitration module 22 does not grant exclusive priority to the WLAN module 12 to transmit the packet when the lock table2 54-2 indicates that the BT module 14 is communicating in the locked mode. On the other hand, the arbitration module 22 grants exclusive priority to the WLAN module 12 by interrupting and stopping the communication of the BT module 14 when the lock table2 54-2 indicates that the BT module 14 is not communicating in the locked mode.

The feedback module 56 stores and updates various statistics. For example, the feedback module 56 stores and updates a request statistic of a module when the module generates requests to transmit and receive a packet. The feedback module 56 stores and updates a grant statistic and a lost grant statistic of a module when the arbitration module 22 grants or denies priority to the module. The feedback module 56 stores and updates a stop statistic of a module when the arbitration module 22 interrupts and stops the communication of the module.

The feedback module 56 provides feedback of the statistics to the control module 58. The control module 58 uses the feedback to dynamically adjust the lookup tables 52. Additionally, the control module 58 uses the feedback to dynamically adjust various communication parameters including data transmission rate and transmit power level of the device. For example, the control module 58 may select the highest possible data rate to transmit data via the WLAN and BT modules 12, 14. Specifically, the control module 58 may select the highest data rate based on the number of transmit requests generated by the modules 12, 14, the number of requests granted or denied priority, the number of times packets are retransmitted because priority is denied, and the number of times the transmission is interrupted and stopped.

Referring now to FIG. 3, an exemplary method 60 for arbitrating priority using the lookup and lock tables 52, 54 is shown. In the example shown, modules A and B include the WLAN and BT modules 12, 14, respectively. Alternatively, modules B and A can include the WLAN and BT modules 12, 14, respectively.

The method 60 begins in step 62. In step 63, module A is in an idle state (i.e., neither transmitting nor receiving packets). The arbitration module 22 receives a request from module A to communicate (i.e., to transmit or receive) a packet in step 64. The feedback module 56 updates the request statistic of module A in step 66 based on the direction of the communication requested. For example, the feedback module 56 increments the number of times module A generated a request to transmit or receive a packet.

The arbitration module 22 determines in step 68 whether module B is in the idle state. If the result of step 68 is true, the arbitration module 22 grants priority to module A in step 70, module A completes requested communication in step 72, and the method 60 returns to step 63. If the result of step 68 is false, the arbitration module 22 determines in step 74 whether a mutual grant can be issued to module A based on the inputs received and the lookup tables 52. If the result of step 74 is true (e.g., when multiple antennas are used), the arbitration module 22 generates the mutual grant and grants priority to module A in step 70. Module A completes requested communication in step 72, and the method 60 returns to step 63.

If the result of step 74 is false, the arbitration module 22 determines in step 76 whether an exclusive grant can be issued to module A based on the inputs received and the lookup tables 52. If the result of step 76 is true, the arbitration module 22 determines in step 78 whether module B is in the locked mode based on the inputs received and the lock table2 54-2. If the result of step 78 is false, the arbitration module 22 stops communication of module B, generates the exclusive grant, and grants priority to module A in step 80. The feedback module 56 updates the stop statistic of module B in step 82 based on the direction of communication of module B. For example, the feedback module 56 increments the number of times the communication of module B is interrupted and stopped when module B is transmitting or receiving a packet. Module A completes requested communication in step 72, and the method 60 returns to step 64.

If the result of step 76 is false, or if the result of step 78 is true, the arbitration module 22 denies priority to module A in step 83. The feedback module 56 updates the lost grant statistic of module A in step 84 based on the direction of communication requested. For example, the feedback module 56 increments the number of times module A is not granted priority to transmit or receive a packet. The arbitration module 22 determines in step 86 whether module A has deasserted the request. When the result of step 86 is true, the method 60 returns to step 63.

Referring now to FIGS. 4A-4F, an arbitration module 100 determines whether to grant priority to the WLAN and/or BT modules 12, 14 using lookup tables that are different than the lookup tables 52. Specifically, the lookup tables of the arbitration module 100 do not use direction inputs received from the WLAN and BT modules 12, 14. Instead, the lookup tables of the arbitration module 100 use only the priority inputs WL PRI and BT PRI and the BT FREQ input received from the WLAN and BT modules 12, 14. Accordingly, the lookup tables of the arbitration module 100 have fewer input combinations than the lookup tables 52 of the arbitration module 22.

In FIG. 4A, the arbitration module 100 comprises an exclusive grant module 102, a lock verification module 114, a mutual grant module 104, an idle monitoring module 106, a combining module 108, and the control module 58. The arbitration module 100 receives the inputs WL DIR, WL PRI, BT DIR, BT PRI, and BT FREQ from the WLAN and BT modules 12, 14. The arbitration module 100 generates WL Grant and BT grant signals having binary states that indicate whether the WLAN and/or BT modules 12, 14 are granted priority. For example, each of the WL Grant and BT Grant signals may be 1 or 0 indicating a grant or a denial of priority to the WLAN and BT modules 12, 14, respectively.

The exclusive grant module 102 determines whether the exclusive grant can be issued to one of the WLAN and BT modules 12, 14 when one of the modules 12, 14 generates a request to transmit or receive a packet. The exclusive grant module 102 generates EX WL Grant and EX BT Grant signals that indicate whether the exclusive grant can be issued to one of the WLAN and BT modules 12, 14. The lock verification module 114 determines using the lock tables 54 whether one of the WLAN and BT modules 12, 14 is operating in the locked mode. When one of the WLAN and BT modules 12, 14 is operating in the locked mode, the lock verification module 114 prohibits the exclusive grant allowed by the exclusive grant module 102 to be issued.

The mutual grant module 104 determines whether a mutual grant can be issued to the WLAN and BT modules 12, 14. The mutual grant module 104 generates a MU Grant signal indicating whether the mutual grant can be issued to the WLAN and BT modules 12, 14. The idle monitoring module 106 monitors whether the WLAN and/or BT modules 12, 14 are in the idle state and generates signals indicating whether the WLAN and/or BT modules 12, 14 are in the idle state. The combining module 108 combines the signals generated by the exclusive grant module 102, the mutual grant module 104, and the idle monitoring module 106 and generates the WL Grant and BT grant signals.

In FIGS. 4B-4E, four different exclusive grant modules 102-1, 102-2, 102-3, and 102-4 are shown, respectively. In FIG. 4B, the exclusive grant module 102-1 comprises an exclusive grant look up table 110. The exclusive grant lookup table 110 uses only the WL PRI and BT PRI inputs. The exclusive grant module 102-1 determines whether the exclusive grant can be issued to one of the WLAN and BT modules 12, 14 based on the WL PRI and BT PRI inputs. The exclusive grant module 102-1 generates the EX WL Grant and EX BT Grant signals. The EX WL Grant and EX BT Grant signals have opposite binary values. For example, when EX WL Grant=1 (i.e., when EX BT Grant=0), the exclusive grant may be issued to the WLAN module 12 and not to the BT module 14.

In FIG. 4C, the exclusive grant module 102-2 uses a priority comparing module 112 instead of the exclusive grant lookup table 110. The priority comparing module 112 compares the WL PRI and BT PRI inputs to determine whether the exclusive grant can be issued to one of the WLAN and BT modules 12, 14. For example, the exclusive grant module 102-2 may generate the EX WL Grant signal to be true when the priority comparing module 112 determines that WL PRI BT PRI.

In FIG. 4D, the lock verification module 114 uses the lock tables 54 and verifies whether the WLAN and/or BT modules 12, 14 are communicating in the locked mode when the exclusive grant module 102-3 generates the EX WL Grant and EX BT Grant signals. The lock verification module 114 allows the exclusive grant to be issued to one of the WLAN and BT modules 12, 14 only if the other of the WLAN and BT modules 12, 14 is not communicating in the locked mode.

In FIG. 4E, the mutual grant module 104 comprises a RX-RX mutual grant lookup table 120-1, a TX-TX mutual grant lookup table 120-2, a WLTX-BTRX mutual grant lookup table 120-3, and a BTTX-WLRX mutual grant lookup table 120-4 (collectively mutual grant lookup tables 120). The mutual grant lookup table 120-1 does not use any of the priority or direction inputs. The mutual grant lookup tables 120-2, 120-3, and 120-4 use only the WL PRI, BT PRI, and BT FREQ inputs. The mutual grant lookup table 120-1 may simply output a 0 or a 1 depending on whether a mutual grant to simultaneously receive data is allowed. The mutual grant lookup table 120-2 determines whether a mutual TX-TX grant is allowed. The mutual grant lookup table 120-3 determines whether a mutual WLTX-BTRX grant is allowed. The mutual grant lookup table 120-4 determines whether a mutual BTTX-WLRX grant is allowed.

Additionally, the mutual grant module 104 comprises AND gates 124-1, . . . , and 124-4 (collectively AND gates 124) and an OR gate 128. The AND gates 124 receive the outputs of the mutual grant lookup tables 120, respectively. Additionally, the AND gates 124 receive the WL DIR and BT DIR inputs as shown. The OR gate 128 ORs the outputs of the AND gates 124 to generate a WL BT MU Grant signal. The WL BT MU Grant signal indicates whether the mutual grant can be issued to the WLAN and BT modules 12, 14.

In use, when one of the WLAN and BT modules 12, 14 generates a request to receive data while the other module is receiving data, the mutual grant module 104 looks up the mutual grant lookup tables 120. An output of the RX-RX mutual grant lookup table 120-1 indicates whether the request to simultaneously receive data can be granted (i.e., if the mutual grant is allowed). Based on the WL DIR and BT DIR inputs, the AND gate 124-1 passes the output of the RX-RX mutual grant lookup table 120-1 to the OR gate 128. Based on the WL DIR and BT DIR inputs, the outputs of all the AND gates 124 except 124-1 indicate that the TX-TX, WLTX-BTRX, and BTTX-WLRX mutual grants are not allowed. According to the output of the RX-RX mutual grant lookup table 120-1, the OR gate 128 generates the WL BT MU Grant signal indicating that the mutual grant module 104 can issue the mutual grant to the WLAN and BT modules 12, 14 to simultaneously receive data.

When one of the WLAN and BT modules 12, 14 generates a request to transmit data while the other module is transmitting data, the mutual grant module 104 looks up the mutual grant lookup tables 120. Based on the WL PRI, BT PRI, and BT FREQ inputs, an output of the TX-TX mutual grant lookup table 120-2 indicates whether the request to simultaneously transmit data can be granted (i.e., if the mutual grant is allowed). Based on the WL DIR and BT DIR inputs, the AND gate 124-2 passes the output of the TX-TX mutual grant lookup table 120-2 to the OR gate 128. Based on the WL DIR and BT DIR inputs, the outputs of all the AND gates 124 except 124-2 indicate that the RX-RX, WLTX-BTRX, and BTTX-WLRX mutual grants are not allowed. According to the output of the TX-TX mutual grant lookup table 120-2, the OR gate 128 generates the WL BT MU Grant signal indicating that the mutual grant module 104 can issue the mutual grant to the WLAN and BT modules 12, 14 to simultaneously transmit data, and so on.

In FIG. 4F, the combining module 108 comprises OR gates 130-1 and 130-2. The combining module 108 receives the WL EX Grant, BT EX Grant, and WL BT MU Grant signals. Additionally, the combining module 108 receives WL Idle and BT Idle signals from the idle monitoring module 106. The WL Idle and BT Idle signals have binary values that indicate whether the WLAN and BT modules 12, 14 are in the idle state, respectively. For example, WL Idle=1 may indicate that the WLAN module 12 is in the idle state while WL Idle=0 may indicate that the WLAN module 12 is not in the idle state, and so on. The OR gate 130-1 ORs the EX WL Grant, WL BT MU Grant, and BT Idle signals and generates the WL Grant signal. The OR gate 130-2 ORs the EX BT Grant, WL BT MU Grant, and WL Idle signals and generates the WL Grant signal.

The control module 58 configures the exclusive and mutual grant lookup tables 110, 120 based on factors including a radio-frequency (RF) front-end design (e.g., the antenna configuration) of the device 50. Generally, the exclusive grant lookup table 110 may be fixed. The control module 58 may, however, dynamically adjust the mutual grant lookup tables 120 when the WLAN and BT modules 12, 14 communicate.

Typically, the exclusive grant lookup table 110 includes 16 input combinations since the WL PRI and BT PRI inputs include 2-bits each. The exclusive grant lookup table 110 will include only 4 input combinations when the WL PRI and BT PRI inputs each include 1 bit. The mutual grant lookup tables 120-1, 120-2, 120-3, and 120-4 include 1, 32, 32, and 32 input combinations, respectively. The mutual grant lookup tables 120-2, 120-3, and 120-4 each include 32 input combinations because the inputs WL PRI and BT PRI each include 2 bits, and the input BT FREQ includes 1 bit. The mutual grant lookup tables 120-2, 120-3, and 120-4 will include only 8 input combinations each when the inputs WL PRI and BT PRI each include 1 bit, and the input BT FREQ includes 1 bit.

Thus, the exclusive and mutual grant lookup tables 52, 54 typically include a total of 113 input combinations when the inputs WL PRI and BT PRI each include 2 bits, and the input BT FREQ includes 1 bit. In some implementations, depending on the RF front-end design of the device 50, the mutual grant lookup tables 120-3 and 120-4 may be eliminated to further reduce the total number of input combinations.

Referring now to FIGS. 5A-5C, a method 150 for arbitrating priority between the WLAN and BT modules 12, 14 using the arbitration module 100 is shown. For example only, Module1 and Module2 may include the WLAN and BT modules 12, 14, respectively. Alternatively, Module2 and Module1 may include the WLAN and BT modules 12, 14, respectively.

Control begins in step 152. Control determines in step 160 whether Module2 is idle when Module1 generates a TX/RX request. If the result of step 160 is true, control automatically grants priority to Module1 in step 162. Control ends in step 158. If the result of step 160 is false, control begins priority arbitration in step 164.

In step 166, control determines whether Module2 is receiving data when Module1 generates a request to receive data. If the result of step 166 is true, control determines using mutual grant lookup tables 120 whether a RX-RX mutual grant is allowed in step 168. If the result of step 168 is true, control generates the mutual grant in step 170, and control ends in step 158.

If the result of step 166 is false, control determines in step 172 whether Module2 is transmitting data when Module1 generates a request to transmit data. If the result of step 172 is true, control determines using mutual grant lookup tables 120 whether a TX-TX mutual grant is allowed in step 174. If the result of step 174 is true, control generates the mutual grant in step 170, and control ends in step 158.

If the result of step 172 is false, control determines in step 176 whether Module2 is receiving data when Module1 generates a request to transmit data. If the result of step 176 is true, control determines using mutual grant lookup tables 120 whether a TX-RX mutual grant is allowed in step 178. If the result of step 178 is true, control generates the mutual grant in step 170, and control ends in step 158.

If the result of step 176 is false (i.e., if Module2 is transmitting data when Module1 generates a request to receive data), control determines in step 182 whether a RX-TX mutual grant is allowed using mutual grant lookup tables 120.

If the result of step 182 is true, control generates the mutual grant in step 170, and control ends in step 158.

If the result of step 168, 174, 178, or 182 is false, control determines in step 184 using the exclusive grant lookup table 110 whether an exclusive grant can be issued in response to a request to transmit or receive data generated by Module1 or Module2. If the result of step 184 is true, control generates the exclusive grant in step 186, and control ends in step 158. If the result of step 184 is false, control denies the request in step 188, and control ends in step 158.

Occasionally, both the WLAN and BT modules 12, 14 may assert LO/LO, HI/HI, MED/MED, or MED-HI/MED-HI priorities. Depending on the type of data being communicated by each module, the arbitration modules 22 and 100 may grant priority to the BT module 14 more frequently than the WLAN module 12. In response, the WLAN module 12 may lower data rate. If the WLAN module 12 is not granted priority for an extended period of time, the WLAN module 12 may eventually drop the link (i.e., stop communicating) with another WLAN device. To prevent link loss due to priority arbitration, the priority granted by the arbitration modules 22 and 100 may be switched so that priority is granted fairly between the WLAN and BT modules 12, 14.

Referring now to FIGS. 6A and 6B, an arbitration module 200 comprises all the modules of the arbitration module 100 and further comprises a fair-share module 202, the exclusive grant lookup table 110, an XOR module 204, and the idle monitoring module 106. The fair-share module 202 together with the exclusive grant lookup table 110, the XOR module 204, and the Idle monitoring module 106 grants priority when the WLAN and BT modules 12, 14 assert identical priorities and when one module is repeatedly granted priority over the other module. The fair-share module 202 may switch priority between the WLAN and BT modules 12, 14. The fair-share module 202 may switch priority randomly or based on a predetermined sequence.

In FIG. 6A, the XOR module 204 XORs the outputs of the exclusive grant lookup table 110 and the fair-share module 202 and generates the EX WL Grant and EX BT Grant signals. Specifically, the XOR module 204 performs an invert function on the exclusive grant decision provided by the exclusive grant lookup table 110 based on the result of the fair-share module 202. The fair-share module 202 switches grant between the WLAN and BT modules 12, 14 when the idle monitoring module 106 indicates that the modules 12, 14 are in the idle state.

In FIG. 6B, the fair-share module 202 comprises a mask generating module 206, a mask shifting module 208, and shift registers 210. The shift registers 210 include a shift register 210-1 for LO/LO priority resolution, a shift register 210-2 for HI/HI priority resolution, a shift register 210-3 for MED/MED priority resolution, and a shift register for MED-HI/MED-HI priority resolution. The mask generating module 206 generates an N-bit mask (e.g., a 30-bit binary number) and loads the mask in each of the shift registers 210, where N is an integer greater than 1. The mask may be different for each of the shift registers 210. The mask may be generated randomly or based on the predetermined sequence in which to grant priority to the WLAN and BT modules 12, 14 when both the modules assert identical priorities.

After the masks are loaded in the shift registers 210, the mask shifting module 208 shifts the bits of the masks as follows. For example, when both the WLAN and BT modules 12, 14 assert HI/HI priority, the least significant bit (LSB) of the shift register 210-2 may be 0, and the output of the exclusive grant lookup table 110 may be 1 indicating a grant to the WLAN Module 12. The XOR module 204 XORs the LSB and the output of the exclusive grant lookup table 110 and outputs 1. Accordingly, the state of the WL EX Grant signal is 1 indicating a grant to the WLAN module 12.

To resolve a subsequent instance of HI/HI priority, the mask shifting module 208 shifts the shift register 210-2 by one bit when the idle monitoring module 106 indicates that the WLAN and BT modules 12, 14 are in the idle state. The LSB of the shift register 210-2 now may have either 0 or 1 depending on the mask initially loaded in the shift register 210-2. If the new LSB is 1, the WLAN module 12 may gain priority again when both the WLAN and BT modules 12, 14 subsequently assert HI/HI priority. If, however, the new LSB is 0, the WLAN module 12 does not gain priority again when both the WLAN and BT modules 12, 14 subsequently assert HI/HI priority although the exclusive grant lookup table 110 outputs 1 indicating a grant to the WLAN module 12. This is because the XOR module 204 XORs the 1 output by the exclusive grant lookup table 110 and the 1 output by the shift register 210-2 and outputs 0. Thus, the state of the EX WL Grant signal is now 0, and the state of the EX BT Grant signal is now 1 indicating a grant to the BT module 14.

Referring now to FIG. 6C, an arbitration module 220 comprises all the modules of the arbitration module 22 and further comprises the fair-share module 202 and a switching module 222. The switching module 222 switches (i.e., flips or swaps) the outputs of the lookup tables 52-1 and 52-2 when the output of one of the shift registers 210 changes state after the shift register is shifted by the mask shifting module 208. Specifically, the output of the lookup table1 52-1 is swapped or exchanged with the output of the lookup table2 52-2 when the same priority (e.g., HI/HI priority) is reasserted by the WLAN and BT modules 12, 14.

Occasionally, depending on the type of data being communicated, one of the WLAN and BT modules 12, 14 (e.g., the BT module 14) may repeatedly demand a higher priority while merely maintaining link may suffice for the other module (e.g., the WLAN module 12). Accordingly, the other module may be granted a low priority on a sustained basis. Operating at the low priority on a sustained basis, however, may result in link loss for the WLAN module 12. To maintain the link, the priority of the other module may have to be slightly increased for a period of time. Thereafter, the priority of the other module can be lowered again.

Referring now to FIG. 7, a device 51 comprises the WLAN and BT modules 12, 14, the control module 58, an arbitration module 230, and a priority upgrade module 232. The arbitration module 230 comprises all the modules of the arbitration module 200 and further comprises the feedback module 56. Alternatively, the arbitration module 230 comprises all the modules of the arbitration module 220. The arbitration module 230 communicates with a priority upgrade module 232 that dynamically upgrades priorities of the WLAN and BT modules 12, 14 based on the feedback received from the feedback module 56. The priority upgrade module 232 generates upgraded priorities for the WLAN and BT modules 12, 14 based on the priorities received from the WLAN and BT modules 12, 14 and the feedback received from the feedback module 56. The arbitration module 230 arbitrates priorities between the WLAN and BT modules 12, 14 based on the upgraded priorities generated by the priority upgrade module 232 and based on other inputs including WL DIR, BT DIR, and BT FREQ.

In use, the priority upgrade module 232 passes the WL PRI and BT PRI inputs to the arbitration module 230. The feedback module 56 outputs to the priority upgrade module 232 the lost grant statistic and the stop statistic for each priority level requested by the WLAN and BT modules 12, 14. For example, the feedback module 56 may output the number of times the arbitration module 230 did not grant the HI PRI requested by the WLAN module 12, the number of times the arbitration module 230 stopped the BT module 14 to grant the requested priority to the WLAN module 12, and so on.

For each of the WLAN and BT modules 12, 14, the priority upgrade module 232 compares the statistics for each priority level to a respective threshold. For example, the priority upgrade module 232 may determine whether the WLAN module 12 lost grant more than T1 times, whether the BT module 14 was stopped more than T2 times, etc., where T1, T2 are integers greater than 1. When the statistic for one of the priority levels exceeds the respective threshold, the priority upgrade module 232 changes the priority level of the WLAN or BT module 12, 14 to another (typically higher) priority level. This may be implemented using a lookup table that maps an original priority level to a new priority level. For example, the lost grant statistic for LO priority level of the WLAN module 12 may indicate that the arbitration module 230 did not grant the LO priority requested by the WLAN module 12 more than five times. The priority upgrade module 232 may upgrade the LO priority requested by the WLAN module 12 to one of the HI, MED, or MED-HI priorities using the lookup table.

After upgrading the priority, the feedback module 56 indicates to the priority upgrade module 232 whether the module whose priority is upgraded (e.g., the WLAN module 12) successfully completed subsequent communication at the upgraded priority. If true, the feedback module 56 or the priority upgrade module 232 resets the statistic that was used to upgrade the priority. The fair-share module 202 resolves instances of equal priorities of the WLAN and BT modules 12, 14 when the upgraded priority of one module is the same as the priority requested by the other module. The control module 58 may generate and dynamically adjust the thresholds, T1, T2, etc. In some implementations, the control module 58 may disable upgrading priorities by setting the thresholds high or by making upgraded priorities equal to the requested (i.e., input) priorities.

Referring now to FIGS. 8A-8D, when a device comprises the WLAN, BT, and WiMAX modules 12, 14, 16, the device may use three arbitration modules 22 or three arbitration modules 100 to arbitrate priorities between the WLAN, BT, and WiMAX modules 12, 14, 16. In FIG. 8A, a device 50-1 comprises the WLAN, BT, and WiMAX modules 12, 14, 16, the control module 58, a WLAN-BT arbitration module 22-1, a BT-WiMAX arbitration module 22-2, a WLAN-WiMAX arbitration module 22-3, and a combining module 59. The WLAN-BT arbitration module 22-1 arbitrates priorities between the WLAN and BT modules 12, 14. The BT-WiMAX arbitration module 22-2 arbitrates priorities between the BT and WiMAX modules 14, 16. The WLAN-WiMAX arbitration module 22-3 arbitrates priorities between the WLAN and WiMAX modules 12, 16. The WLAN-WiMAX, BT-WiMAX, and WLAN-WiMAX arbitration modules 22-1, 22-2, 22-3 each includes all the modules of the arbitration module 22.

In FIG. 8B, the WLAN-BT arbitration module 22-1 receives the inputs WL DIR, WL PRI, BT DIR, BT PRI, and BT FREQ from the WLAN and BT modules 12, 14. The WLAN-BT arbitration module 22-1 comprises lookup and lock tables 52, 54 for the WLAN and BT modules 12, 14. The control module 58 configures the lookup and lock tables 52, 54 for the WLAN and BT modules 12, 14 depending on factors including antenna configuration of the device 50-1. Based on the inputs and the lookup and lock tables 52, 54, the WLAN-BT arbitration module 22-1 determines whether to grant priority to the WLAN and/or BT modules 12, 14 when the WLAN and/or BT modules 12, 14 request priority for simultaneous communication. Accordingly, the WLAN-BT arbitration module 22-1 generates the WL Grant and BT Grant signals that indicate priorities granted to the WLAN and BT modules 12, 14, respectively.

The BT-WiMAX arbitration module 22-2 receives the inputs BT DIR, BT PRI, WM DIR, WM PRI, and BT FREQ from the BT and WiMAX modules 14, 16. The BT-WiMAX arbitration module 22-2 comprises lookup and lock tables 52, 54 for the BT and WiMAX modules 14, 16. The control module 58 configures the lookup and lock tables 52, 54 for the BT and WiMAX modules 14, 16 depending on factors including antenna configuration of the device 50-1. Based on the inputs and the lookup and lock tables 52, 54, the BT-WiMAX arbitration module 22-2 determines whether to grant priority to the BT and/or WiMAX modules 14, 16 when the BT and/or WiMAX modules 14, 16 request priority for simultaneous communication. Accordingly, the BT-WiMAX arbitration module 22-2 generates the BT Grant and WM Grant signals that indicate priorities granted to the BT and WiMAX modules 14, 16, respectively.

The WLAN-WiMAX arbitration module 22-3 receives the inputs WL DIR, WL PRI, WM DIR, and WM PRI from the WLAN and WiMAX modules 12, 16. The WLAN-WiMAX arbitration module 22-3 comprises lookup and lock tables 52, 54 for the WLAN and WiMAX modules 12, 16. The control module 58 configures the lookup and lock tables 52, 54 for the WLAN and WiMAX modules 12, 16 depending on factors including antenna configuration of the device 50-1. Based on the inputs and the lookup and lock tables 52, 54, the WLAN-WiMAX arbitration module 22-3 determines whether to grant priority to the WLAN and/or WiMAX modules 12, 16 when the WLAN and/or WiMAX modules 12, 16 request priority for simultaneous communication. Accordingly, the WLAN-WiMAX arbitration module 22-3 generates WL Grant and WM Grant signals that indicate priorities granted to the WLAN and WiMAX modules 12, 16, respectively.

In some implementations, the arbitration modules 22-1, 22-2, and 22-3 may share an idle monitoring module that monitors whether any of the WLAN, BT, and WiMAX modules 12, 14, 16 are in the idle state and that generates the WL Idle, BT Idle, and WM Idle signals.

The combining module 59 comprises AND gates 240-1, 240-2, and 240-3. The AND gate 240-1 combines the WL Grant signals generated by the WLAN-BT and WLAN-WiMAX arbitration modules 22-1, 22-3 to generate a final WL Grant signal for the WLAN module 12. The AND gate 240-2 combines the BT Grant signals generated by the WLAN-BT and BT-WiMAX arbitration modules 22-1, 22-2 to generate a final BT Grant signal for the BT module 14. The AND gate 240-3 combines the WM Grant signals generated by the BT-WiMAX and WLAN-WiMAX arbitration modules 22-2, 22-3 to generate a final WM Grant signal for the WiMAX module 16.

The control module 58 configures the lookup and lock tables for the WLAN, BT, and WiMAX modules 12, 14, 16 to ensure two results: First, the exclusive grants generated by the WLAN-BT, BT-WiMAX, and WLAN-WiMAX arbitration modules 22-1, 22-2, 22-3 are not inconsistent, and at least one of the modules 12, 14, 16 is granted priority. Second, the mutual grants are generated for the WLAN, BT, and WiMAX modules 12, 14, 16 only when the WLAN-BT, BT-WiMAX, and WLAN-WiMAX arbitration modules 22-1, 22-2, 22-3 generate mutual grants for the WLAN and BT modules 12, 14, the BT and WiMAX modules 14, 16, and the WLAN and WiMAX modules 12, 16, respectively.

When the WL PRI and BT PRI inputs each include 2 bits, the lookup tables 52 for the WLAN-BT arbitration module 22-1 include two lookup tables each having 128 input combinations. The lookup tables 52 for the BT-WiMAX arbitration module 22-2 include two lookup tables each having 128 input combinations. The lookup tables 52 for the WLAN-WiMAX arbitration module 22-3 include two lookup tables each having 64 input combinations. Alternatively, a single lookup table having inputs WL DIR, WL PRI, BT DIR, BT PRI, BT FREQ, WM DIR, and WM PRI and having $2^{10}$ input combinations may be used when the WL PRI and BT PRI inputs each include 2 bits.

In FIG. 8C, a device 50-2 comprises the WLAN, BT, and WiMAX modules 12, 14, 16, the control module 58, a WLAN-BT arbitration module 100-1, a BT-WiMAX arbitration module 100-2, a WLAN-WiMAX arbitration module 100-3, and the combining module 59. The WLAN-BT arbitration module 100-1 arbitrates priorities between the WLAN and BT modules 12, 14. The BT-WiMAX arbitration module 100-2 arbitrates priorities between the BT and WiMAX modules 14, 16. The WLAN-WiMAX arbitration module 100-3 arbitrates priorities between the WLAN and WiMAX modules 12, 16. The WLAN-WiMAX, BT-WiMAX, and WLAN-WiMAX arbitration modules 100-1, 100-2, 100-3 each includes all the modules of the arbitration module 100.

In FIG. 8D, the WLAN-BT arbitration module 100-1 receives the inputs WL DIR, WL PRI, BT DIR, BT PRI, and BT FREQ from the WLAN and BT modules 12, 14. The WLAN-BT arbitration module 100-1 comprises exclusive and mutual grant lookup tables 110, 120 and lock tables for the WLAN and BT modules 12, 14. The control module 58 configures the exclusive and mutual grant lookup tables 110, 120 for the WLAN and BT modules 12, 14 depending on factors including antenna configuration of the device 50-2. Based on the inputs, the exclusive and mutual grant lookup tables 110, 120, and the lock tables, the WLAN-BT arbitration module 100-1 determines whether to issue exclusive or mutual grant to the WLAN and/or BT modules 12, 14 when the WLAN and/or BT modules 12, 14 request priority for simultaneous communication. Based on the exclusive/mutual grant issued and inputs received from the idle monitoring module 106, the WLAN-BT arbitration module 100-1 generates the WL Grant and BT Grant signals that indicate priorities granted to the WLAN and BT modules 12, 14, respectively.

The BT-WiMAX arbitration module 100-2 receives the inputs BT DIR, BT PRI, WM DIR, WM PRI, and BT FREQ from the BT and WiMAX modules 14, 16. The BT-WiMAX arbitration module 100-2 comprises exclusive and mutual grant lookup tables 110, 120 and lock tables for the BT and WiMAX modules 14, 16. The control module 58 configures the exclusive and mutual grant lookup tables 110, 120 for the BT and WiMAX modules 14, 16 depending on factors including antenna configuration of the device 50-2. Based on the inputs, the exclusive and mutual grant lookup tables 110, 120, and the lock tables, the BT-WiMAX arbitration module 100-2 determines whether to issue exclusive or mutual grant to the BT and/or WiMAX modules 14, 16 when the BT and/or WiMAX modules 14, 16 request priority for simultaneous communication. Based on the exclusive/mutual grant issued and inputs received from the idle monitoring module 106, the BT-WiMAX arbitration module 100-2 generates the BT Grant and WM Grant signals that indicate priorities granted to the BT and WiMAX modules 14, 16, respectively.

The WLAN-WiMAX arbitration module 100-3 receives the inputs WL DIR, WL PRI, WM DIR, and WM PRI from the WLAN and WiMAX modules 12, 16. The WLAN-WiMAX arbitration module 100-3 comprises exclusive and mutual grant lookup tables 110, 120 and lock tables for the WLAN and WiMAX modules 12, 16. The control module 58 configures the exclusive and mutual grant lookup tables 110, 120 for the WLAN and WiMAX modules 12, 16 depending on factors including antenna configuration of the device 50-2. Based on the inputs, the exclusive and mutual grant lookup tables 110, 120, and the lock tables the WLAN-WiMAX arbitration module 100-3 determines whether to issue exclusive or mutual grant to the WLAN and/or WiMAX modules 12, 16 when the WLAN and/or WiMAX modules 12, 16 request priority for simultaneous communication. Based on the exclusive/mutual grant issued and inputs received from the idle monitoring module 106, the WLAN-WiMAX arbitration module 100-3 generates the WL Grant and WM Grant signals that indicate priorities granted to the WLAN and WiMAX modules 14, 16, respectively.

In some implementations, the arbitration modules 100-1, 100-2, and 100-3 may share an idle monitoring module that monitors whether any of the WLAN, BT, and WiMAX modules 12, 14, 16 are in the idle state and that generates the WL Idle, BT Idle, and WM Idle signals.

In the combining module 59, the AND gate 240-1 combines the WL Grant signals generated by the WLAN-BT and WLAN-WiMAX arbitration modules 100-1, 100-3 to generate the final WL Grant signal for the WLAN module 12. The AND gate 240-2 combines the BT Grant signals generated by the WLAN-BT and BT-WiMAX arbitration modules 100-1, 100-2 to generate the final BT Grant signal for the BT module 14. The AND gate 240-3 combines the WM Grant signals generated by the BT-WiMAX and WLAN-WiMAX arbitration modules 100-2, 100-3 to generate the final WM Grant signal for the WiMAX module 16.

The control module 58 configures the exclusive and mutual grant lookup tables for the WLAN, BT, and WiMAX modules 12, 14, 16 to ensure two results: First, the exclusive grants generated by the WLAN-BT, BT-WiMAX, and WLAN-WiMAX arbitration modules 100-1, 100-2, 100-3 are not inconsistent, and at least one of the modules 12, 14, 16 is granted priority. Second, the mutual grants are generated for the WLAN, BT, and WiMAX modules 12, 14, 16 only when the WLAN-BT, BT-WiMAX, and WLAN-WiMAX arbitration modules 100-1, 100-2, 100-3 generate mutual grants for the WLAN and BT modules 12, 14, the BT and WiMAX modules 14, 16, and the WLAN and WiMAX modules 12, 16, respectively. The exclusive and mutual grant lookup tables 110, 120 for the WLAN-BT, BT-WiMAX, and WLAN-WiMAX arbitration modules 100-1, 100-2, 100-3 include fewer input combinations than the lookup tables 52 for the WLAN-BT, BT-WiMAX, and WLAN-WiMAX arbitration modules 22-1, 22-2, 22-3, respectively.

Referring now to FIGS. 9A-9D, a single arbitration module may be used to arbitrate priorities between the WLAN, BT, and WiMAX modules 12, 14, 16 when more than one of the modules 12, 14, 16 requests priority to communicate simultaneously. In FIG. 9A, a device 50-3 comprises the WLAN, BT, and WiMAX modules 12, 14, 16, the control module 58, and an arbitration module 250. The arbitration module 250 arbitrates priorities between the WLAN, BT, and WiMAX modules 12, 14, 16 based on the inputs WL DIR, WL PRI, WM DIR, WM PRI, BT DIR, BT PRI, and BT FREQ. In FIG. 9B, the arbitration module 250 comprises an exclusive grant module 252, a mutual grant module 254, and idle monitoring module 256, and a combining module 258.

In FIG. 9C, the exclusive grant module 252 determines whether to issue the exclusive grant to the WLAN, BT, or WiMAX module 12, 14, 16 based on the inputs WL PRI, WM PRI, and BT PRI. The exclusive grant module 252 includes an exclusive grant lookup table (not shown) having 64 input combinations when the WL PRI and BT PRI inputs each include 2 bits. The exclusive grant module 252 generates the EX WL Grant, EX BT Grant, and EX WM Grant signals indicating whether one of the modules 12, 14, 16 can be issued the exclusive grant.

The mutual grant module 254 determines whether to issue mutual grants to the WLAN and BT modules 12, 14, the BT and WiMAX modules 14, 16, or the WLAN and WiMAX modules 12, 16 based on the inputs WL PRI, WM PRI, BT PRI, WL DIR, WM DIR, BT DIR, and BT FREQ. The mutual grant module 254 utilizes the scheme of the mutual grant module 104 shown in FIG. 4F and extends the scheme to three modules (e.g., WLAN, BT, and WiMAX modules 12, 14, 16). For example, the mutual grant module 254 may include three mutual grant modules 104 each configured to determine whether a mutual grant can be issued to the WLAN and BT modules 12, 14, the BT and WiMAX modules 14, 16, and the WLAN and WiMAX modules 12, 16, respectively.

The mutual grant module 254 generates the MU WL BT Grant, MU BT WM Grant, and MU WL WM Grant signals. The MU WL BT grant signal indicates whether the WLAN and BT modules 12, 14 are granted priorities to communicate simultaneously. The MU BT WM grant signal indicates whether the BT and WiMAX modules 14, 16 are granted priorities to communicate simultaneously. The MU WL WM grant signal indicates whether the WLAN and WiMAX modules 12, 16 are granted priorities to communicate simultaneously. The idle monitoring module 256 monitors the WLAN, BT, and WiMAX modules 12, 14, 16 and generates the WL Idle, BT Idle, and WM Idle signals when the respective modules are in the idle state.

In FIG. 9D, the combining module 258 combines the signals generated by the exclusive grant module 252, mutual grant module 254, and idle monitoring module 156 as shown. The combining module 258 generates the WL Grant, BT Grant, and WM grant signals that indicate whether priority is granted to the WLAN, BT, and/or WiMAX modules 12, 14, 16. The exclusive grant module 252 ensures that at least one of the modules 12, 14, 16 is granted priority.

Figure 10B:
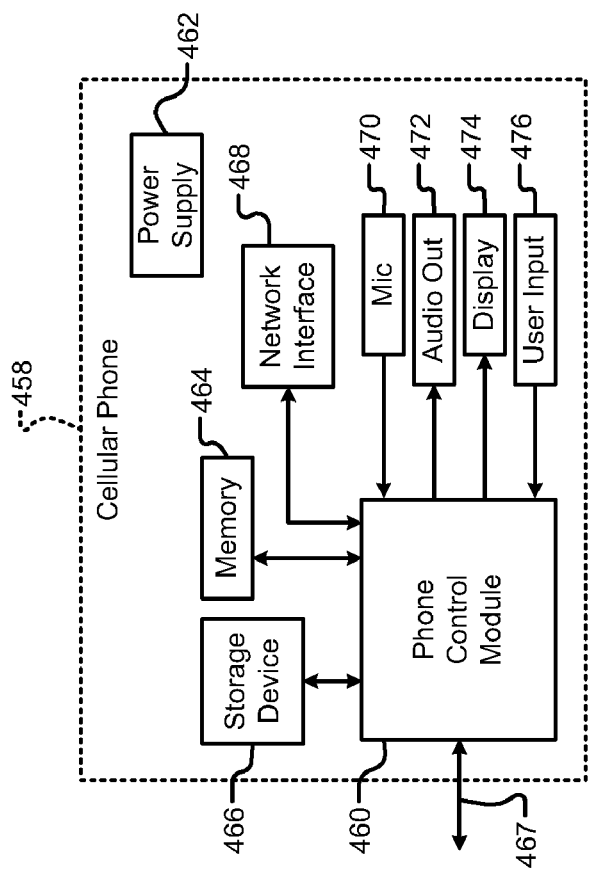
FIG. 10B is a functional block diagram of a cellular phone.
Figure 10A:
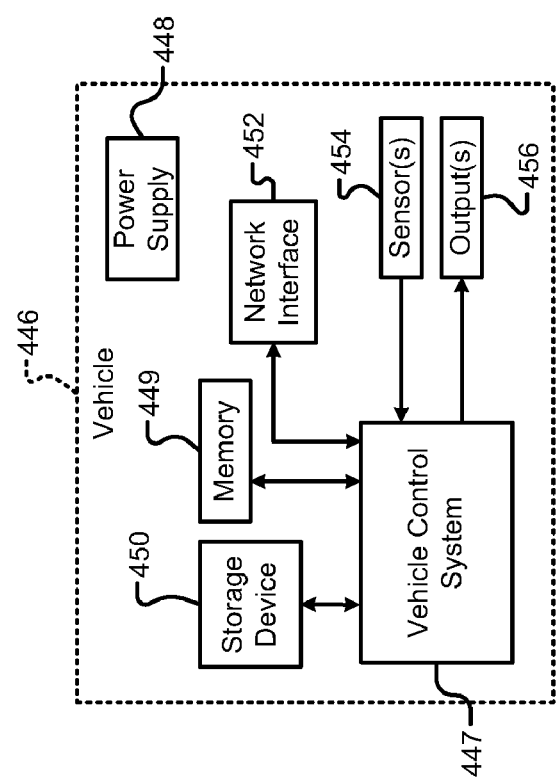
FIG. 10A is a functional block diagram of a vehicle control system.

Referring now to FIGS. 10A-10D, various exemplary implementations incorporating the teachings of the present disclosure are shown. In FIG. 10A, the teachings of the disclosure may be implemented in a vehicle control system 447 of a vehicle 446. The vehicle 446 may include the vehicle control system 447, a power supply 448, memory 449, a storage device 450, and a network interface 452. If the network interface 452 includes a wireless local area network interface, an antenna (not shown) may be included. The vehicle control system 447 may be a powertrain control system, a body control system, an entertainment control system, an anti-lock braking system (ABS), a navigation system, a telematics system, a lane departure system, an adaptive cruise control system, etc.

The vehicle control system 447 may communicate with one or more sensors 454 and generate one or more output signals 456. The sensors 454 may include temperature sensors, acceleration sensors, pressure sensors, rotational sensors, airflow sensors, etc. The output signals 456 may control engine operating parameters, transmission operating parameters, suspension parameters, brake parameters, etc.

The power supply 448 provides power to the components of the vehicle 446. The vehicle control system 447 may store data in memory 449 and/or the storage device 450. Memory 449 may include random access memory (RAM) and/or nonvolatile memory. Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 450 may include an optical storage drive, such as a DVD drive, and/or a hard disk drive (HDD). The vehicle control system 447 may communicate externally using the network interface 452.

In FIG. 10B, the teachings of the disclosure can be implemented in a phone control module 460 of a cellular phone 458. The cellular phone 458 includes the phone control module 460, a power supply 462, memory 464, a storage device 466, a cellular network interface 467, and a network interface 468. Additionally, the cellular phone 458 includes microphone 470, an audio output 472 such as a speaker and/or output jack, a display 474, and a user input device 476 such as a keypad and/or pointing device.

When the network interface 468 includes WLAN, WiMAX, and/or BT interfaces, one or more antenna (not shown) may be included. The phone control module 460 arbitrates priorities between the WLAN, WiMAX, and/or BT interfaces when the cellular phone 458 communicates simultaneously via more than one of the WLAN, WiMAX, and/or BT interfaces.

The phone control module 460 may receive input signals from the cellular network interface 467, the network interface 468, the microphone 470, and/or the user input device 476. The phone control module 460 may process signals, including encoding, decoding, filtering, and/or formatting, and generate output signals. The output signals may be communicated to one or more of memory 464, the storage device 466, the cellular network interface 467, the network interface 468, and the audio output 472.

Memory 464 may include random access memory (RAM) and/or nonvolatile memory. Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 466 may include an optical storage drive, such as a DVD drive, and/or a hard disk drive (HDD). The power supply 462 provides power to the components of the cellular phone 458.

Figure 10D:
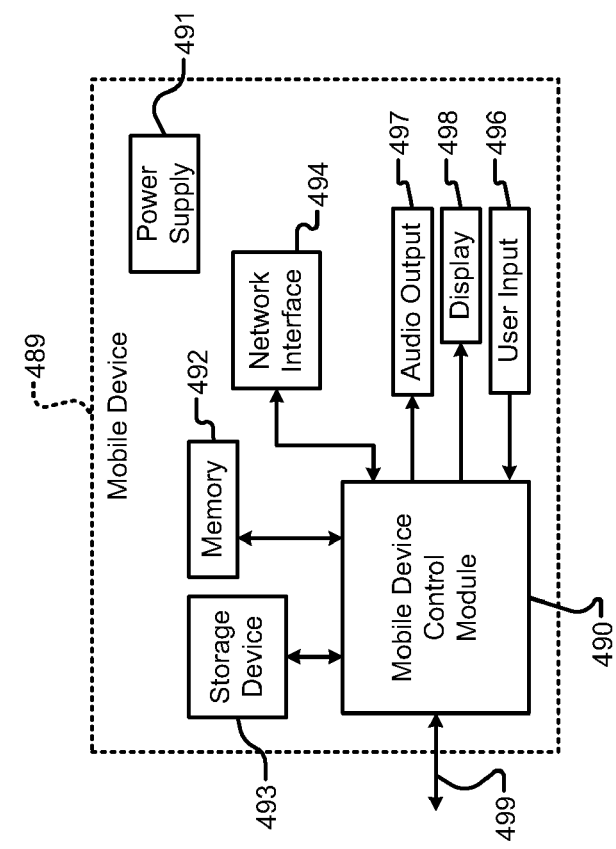
FIG. 10D is a functional block diagram of a mobile device.
Figure 10C:
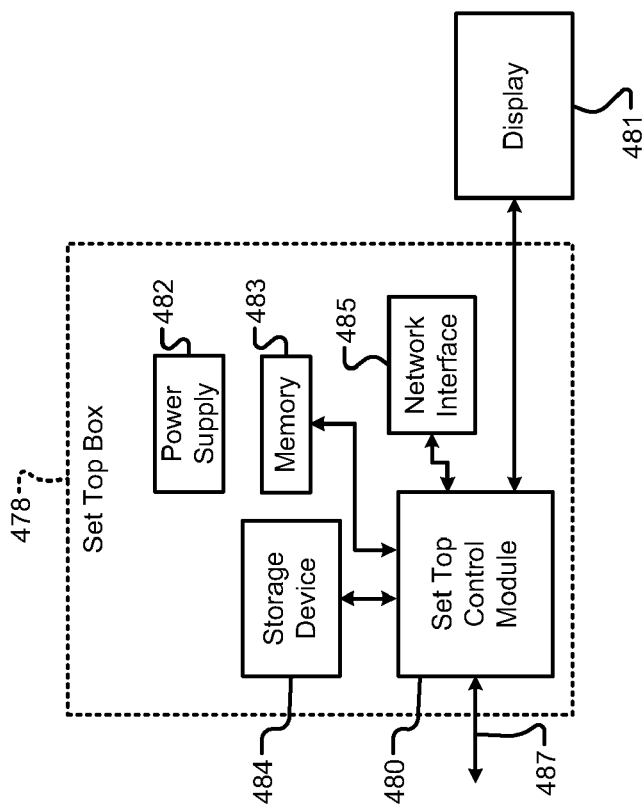
FIG. 10C is a functional block diagram of a set top box.

In FIG. 10C, the teachings of the disclosure can be implemented in a set top control module 480 of a set top box 478. The set top box 478 includes the set top control module 480, a display 481, a power supply 482, memory 483, a storage device 484, and a network interface 485. If the network interface 485 includes a wireless local area network interface, an antenna (not shown) may be included.

The set top control module 480 may receive input signals from the network interface 485 and an external interface 487, which can send and receive data via cable, broadband Internet, and/or satellite. The set top control module 480 may process signals, including encoding, decoding, filtering, and/or formatting, and generate output signals. The output signals may include audio and/or video signals in standard and/or high definition formats. The output signals may be communicated to the network interface 485 and/or to the display 481. The display 481 may include a television, a projector, and/or a monitor.

The power supply 482 provides power to the components of the set top box 478. Memory 483 may include random access memory (RAM) and/or nonvolatile memory. Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 484 may include an optical storage drive, such as a DVD drive, and/or a hard disk drive (HDD).

In FIG. 10D, the teachings of the disclosure can be implemented in a mobile device control module 490 of a mobile device 489. The mobile device 489 may include the mobile device control module 490, a power supply 491, memory 492, a storage device 493, a network interface 494, and an external interface 499. When the network interface 494 includes WLAN, WiMAX, and/or BT interfaces, one or more antenna (not shown) may be included. The mobile device control module 490 arbitrates priorities between the WLAN, WiMAX, and/or BT interfaces when the mobile device 489 communicates simultaneously via more than one of the WLAN, WiMAX, and/or BT interfaces.

The mobile device control module 490 may receive input signals from the network interface 494 and/or the external interface 499. The external interface 499 may include USB, infrared, and/or Ethernet. The input signals may include compressed audio and/or video, and may be compliant with the MP3 format. Additionally, the mobile device control module 490 may receive input from a user input 496 such as a keypad, touchpad, or individual buttons. The mobile device control module 490 may process input signals, including encoding, decoding, filtering, and/or formatting, and generate output signals.

The mobile device control module 490 may output audio signals to an audio output 497 and video signals to a display 498. The audio output 497 may include a speaker and/or an output jack. The display 498 may present a graphical user interface, which may include menus, icons, etc. The power supply 491 provides power to the components of the mobile device 489. Memory 492 may include random access memory (RAM) and/or nonvolatile memory.

Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 493 may include an optical storage drive, such as a DVD drive, and/or a hard disk drive (HDD). The mobile device may include a personal digital assistant, a media player, a laptop computer, a gaming console, or other mobile computing device.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A wireless network device comprising:
   a first communication module configured to selectively communicate with at least one of first devices, wherein the first devices are external to the wireless network device;
   a second communication module configured to selectively communicate with at least one of second devices, wherein the second devices are external to the wireless network device; and
   an arbitration module configured to
      receive a request for communication from the first communication module,
      detect when the second communication module is communicating in a locked mode, wherein transmission or reception of a packet in the locked mode is not interrupted to avoid loss of the packet, and
      selectively deny the request for communication from the first communication module when the second communication module is communicating in the locked mode,
   wherein the arbitration module is further configured to grant the request for communication from the first communication module when
      the second communication module is communicating in the locked mode, and
      granting the request for communication from the first communication module does not require stopping the second communication module from communicating in the locked mode.

2. The wireless network device of claim 1, wherein:
   the arbitration module is configured to grant the request for communication from the first communication module when the second communication module is not communicating in the locked mode, and
   the arbitration module is configured to selectively stop the second communication module from communicating with the at least one of the second devices.

3. The wireless network device of claim 1, wherein the arbitration module:
   includes a lookup table,
   receives inputs from the first communication module and the second communication module, and
   determines when the first communication module and the second communication module are communicating in the locked mode based on (i) the lookup table and (ii) the inputs.

4. The wireless network device of claim 1, wherein the arbitration module:
   includes a lookup table,
   receives inputs from the first communication module and the second communication module related to (i) priority requested by the first communication module and the second communication module and (ii) direction of communication requested by the first communication module and the second communication module, and
   determines, based on (i) the lookup table and (ii) the inputs, when to allow
      the first communication module to communicate with the at least one of the first devices, and
      the second communication module to communicate with the at least one of the second devices.

5. The wireless network device of claim 1, further comprising:
   a feedback module configured to generate feedback,
   wherein the feedback includes
      a number of times the arbitration module grants the request for communication from the first communication module,
      a number of times the arbitration module denies the request for communication from the first communication module, and
      a number of times the arbitration module stops the second communication module from communicating when granting the request for communication from the first communication module.

6. The wireless network device of claim 5, further comprising a control module configured to adjust data rates of at least one of the first communication module or the second communication module based on the feedback.

7. The wireless network device of claim 5, further comprising:
a control module configured to generate a lookup table,
wherein the arbitration module is configured to determine, based on (i) the lookup table and (ii) inputs received from the first communication module and the second communication module, when to allow
the first communication module to communicate with the at least one of the first devices, and
the second communication module to communicate with the at least one of the second devices, and
wherein the control module is configured to adjust the lookup table based on the feedback.

8. The wireless network device of claim 1, wherein:
each of the first communication module and the second communication module includes (i) a wireless local area network (WLAN) module, (ii) a Bluetooth® module, or (iii) a Worldwide Interoperability for Microwave Access (WiMAX) module, and
the first communication module is different than the second communication module.

9. A wireless network device comprising:
a first communication module configured to selectively communicate with at least one of first devices, wherein the first devices are external to the wireless network device;
a second communication module configured to selectively communicate with at least one of second devices, wherein the second devices are external to the wireless network device;
an arbitration module configured to
receive a request for communication from the first communication module,
detect when the second communication module is communicating in a locked mode, wherein transmission or reception of a packet in the locked mode is not interrupted to avoid loss of the packet, and
selectively deny the request for communication from the first communication module when the second communication module is communicating in the locked mode; and
a priority resolution module configured to
receive inputs related to priority of communication from the first communication module and the second communication module, and
generate a control signal when the first communication module and the second communication module request identical priorities,
wherein the first communication module or the second communication module is configured to communicate based on the control signal.

10. The wireless network device of claim 9, further comprising:
an idle monitoring module configured to
monitor the first communication module and the second communication module, and
generate (i) a first idle signal when the first communication module is not communicating and (ii) a second idle signal when the second communication module is not communicating,
wherein the priority resolution module is configured to generate the control signal based on (i) the first idle signal and (ii) the second idle signal.

11. A wireless network device comprising:
a first communication module configured to selectively communicate with at least one of first devices, wherein the first devices are external to the wireless network device;
a second communication module configured to selectively communicate with at least one of second devices, wherein the second devices are external to the wireless network device;
an arbitration module configured to
receive a request for communication from the first communication module,
detect when the second communication module is communicating in a locked mode, and
selectively deny the request for communication from the first communication module when the second communication module is communicating in the locked mode;
a priority resolution module configured to
receive inputs related to priority of communication from the first communication module and the second communication module, and
generate a control signal when the first communication module and the second communication module request identical priorities, wherein the first communication module or the second communication module is configured to communicate based on the control signal;
an idle monitoring module configured to
monitor the first communication module and the second communication module, and
generate (i) a first idle signal when the first communication module is not communicating and (ii) a second idle signal when the second communication module is not communicating, wherein the priority resolution module is configured to generate the control signal based on (i) the first idle signal and (ii) the second idle signal; and
a switching module configured to
switch a first priority granted by the arbitration module to the first communication module from the first communication module to the second communication module based on the control signal, and
switch a second priority granted by the arbitration module to the second communication module from the second communication module to the first communication module based on the control signal.

12. The wireless network device of claim 10, wherein the priority resolution module comprises:
a mask generating module configured to generate a mask, wherein the mask includes an N-bit binary number, and
wherein the N-bit binary number is generated based on (i) a random priority assignment sequence for the first communication module and the second communication module or (ii) a predetermined priority assignment sequence for the first communication module and the second communication module,
where N is an integer greater than or equal to 1.

13. A wireless network device comprising:
a first communication module configured to selectively communicate with at least one of first devices, wherein the first devices are external to the wireless network device;
a second communication module configured to selectively communicate with at least one of second devices, wherein the second devices are external to the wireless network device;

an arbitration module configured to
receive a request for communication from the first communication module,
detect when the second communication module is communicating in a locked mode, and
selectively deny the request for communication from the first communication module when the second communication module is communicating in the locked mode;
a priority resolution module configured to
receive inputs related to priority of communication from the first communication module and the second communication module, and
generate a control signal when the first communication module and the second communication module request identical priorities, wherein the first communication module or the second communication module is configured to communicate based on the control signal; and
an idle monitoring module configured to
monitor the first communication module and the second communication module, and
generate (i) a first idle signal when the first communication module is not communicating and (ii) a second idle signal when the second communication module is not communicating, wherein the priority resolution module is configured to generate the control signal based on (i) the first idle signal and (ii) the second idle signal, and
wherein the priority resolution module comprises
a mask generating module configured to generate a mask,
wherein the mask includes an N-bit binary number, and
wherein the N-bit binary number is generated based on (i) a random priority assignment sequence for the first communication module and the second communication module or (ii) a predetermined priority assignment sequence for the first communication module and the second communication module,
where N is an integer greater than or equal to 1; a shift register, wherein the mask is loaded in the shift register; and
a mask shifting module configure to shift the shift register based on (i) the first idle signal and (ii) the second idle signal when both of the first communication module and the second communication module request identical priorities, wherein the control signal is generated based on the mask when the shift register is shifted.

14. The wireless network device of claim 1, further comprising:
a feedback module configured to generate a feedback statistic,
wherein the feedback statistic includes at least one of
a number of times the first communication module is granted priority when the request for communication from the first communication module includes a first priority for communication,
a number of times the first communication module is denied priority when the request for communication from the first communication module includes a first priority for communication, or
a number of times the second communication module is stopped from communicating when the request for communication from the first communication module includes a first priority for communication.

15. The wireless network device of claim 14 further comprising:
a priority upgrade module configured to upgrade the first priority to a second priority when the feedback statistic is greater than or equal to a predetermined threshold,
wherein the request for communication from the first communication module includes the second priority instead of the first priority, and
wherein the priority upgrade module is configured to reset the feedback statistic after the first communication module communicates at the second priority.

16. A wireless network device comprising:
a first communication module configured to selectively communicate with at least one of first devices, wherein the first devices are external to the wireless network device;
a second communication module configure to selectively communicate with at least one of second devices, wherein the second devices are external to the wireless network device;
a first grant module configured to
receive first inputs related to priority of communication from the first communication module and the second communication module, and
generate a first grant signal based on (i) the first inputs and (ii) whether the first communication module or the second communication module is communicating in a locked mode, wherein transmission or reception of a packet in the locked mode is not interrupted to avoid loss of the packet, and wherein the first grant signal indicates when the first communication module or the second communication module is allowed to communicate; and
a second grant module configure to
receive (i) the first inputs and (ii) second inputs related to a direction of communication from the first communication module and the second communication module, and
generate a second grant signal based on (i) the first inputs, and (ii) the second inputs, wherein the second grant signal indicates when both of the first communication module and the second communication module are allowed to communicate,
wherein the first communication module is configured to communicate with the at least one of the first devices based on the first grant signal and the second grant signal, and wherein the second communication module is configured to communicate with the at least one of the second devices based on the first grant signal and the second grant signal.

17. The wireless network device of claim 16, wherein:
the first grant module comprises a first lookup table,
the first lookup table receives the first inputs,
the first lookup table generates an output based on the first inputs, and
the first grant module is configured to generate the first grant signal based on the output.

18. The wireless network device of claim 17, wherein the first grant module further comprises:
a second lookup table,
wherein the second lookup table indicates, based on (i) the first inputs and (ii) the second inputs, when the first communication module and the second communication module communicate in the locked mode.

19. A wireless network device comprising:
a first communication module configured to selectively communicate with at least one of first devices, wherein the first devices are external to the wireless network device;
a second communication module configure to selectively communicate with at least one of second devices, wherein the second devices are external to the wireless network device;
a first grant module configured to
receive first inputs related to priority of communication from the first communication module and the second communication module, and
generate a first grant signal based on the first inputs, wherein the first grant signal indicates when the first communication module or the second communication module is allowed to communicate;
a second grant module configure to
receive (i) the first inputs and (ii) second inputs related to a direction of communication from the first communication module and the second communication module, and
generate a second grant signal based on (i) the first inputs, and (ii) the second inputs, wherein the second grant signal indicates when both of the first communication module and the second communication module are allowed to communicate, wherein the first communication module is configured to communicate with the at least one of the first devices based on the first grant signal and the second grant signal, and wherein the second communication module is configured to communicate with the at least one of the second devices based on the first grant signal and the second grant signal,
wherein the first grant module comprises
a first lookup table, wherein the first lookup table receives the first inputs and generates an output based on the first inputs, and wherein the first grant module is configured to generate the first grant signal based on the output; and
a second lookup table, wherein the second lookup table indicates, based on (i) the first inputs and (ii) the second inputs, when the first communication module and the second communication module communicate in a locked mode; and
a mode verification module configured to
verify when the first communication module or the second communication module communicates in the locked mode based on the second lookup table, and
output the first grant signal when the first communication module or the second communication module is not communicating in the locked mode.

20. The wireless network device of claim 16, wherein:
the second grant module comprises a plurality of lookup tables,
the lookup tables (i) receive the first inputs and (ii) generate outputs based on the first inputs, and
the second grant module is configured to generate the second grant signal based on (i) the outputs and (ii) the second inputs.

21. The wireless network device of claim 16, further comprising:
an idle monitoring module configured to
monitor the first communication module and the second communication module,
generate a first idle signal when the communication module is not communicating, and
generate a second idle signal when the second communication module is not communicating.

22. A wireless network device comprising:
a first communication module configured to selectively communicate with at least one of first devices, wherein the first devices are external to the wireless network device;
a second communication module configure to selectively communicate with at least one of second devices, wherein the second devices are external to the wireless network device;
a first grant module configured to
receive first inputs related to priority of communication from the first communication module and the second communication module, and
generate a first grant signal based on the first inputs, wherein the first grant signal indicates when the first communication module or the second communication module is allowed to communicate;
a second grant module configure to
receive (i) the first inputs and (ii) second inputs related to a direction of communication from the first communication module and the second communication module, and
generate a second grant signal based on (i) the first inputs, and (ii) the second inputs, wherein the second grant signal indicates when both of the first communication module and the second communication module are allowed to communicate, wherein the first communication module is configured to communicate with the at least one of the first devices based on the first grant signal and the second grant signal, and wherein the second communication module is configured to communicate with the at least one of the second devices based on the first grant signal and the second grant signal;
an idle monitoring module configured to
monitor the first communication module and the second communication module,
generate a first idle signal when the communication module is not communicating, and
generate a second idle signal when the second communication module is not communicating; and
a combining module configured to
combine the first grant signal, the second grant signal, the first idle signal, and the second idle signal, and
generate a third grant signal and a fourth grant signal,
wherein the first communication module communicates based on the third grant signal, and
wherein the second communication module communicates based on the fourth grant signal.

23. The wireless network device of claim 16, further comprising:
a priority resolution module configured to
receive inputs related to priority of communication from (i) the first communication module and (ii) the second communication module, and
generate a control signal when the first communication module and the second communication module request identical priorities,
wherein the first communication module or the second communication module communicates based on the control signal.

24. The wireless network device of claim 23, further comprising:
an idle monitoring module configured to
monitor the first communication module and the second communication module,
generate a first idle signal when the first communication module is not communicating, and generate a second idle signal when the second communication module is not communicating, wherein the first grant module is configured to generate the first grant signal based on (i) the control signal (ii) the first idle signal, and (iii) the second idle signal.

25. The wireless network device of claim 24, wherein the priority resolution module comprises:
a mask generating module configured to generate a mask, wherein the mask includes an N-bit binary number, and wherein the N-bit binary number is generated based on (i) a random priority assignment sequence for the first communication module and the second communication module or (ii) a predetermined priority assignment sequence for the first communication module and the second communication module,
where N is an integer greater than or equal to 1.

26. A wireless network device comprising:
a first communication module configured to selectively communicate with at least one of first devices, wherein the first devices are external to the wireless network device;
a second communication module configure to selectively communicate with at least one of second devices, wherein the second devices are external to the wireless network device;
a first grant module configured to
  receive first inputs related to priority of communication from the first communication module and the second communication module, and
  generate a first grant signal based on the first inputs, wherein the first grant signal indicates when the first communication module or the second communication module is allowed to communicate;
a second grant module configure to
  receive (i) the first inputs and (ii) second inputs related to a direction of communication from the first communication module and the second communication module, and
  generate a second grant signal based on (i) the first inputs, and (ii) the second inputs, wherein the second grant signal indicates when both of the first communication module and the second communication module are allowed to communicate, wherein the first communication module is configured to communicate with the at least one of the first devices based on the first grant signal and the second grant signal, and wherein the second communication module is configured to communicate with the at least one of the second devices based on the first grant signal and the second grant signal;
a priority resolution module configured to
  receive inputs related to priority of communication from (i) the first communication module and (ii) the second communication module, and
  generate a control signal when the first communication module and the second communication module request identical priorities, wherein the first communication module or the second communication module communicates based on the control signal; and
an idle monitoring module configured to
  monitor the first communication module and the second communication module,
  generate a first idle signal when the first communication module is not communicating, and
  generate a second idle signal when the second communication module is not communicating,
wherein the first grant module is configured to generate the first grant signal based on (i) the control signal (ii) the first idle signal, and (iii) the second idle signal,
wherein the priority resolution module comprises
  a mask generating module configured to generate a mask, wherein the mask includes an N-bit binary number, and wherein the N-bit binary number is generated based on (i) a random priority assignment sequence for the first communication module and the second communication module or (ii) a predetermined priority assignment sequence for the first communication module and the second communication module, where N is an integer greater than or equal to 1;
  a shift register, wherein the mask is loaded in the shift register; and
  a mask shifting module configured to shift the shift register based on (i) the first idle signal and (ii) the second idle signal when both of the first communication module and the second communication module request identical priorities,
wherein the control signal is generated based on the mask when the shift register is shifted.

27. The wireless network device of claim 16, further comprising:
a feedback module configured to
generate a feedback statistic, wherein the feedback statistic includes at least one of
  a number of times the first communication module or the second communication module is granted priority when the first communication module or the second communication module requests a first priority for communication,
  a number of times the first communication module or the second communication module is denied priority when the first communication module or the second communication module requests a first priority for communication, or
  a number of times the first communication module or the second communication module is stopped from communicating when the first communication module or the second communication module requests a first priority for communication.

28. The wireless network device of claim 27, further comprising:
a priority upgrade module configured to
  upgrade the first priority to a second priority when the feedback statistic is greater than or equal to a predetermined threshold,
  wherein the first inputs include the second priority instead of the first priority, and
  wherein the priority upgrade module is configured to reset the feedback statistic after the first communication module or the second communication module communicates at the second priority.

29. A wireless network device comprising:
a first communication module configured to communicate with first devices, wherein the first devices are external to the wireless network device;
a second communication module configured to communicate with second devices, wherein the second devices are external to the wireless network device;
a third communication module configured to communicate with third devices, wherein the third devices are external to the wireless network device;

a first arbitration module configured to
    receive inputs related to (i) priority of communication and (ii) direction of communication from the first communication module and the second communication module,
    detect when the first communication module or the second communication module is communicating in a locked mode, wherein transmission or reception of a packet in the locked mode is not interrupted to avoid loss of the packet, and
    generate first control signals;
a second arbitration module configured to
    receive inputs related to (i) priority of communication and (ii) direction of communication from the second communication module and the third communication module,
    detect when the second communication module or the third communication module is communicating in the locked mode, and
    generate second control signals; and
a third arbitration module configured to
    receive inputs related to (i) priority of communication and (ii) direction of communication from the first communication module and the third communication module,
    detect when the first communication module or the third communication module is communicating in the locked mode, and
    generate third control signals,
wherein the first control signals indicate when at least one of the first communication module or the second communication module is allowed to communicate,
wherein the second control signals indicate when at least one of the second communication module or the third communication module is allowed to communicate, and
wherein the third control signals indicate when at least one of the first communication module or the third communication module is allowed to communicate.

30. A wireless network device comprising:
a first communication module configured to communicate with first devices, wherein the first devices are external to the wireless network device;
a second communication module configured to communicate with second devices, wherein the second devices are external to the wireless network device;
a third communication module configured to communicate with third devices, wherein the third devices are external to the wireless network device;
a first arbitration module configured to
    receive inputs related to (i) priority of communication and (ii) direction of communication from the first communication module and the second communication module, and
    generate first control signals;
a second arbitration module configured to
    receive inputs related to (i) priority of communication and (ii) direction of communication from the second communication module and the third communication module, and
    generate second control signals;
a third arbitration module configured to
    receive inputs related to (i) priority of communication and (ii) direction of communication from the first communication module and the third communication module, and
    generate third control signals,
wherein the first control signals indicate when at least one of the first communication module or the second communication module is allowed to communicate,
wherein the second control signals indicate when at least one of the second communication module or the third communication module is allowed to communicate, and
wherein the third control signals indicate when at least one of the first communication module or the third communication module is allowed to communicate; and
a combining module configured to
    combine the first control signals, the second control signals, and the third control signals,
    generate a fourth control signal, wherein the fourth control signal determines when the first communication module is allowed to communicate,
    generate a fifth control signal wherein the fifth control signal determines when the second communication module is allowed to communicate, and
    generate a sixth control signal wherein the sixth control signal determines when the third communication module is allowed to communicate.

31. The wireless network device of claim 29, wherein:
the first arbitration module is configured to detect when the first communication module or the second communication module is communicating in the locked mode on receiving a request for communication from at least one of the first communication module or the second communication module;
the second arbitration module is configured to detect when the second communication module or the third communication module is communicating in the locked mode on receiving a request for communication from at least one of the second communication module or the third communication module; and
the third arbitration module is configured to detect when the first communication module or the third communication module is communicating in the locked mode on receiving a request for communication from at least one of the first communication module or the third communication module.

32. The wireless network device of claim 29, wherein each of the first arbitration module, the second arbitration module, and the third arbitration module comprises a first grant module configured to:
    receive first inputs related to priority of communication from the first communication module and the second communication module, the second communication module and the third communication module, and the first communication module and the third communication module, respectively, and
    generate a first grant signal based on the first inputs,
    wherein the first grant signal generated by the first grant module of the first arbitration module indicates when the first communication module or the second communication module is allowed to communicate,
    wherein the first grant signal generated by the first grant module of the second arbitration module indicates when the second communication module or the third communication module is allowed to communicate, and
    wherein the first grant signal generated by the first grant module of the second arbitration module indicates when the first communication module or the third communication module is allowed to communicate.

33. The wireless network device of claim 32, wherein each of the first arbitration module, the second arbitration module, and the third arbitration module further comprises a second grant module configured to:
    receive the first inputs and second inputs related to direction of communication from the first communication module and the second communication module, the second communication module and the third communication module, and the first communication module and the third communication module, respectively, and
generate a second grant signal based on the first inputs and the second inputs,
wherein the second grant signal generated by the second grant module of the first arbitration module indicates when both of the first communication module and the second communication module are allowed to communicate,
wherein the second grant signal generated by the second grant module of the second arbitration module indicates when both of the second communication module and the third communication module are allowed to communicate, and
wherein the second grant signal generated by the second grant module of the third arbitration module indicates when both of the first communication module and the third communication module are allowed to communicate.

34. The wireless network device of claim 33, further comprising an idle monitoring module configured to:
monitor the first communication module, the second communication module, and the third communication module, and
generate a first idle signal when the first communication module is not communicating,
generate a second idle signal when the second communication module is not communicating, and
generate a third idle signal when the third communication module is not communicating.

35. The wireless network device of claim 34 further comprising a combining module configured to:
combine (i) the first grant signal and the second grant signal of each of the first arbitration module, the second arbitration module, and the third arbitration module and (ii) the first idle signal, the second idle signal, and the third idle signal, and
generate a first control signal, a second control signal, and a third control signal,
wherein the first control signal determines when the first communication module is allowed to communicate,
wherein the second control signal determines when the second communication module is allowed to communicate, and
wherein the third control signal determines when the third communication module is allowed to communicate.

36. A wireless network device comprising:
a first communication module configured to communicate with first devices, wherein the first devices are external to the wireless network device;
a second communication module configured to communicate with second devices, wherein the second devices are external to the wireless network device;
a third communication module configured to communicate with third devices, wherein the third devices are external to the wireless network device; and
an arbitration module configured to
receive inputs related to (i) priority of communication and (ii) direction of communication from each of the first communication module, the second communication module, and the third communication module, and
generate control signals based on (i) the inputs and (ii) whether the first communication module, the second communication module, or the third communication module is communicating in a locked mode, wherein transmission or reception of a packet in the locked mode is not interrupted to avoid loss of the packet, and
wherein the control signals determine when at least one of the first communication module, the second communication module, or the third communication module is allowed to communicate (i) exclusively of others of the first communication module, the second communication module, and the third communication module or (ii) concurrently with others of the first communication module, the second communication module, and the third communication module,
wherein the arbitration module comprises a first grant module configured to
receive first inputs related to priority of communication from each of the first communication module, the second communication module, and the third communication module, and
generate first grant signals based on the first inputs, wherein the first grant signals indicate when the first communication module, the second communication module, or the third communication module is allowed to communicate exclusively of others of the first communication module, the second communication module, and the third communication module, and
wherein the arbitration module further comprises a second grant module configured to
receive the first inputs and second inputs related to direction of communication from each of the first communication module, the second communication module, and the third communication module, and
generate second grant signals based on (i) the first inputs and the (ii) second inputs,
wherein the second grant signals indicate when at least two of the first communication module, the second communication module, or the third communication module are allowed to communicate concurrently.

37. The wireless network device of claim 36, further comprising an idle monitoring module configured to:
monitor each of the first communication module, the second communication module, and the third communication module,
generate a first idle signal when the first communication module is not communicating,
generate a second idle signal when the second communication module is not communicating, and
generate a third idle signal when the third communication module is not communicating.

38. A wireless network device comprising:
a first communication module configured to communicate with first devices, wherein the first devices are external to the wireless network device;
a second communication module configured to communicate with second devices, wherein the second devices are external to the wireless network device;
a third communication module configured to communicate with third devices, wherein the third devices are external to the wireless network device;
an arbitration module configured to
receive inputs related to (i) priority of communication and (ii) direction of communication from each of the first communication module, the second communication module, and the third communication module, and
generate control signals based on the inputs,
wherein the control signals determine when at least one of the first communication module, the second communication module, or the third communication module is allowed to communicate (i) exclusively of others of the first communication module, the second communication module, and the third communication module or (ii) concurrently with others of the first communication module, the second communication module, and the third communication module;

wherein the arbitration module comprises a first grant module configured to
- receive first inputs related to priority of communication from each of the first communication module, the second communication module, and the third communication module, and
- generate first grant signals based on the first inputs,
- wherein the first grant signals indicate when the first communication module, the second communication module, or the third communication module is allowed to communicate exclusively of others of the first communication module, the second communication module, and the third communication module, and wherein the arbitration module further comprises a second grant module configured to
- receive the first inputs and second inputs related to direction of communication from each of the first communication module, the second communication module, and the third communication module, and
- generate second grant signals based on (i) the first inputs and the (ii) second inputs, wherein the second grant signals indicate when at least two of the first communication module, the second communication module, or the third communication module are allowed to communicate concurrently;

an idle monitoring module configured to
- monitor each of the first communication module, the second communication module, and the third communication module,
- generate a first idle signal when the first communication module is not communicating,
- generate a second idle signal when the second communication module is not communicating, and
- generate a third idle signal when the third communication module is not communicating; and a combining module configured to
- combine (i) the first grant signal and the second grant signal and (ii) the first idle signal, the second idle signal, and the third idle signal, and
- generate a first control signal, a second control signal, and a third control signal,
- wherein the first control signal determines when the first communication module is allowed to communicate,
- wherein the second control signal determines when the second communication module is allowed to communicate, and
- wherein the third control signal determines when the third communication module is allowed to communicate.

* * * * *